(12) United States Patent
Uetabira et al.

(10) Patent No.: US 8,341,135 B2
(45) Date of Patent: Dec. 25, 2012

(54) INFORMATION SEARCH PROVISION APPARATUS AND INFORMATION SEARCH PROVISION SYSTEM

(75) Inventors: Shigeki Uetabira, Kagoshima (JP); Mitsugu Uetabira, Kagoshima (JP)

(73) Assignee: Interman Corporation, Kagoshima-shi, Kagoshima (JP)

( * ) Notice: Subject to any disclaimer, the term of this patent is extended or adjusted under 35 U.S.C. 154(b) by 769 days.

(21) Appl. No.: 10/590,740

(22) PCT Filed: Aug. 30, 2005

(86) PCT No.: PCT/JP2005/015770
§ 371 (c)(1),
(2), (4) Date: Aug. 24, 2006

(87) PCT Pub. No.: WO2006/027973
PCT Pub. Date: Mar. 16, 2006

(65) Prior Publication Data
US 2007/0208699 A1    Sep. 6, 2007

(30) Foreign Application Priority Data
Sep. 7, 2004 (JP) .................................. 2004-259725

(51) Int. Cl.
*G06F 17/30* (2006.01)
(52) U.S. Cl. .................... 707/705; 707/706; 707/707
(58) Field of Classification Search .............. 707/3, 100, 707/999.1, 709, 758, 787, 736, 751, 784
See application file for complete search history.

(56) References Cited

U.S. PATENT DOCUMENTS

| | | | | |
|---|---|---|---|---|
| 5,819,273 A | * | 10/1998 | Vora et al. ................ | 707/10 |
| 5,974,445 A | * | 10/1999 | Pivnichny et al. ............ | 709/203 |
| 6,041,324 A | * | 3/2000 | Earl et al. ........................ | 707/9 |
| 6,070,158 A | * | 5/2000 | Kirsch et al. .................... | 707/3 |
| 6,161,102 A | * | 12/2000 | Yanagihara et al. ............. | 707/3 |

(Continued)

FOREIGN PATENT DOCUMENTS
JP    10-01638    4/1998
(Continued)

OTHER PUBLICATIONS

Bar-Yossef, Ziv, et al., "Sic Transit Gloria Telae: Towards an Understanding of the Web's Decay", WWW 2004, New York, NY, May 17-22, 2004, pp. 328-337.*

(Continued)

*Primary Examiner* — Baoquoc N To
(74) *Attorney, Agent, or Firm* — Matthew B. Dernier, Esq.; Gibson & Dernier LLP

(57) ABSTRACT

It is necessary to create a new information search service system for differentiating reliable contents from unreliable contents. An information search provision apparatus for acquiring a search conditional statement, matching the search conditional statement and providing contents, as the search results, comprises: a collecting unit which collects contents to be evaluated, posted on a web page via a network at a predetermined time; and a reliability controlling unit which increases or decreases the reliability degree of the contents to be evaluated, depending on whether the contents to be evaluated were collectable by the collecting unit. Accordingly, the contents to be evaluated may be evaluated in terms of reliability degree, depending on whether it is possible to collect the contents to be evaluated, as a result, reliable contents can be separated from unreliable contents, and is thus an information search service which is highly convenient to users may be provided.

84 Claims, 42 Drawing Sheets

U.S. PATENT DOCUMENTS

| | | | |
|---|---|---|---|
| 6,163,778 A * | 12/2000 | Fogg et al. | 707/10 |
| 6,353,448 B1 * | 3/2002 | Scarborough et al. | 715/744 |
| 6,434,556 B1 * | 8/2002 | Levin et al. | 707/5 |
| 6,547,829 B1 * | 4/2003 | Meyerzon et al. | 715/234 |
| 6,567,103 B1 * | 5/2003 | Chaudhry | 715/738 |
| 6,594,654 B1 * | 7/2003 | Salam et al. | 707/3 |
| 6,631,369 B1 * | 10/2003 | Meyerzon et al. | 1/1 |
| 6,638,314 B1 * | 10/2003 | Meyerzon et al. | 715/234 |
| 6,643,641 B1 * | 11/2003 | Snyder | 707/4 |
| 6,963,867 B2 * | 11/2005 | Ford et al. | 707/3 |
| 6,978,263 B2 * | 12/2005 | Soulanille | 707/3 |
| 7,031,961 B2 * | 4/2006 | Pitkow et al. | 707/4 |
| 7,080,073 B1 * | 7/2006 | Jiang et al. | 1/1 |
| 7,251,654 B2 * | 7/2007 | Eiron et al. | 707/7 |
| 7,299,222 B1 * | 11/2007 | Hogan et al. | 707/3 |
| 7,437,364 B1 * | 10/2008 | Fredricksen et al. | 1/1 |
| 7,574,651 B2 * | 8/2009 | Ebrahimi et al. | 715/243 |
| 7,584,262 B1 * | 9/2009 | Wang et al. | 709/217 |
| 7,725,452 B1 * | 5/2010 | Randall | 707/709 |
| 2002/0016786 A1 * | 2/2002 | Pitkow et al. | 707/3 |
| 2002/0032772 A1 * | 3/2002 | Olstad et al. | 709/224 |
| 2002/0062323 A1 | 5/2002 | Takatori et al. | |
| 2002/0099602 A1 * | 7/2002 | Moskowitz et al. | 705/14 |
| 2002/0129062 A1 * | 9/2002 | Luparello | 707/513 |
| 2002/0156917 A1 * | 10/2002 | Nye | 709/238 |
| 2002/0169764 A1 * | 11/2002 | Kincaid et al. | 707/3 |
| 2003/0050909 A1 * | 3/2003 | Preda et al. | 707/1 |
| 2003/0167263 A1 * | 9/2003 | Sasaki et al. | 707/3 |
| 2003/0204501 A1 * | 10/2003 | Moon | 707/3 |
| 2004/0030741 A1 * | 2/2004 | Wolton et al. | 709/202 |
| 2004/0088241 A1 * | 5/2004 | Rebane et al. | 705/37 |
| 2005/0004889 A1 * | 1/2005 | Bailey et al. | 707/1 |
| 2005/0131872 A1 * | 6/2005 | Calbucci et al. | 707/3 |
| 2005/0131884 A1 * | 6/2005 | Gross et al. | 707/3 |
| 2005/0192936 A1 * | 9/2005 | Meek et al. | 707/3 |
| 2005/0256860 A1 * | 11/2005 | Eiron et al. | 707/4 |
| 2006/0015573 A1 * | 1/2006 | Hurst-Hiller et al. | 709/218 |
| 2006/0053076 A1 * | 3/2006 | Kremen | 705/51 |
| 2006/0200455 A1 * | 9/2006 | Wilson | 707/4 |

FOREIGN PATENT DOCUMENTS

| | | |
|---|---|---|
| JP | 10-91638 | 4/1998 |
| JP | 2001-134529 | 5/2001 |
| JP | 2001-318947 | 11/2001 |
| JP | 2001318947 | 11/2001 |
| JP | 2001337973 A | 12/2001 |
| JP | 2002157271 A | 5/2002 |
| JP | 2003-271610 | 9/2003 |
| JP | 2003256317 A | 9/2003 |
| JP | 2003271610 | 9/2003 |
| JP | 2003-288305 | 10/2003 |
| JP | 2004-029943 | 1/2004 |

OTHER PUBLICATIONS

Merzbacher, Matthew, et al., "Measuring End-User Availability on the Web: Practical Experience", DSN '02, © 2002, pp. 473-477.*

Eiron, Nadav, et al., "Ranking the Web Frontier", WWW 2004, New York, NY, May 17-22, 2004, pp. 309-318.*

Nowell, Lucy Terry, et al., "Visualizing Search Results: Some Alternatives to Query-Document Similarity", SIGIR '96, Zurich, Switzerland, Aug. 18-22, 1996, pp. 67-75.*

Lawrence, Steve, et al., "Accessibility of Information on the Web", intelligence, vol. 11, Issue 1, Spring 2000, pp. 32-39.*

Gibson, David, "Surfing the Web by Site", WWW 2004, New York, NY, May 17-22, 2004, pp. 496-497.*

Yi, Jeonghee, et al., "Using Metadata to Enhance Web Information Gathering", WebDB 200, LNCS 1997, Springer-Verlag, Berlin, Germany, © 2001, pp. 38-57.*

Chakrabarti, Soumen, et al., "Focused Crawling: A New Approach to Topic-Specific Web Resource Discovery", Toronto '99, Elsevier Science, © 1999, pp. 545-562.*

Amitay, Einat, et al., "Automatically Summarising web Sites—Is There a Way Around It?", CIKM 2000, McLean, VA, © 2000, pp. 173-179.*

Thelwall, Mike, "A Comparison of Sources of Links for Academic Web Impact Factor Calculations", Journal of Documentation, vol. 58, No. 1, Feb. 2002, pp. 1-13.*

Eastman, Caroline M., et al., "Coverage, Relevance and Ranking: The Impact of Query Operators on Web Search Engine Results", ACM Transactions on Information Systems, vol. 21, No. 4, Oct. 2003, pp. 383-411.*

Hawking, David, et al., "Measuring search Engine Quality", Information Retrieval, vol. 4 No. 1, Apr. 2001, pp. 33-59.*

Microsoft Computer Dictionary, 4th Edition, Microsoft Press, Redmond, WA, © 1999, pp. 224 and 403-404.*

Bailey, Christopher, et al., "Link Augmentation: A Context-Based Approach to Support Adaptive Hypermedia", OHS/SC/AH 2001, LNCS 2266, Springer-Verlag, Berlin, Germany, © 2002, pp. 239-251.*

Zhu, Xiaolan, et al., "Incorporating Quality Metrics in Centralized/Distributed Information Retrieval on the World Wide Web", Proc. Of the 23rd Annual ACM SIGIR Conf. on R&D in Information Retrieval, Athens, Greece, © 2000, pp. 288-295.*

Ntoulas, Alexandros, et al., "What's New on the Web?: The Evolution of the Web From a Search Engine Perspective", WWW 2004, New York, NY, May 17-22, 2004, pp. 1-12.*

Pretschner, Alexander, et al., "Ontology Based Personalized Search", Proc. Of the 11th IEEE Conf. on Tools with Artificial Intelligence, Chicago, IL, Nov. 9-11, 1999, pp. 391-398.*

Li, Zhao, et al. "OWDEAH: Online Web Data Extraction Based on Access History", DaWaK 2004 (LNCS 3181), Zaragoza, Spain, Sep. 1-3, 2004, pp. 269-278.*

Burden, J. P. H., et al., "WWLib-TNG—New Directions in Search Engine Technology Ref. No. 199/169)", IEE Colloquium, Current Version dtd: Aug. 6, 2002, pp. 10/1-10/8.*

Chinese Office Action for corresponding Chinese application 2005800300132 dated Aug. 8, 2008.

International Preliminary Examination Report of International Application PCT/JP2005/015770.

ISR of PCT/JP05/015770, Oct. 25, 2005, Uetabira et al.

Office Action for corresponding Japanese application 2006-535689 dated Nov. 24, 2010.

Office Action for corresponding Japanese application 2006-535689 dated Aug. 24, 2010.

* cited by examiner

FIG.4

| IP ADDRESS 302 | URL 304 | CONTENTS 306 | WEB PAGE PROVISION START DATE 308 | RELIA-BILITY 310 | RANGE OF INCREASE 312 |
|---|---|---|---|---|---|
| ~ | ~ | ~ | ~ | ~ | ~ |
| 200.100.100.001 | http://~1/ | <HTML><BODY> THIS SITE IS KAGOSHIMA'S | JAN. 1, 2004 | 600 | 5 |
| 200.100.100.002 | http://~2/ | <HTML><BODY> KAGOSHIMA TV'S | JUN. 1, 2004 | 80 | 5 |
| 200.100.100.003 | http://~3/ | <HTML><BODY> WEATHER IN KAGOSHIMA | MAY. 3, 2004 | 60 | 4 |
| ~ | ~ | ~ | ~ | ~ | ~ |

Figure 5:
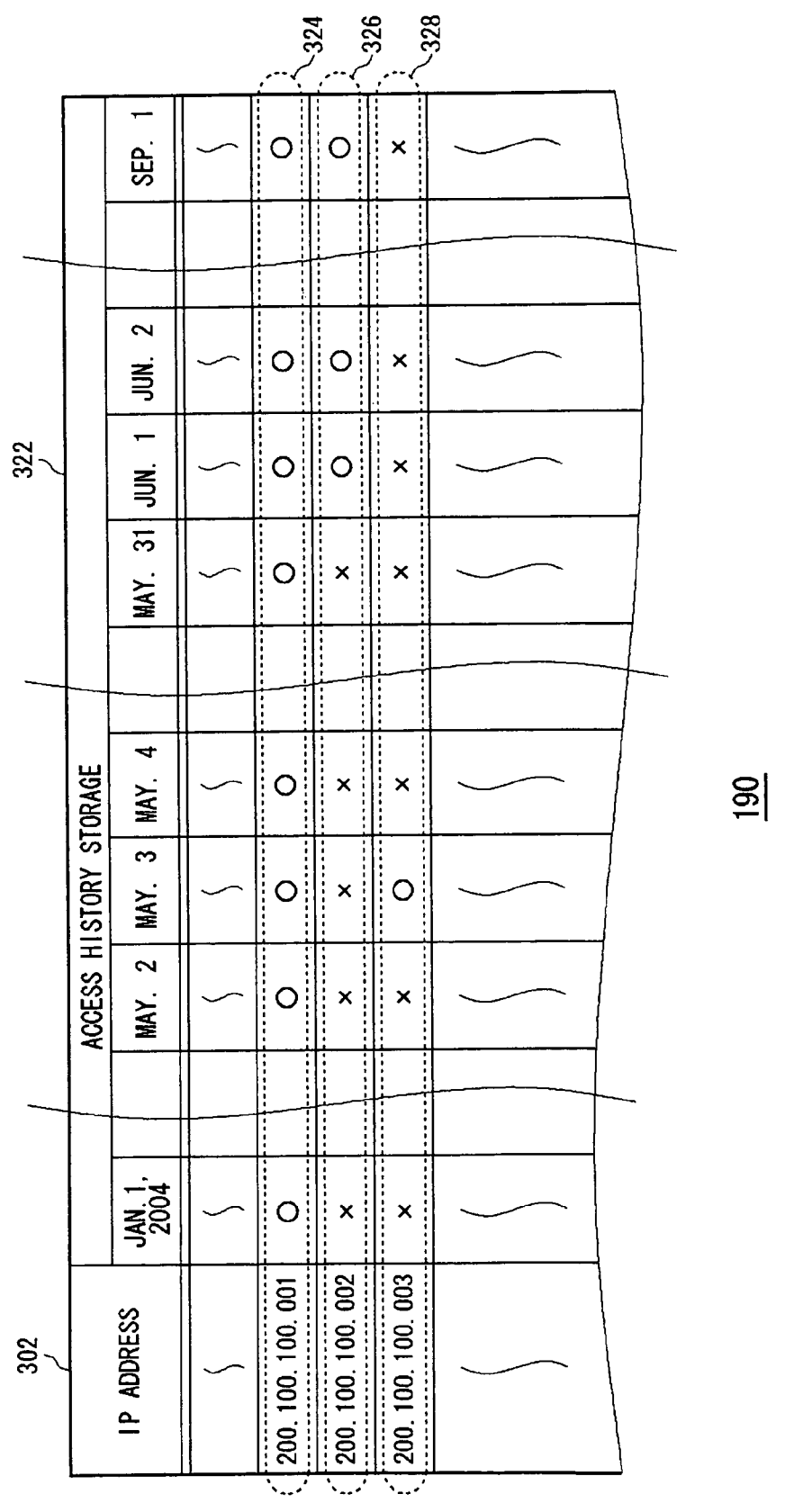

| IP ADDRESS | JAN. 1, 2004 | | MAY. 2 | MAY. 3 | MAY. 4 | | MAY. 31 | JUN. 1 | JUN. 2 | | SEP. 1 |
|---|---|---|---|---|---|---|---|---|---|---|---|
| ~ | ~ | | ~ | ~ | ~ | | ~ | ~ | ~ | | ~ |
| 200.100.100.001 | ○ | | ○ | ○ | ○ | | ○ | ○ | ○ | | ○ |
| 200.100.100.002 | × | | × | × | × | | × | ○ | ○ | | ○ |
| 200.100.100.003 | × | | × | ○ | × | | × | × | × | | × |
| ~ | ~ | | ~ | ~ | ~ | | ~ | ~ | ~ | | ~ |

ACCESS HISTORY STORAGE

FIG.25

| CONTENTS INFORMATION | | | CLIENT INFORMATION (ACCESS HISTORY) | | | | CLIENT INFORMATION (ACCESS HISTORY) | | |
|---|---|---|---|---|---|---|---|---|---|
| IP ADDRESS | URL | CONTENTS | ACCESS TIME/DATE | ACCESS SOURCE IP ADDRESS | BYPASS-ING URL | OS INFOR-MATION | PRODUCT NAME | USER NAME | PURCHAS-ING AMOUNT |
| 200.100.100.001 | http://~1/ | \<HTML>\<BODY> ECONOMIC INFORMATION | 5:36 A.M. JANUARY 1, 2004 | 210.100.100.001 | http://* /b.html | WINDOWS 2000 | A101 | TARO YAMAZAKI | 29,600 YEN |
| 200.100.100.002 | http://~2/ | \<HTML>\<BODY> SIGHTSEEING IN KAGOSHIMA | 9:36 A.M. MARCH 1, 2004 | 145.200.100.001 | http://* /C.html | MAC OS 9 | Q1D | HAJIME TANAKA | 3,200 YEN |
| 302 | 304 | 306 | 550 | 552 | 554 | 556 | 560 | 562 | 568 |

| IP ADDRESS 302 | URL 304 | CONTENTS 306 | WEB PAGE PROVISION START DATE 308 | RELIABILITY DEGREE 310 | RANGE OF INCREASE 312 | TOTAL PURCHASING AMOUNT 570 | TOTAL PRODUCT PROPERTY EVALUATION 572 | REGULAR CUSTOMER FREQUENCY OF USE CONTROLLING UNIT 574 | ASSET VALUE 576 |
|---|---|---|---|---|---|---|---|---|---|
| ∽ | ∽ | ∽ | ∽ | ∽ | ∽ | ∽ | ∽ | ∽ | ∽ |
| 200.100.100.001 | http://~1/ | <HTML><BODY> NEWS | JANUARY 1, 2004 | 600 | 5 | 250,000 YEN | 6 | 20 | 300,000,000 YEN |
| 200.100.100.002 | http://~2/ | <HTML><BODY> ECONOMY | JANUARY 1, 2004 | 300 | 5 | 300 YEN | 3 | 15 | 30,000,000 YEN |
| 200.100.100.003 | http://~3/ | <HTML><BODY> SPORTS | JANUARY 1, 2004 | 300 | 5 | 0 YEN | 0 | 0 | 0 YEN |
| 200.100.100.004 | http://~4/ | <HTML><BODY> TOKYO | FEBRUARY 1, 2004 | 100 | 4 | 0 YEN | 0 | 0 | 0 YEN |
| 200.100.100.005 | http://~5/ | <HTML><BODY> WEATHER | FEBRUARY 1, 2004 | 200 | 4 | 25,500 YEN | 4 | 8 | 255,000,000 YEN |
| 200.100.100.006 | http://~6/ | <HTML><BODY> KAGOSHIMA | MARCH 1, 2004 | 80 | 3 | 0 YEN | 0 | 0 | 0 YEN |
| ∽ | ∽ | ∽ | ∽ | ∽ | ∽ | ∽ | ∽ | ∽ | ∽ |

| IP ADDRESS | URL | CONTENTS | CONTENTS ACQUISITION UNIT |
|---|---|---|---|
| ⋛ | ⋛ | ⋛ | ⋛ |
| 200.100.100.001 | http://~1/a.html | \<HTML\>\<BODY\><br>FEB. 4, A NEW RELEASE OF<br>PRODUCT X, COMPANY A | JAN. 1,<br>2004 |
| 200.100.100.002 | http://~2/b.html | \<HTML\>\<BODY\><br>TOKYO****** | JAN. 2,<br>2004 |
| 200.100.100.003 | http://~3/c.html | \<HTML\>\<BODY\><br>FEB. 4, A NEW RELEASE OF<br>PRODUCT X, COMPANY A | JAN. 2,<br>2004 |
| 200.100.100.004 | http://~1/a.html | \<HTML\>\<BODY\><br>SEPT. 6, ANNOUNCEMENT OF EXPECTED NUMBER OF<br>RECRUITS TO BE HIRED, COMPANY W | FEB. 1,<br>2004 |
| 200.100.100.001 | http://~1/a.html | \<HTML\>\<BODY\><br>FEB. 6, MR. R. KAGOSHIMA'S VISIT | FEB. 1,<br>2004 |
| 200.100.100.006 | http://~6/a.html | \<HTML\>\<BODY\><br>FEB. 4, A NEW RELEASE OF<br>PRODUCT X, COMPANY A | MAR. 1,<br>2004 |
| ⋛ | ⋛ | ⋛ | ⋛ |

| IP ADDRESS 302 | URL 304 | CONTENTS 306 | WEB PAGE PROVISION START DATE 308 | RELIA-BILITY DEGREE 310 | RANGE OF IN-CREASE 312 | CONTENTS ORGANIZER 620 | CONTENTS INFORMATION SOURCE 622 |
|---|---|---|---|---|---|---|---|
| ∽ | ∽ | ∽ | ∽ | ∽ | ∽ | ∽ | ∽ |
| 200.100.100.001 | http://∽1/ | \<HTML\>\<BODY\> NEWS | JAN. 1, 2004 | 600 | 5 | COMPANY A | WEB PAGE |
| 200.100.100.002 | http://∽2/ | \<HTML\>\<BODY\> ECONOMY | JAN. 1, 2004 | 300 | 5 | COMPANY B | WEB PAGE |
| 200.100.100.003 | http://∽3/ | \<HTML\>\<BODY\> SPORTS | JAN. 1, 2004 | 300 | 5 | GROUP X | INDEPENDENT REPORT |
| 200.100.100.004 | http://∽4/ | \<HTML\>\<BODY\> TOKYO | FEB. 1, 2004 | 100 | 4 | MR. C | WEB PAGE |
| 200.100.100.005 | http://∽5/ | \<HTML\>\<BODY\> WEATHER | FEB. 1, 2004 | 200 | 4 | UNIVERSITY D | WEB PAGE |
| 200.100.100.006 | http://∽6/ | \<HTML\>\<BODY\> KAGOSHIMA | MAR. 1, 2004 | 80 | 3 | NEWSPAPER E | INDEPENDENT REPORT |
| ∽ | ∽ | ∽ | ∽ | ∽ | ∽ | ∽ | ∽ |

| 611 EVENT | 612 EVENT ORGANIZER | 613 POSTING OF THE EVENT ORGANIZER'S OWN CONTENT | 614 INDEPENDENT REPORT GENERATED PRIOR TO POSTING IN THE OWN CONTENTS | 615 WEB PAGE GENERATED AFTER HAVING BEEN POSTED ONE'S OWN CONTENT | 616 INDEPENDENT REPORT GENERATED AFTER HAVING BEEN POSTED IN THE CONTENTS |
|---|---|---|---|---|---|
| ~ | ~ | ~ | ~ | ~ | ~ |
| FEB. 4, A NEW RELEASE OF PRODUCT X, COMPANY A | COMPANY A | 1 | | 2 | 5 |
| SEPT. 6, ANNOUNCEMENT OF EXPECTED NUMBER OF RECRUITS TO BE HIRED, COMPANY W | COMPANY W | | 10 | | |
| FEB. 6, MR. R. KAGOSHIMA'S VISIT | COMPANY A | 1 | 5 | 6 | 8 |
| FEB. 15, RELEASE OF THE PRODUCT YYY, COMPANY B | COMPANY B | 1 | | 7 | |
| MAR. 22, ACQUISITION OF COMPANY B, COMPANY R | COMPANY R | 1 | | | |
| ~ | ~ | ~ | ~ | ~ | ~ |

| EVENT | CONTENTS ORGANIZER GENERATING AN EVENT | PUBLIC ANNOUNCE- MENT DATE | MEANS OF PUBLICIZING AN EVENT |
|---|---|---|---|
| ⌇ | ⌇ | ⌇ | ⌇ |
| EXPECTED NUMBER OF RECRUITS TO BE HIRED IS ANNOUNCED TO BE 500 PEOPLE | COMPANY D | FEB. 1, 2004 | EVENT PUBLICIZED WITHOUT POSTING A WEB PAGE |
| MR. Z. KAGOSHIMA'S VISIT | COMPANY E | MAR. 1, 2004 | EVENT PUBLICIZED BY WEB PAGE ONLY |
| ⌇ | ⌇ | ⌇ | ⌇ |

| CONTENTS ID (803) | CONTENTS (804) | REGISTRATION DATE (805) | REGISTRANT (806) | RIGHTS HOLDER (807) |
|---|---|---|---|---|
| ∫ | ∫ | ∫ | ∫ | ∫ |
| 0001 | <HTML><BODY> TITLE OF A NOVEL | JAN. 1, 2004 | A | A |
| 0002 | <HTML><BODY> <IMG SRC="xx.jpg> | JAN. 1, 2004 | B | C |
| ∫ | ∫ | ∫ | ∫ | ∫ |

| 302 | 304 | 306 | 308 | 310 | 312 | 1400 | 1402 | 1404 |
|---|---|---|---|---|---|---|---|---|
| IP ADDRESS | URL | CONTENTS | WEB PAGE PROVISION START DATE | RELIABILITY DEGREE | RANGE OF INCREASE | EXTRACTED DOMAIN NAME | DOMAIN NAME TYPE | RESPONSIBLE ISP |
| ~ | ~ | ~ | ~ | ~ | ~ | ~ | ~ | ~ |
| 200.100.100.001 | http://www.abc.co.jp/a.html | \<HTML\>\<BODY\> NEWS | JAN. 1, 2004 | 600 | 5 | abc.co.jp | co.jp | COMPANY A |
| 200.100.100.002 | http://www.ab123.com/b.html | \<HTML\>\<BODY\> ECONOMY | JAN. 1, 2004 | 300 | 5 | ab123.com | com | COMPANY B |
| 200.100.100.003 | http://www.addbc.com/c.html | \<HTML\>\<BODY\> SPORTS | JAN. 1, 2004 | 300 | 5 | addbc.com | com | COMPANY B |
| 200.100.100.004 | http://www.x12.co.jp/a.html | \<HTML\>\<BODY\> TOKYO | FEB. 1, 2004 | 100 | 4 | x12.co.jp | co.jp | COMPANY C |
| 200.100.100.005 | http://www.bcdef.com/b.html | \<HTML\>\<BODY\> WEATHER | FEB. 1, 2004 | 200 | 4 | bcdef.com | com | COMPANY A |
| 200.100.100.006 | http://www.bcg.jp/a.html | \<HTML\>\<BODY\> KAGOSHIMA | MAR. 1, 2004 | 80 | 3 | bcg.jp | jp | COMPANY A |
| ~ | ~ | ~ | ~ | ~ | ~ | ~ | ~ | ~ |

| IP ADDRESS | EXTRACTED DOMAIN NAME | DOMAIN NAME RELIABILITY TRANSFORM UNIT | ELECTRONIC MAIL ADDRESS RELIABILITY TRANSFORM UNIT | IP ADDRESS RELIABILITY TRANSFORM UNIT |
|---|---|---|---|---|
| ≶ | ≶ | ≶ | ≶ | ≶ |
| 200.100.100.001 | abc.co.jp | 600 | 600 | 600 |
| 200.100.100.002 | ab123.com | 300 | 300 | 300 |
| 200.100.100.003 | addbc.com | 300 | 300 | 300 |
| 200.100.100.004 | x12.co.jp | 100 | 100 | 100 |
| 200.100.100.005 | bcdef.com | 200 | 200 | 200 |
| 200.100.100.006 | bcg.jp | 80 | 80 | 80 |
| ≶ | ≶ | ≶ | ≶ | ≶ |

| DOMAIN NAME TYPE | PURPOSE | NATION |
|---|---|---|
| ⟨ | ⟨ | ⟨ |
| com | COMMERCIAL | U.S. |
| edu | UNIVERSITY | U.S. |
| net | NETWORK MANAGEMENT ORGANIZATION | U.S. |
| co.jp | CORPORATION | JAPAN |
| biz | COMMERCIAL | U.S. |
| jp | GENERAL | JAPAN |
| ⟨ | ⟨ | ⟨ |

1268 1270 1272

1250

INFORMATION SEARCH PROVISION APPARATUS AND INFORMATION SEARCH PROVISION SYSTEM

BACKGROUND OF THE INVENTION

1. Field of the Invention

The present invention relates to an information search provision apparatus and an information search provision system, and particularly relates to an information search provision apparatus and an information search provision system for providing contents such as texts, images, programs, etc., to be posted on a web page on a network such as Internet, as search results.

2. Description of the Related Art

In recent years, as use of the Internet has progressed, the number of WWW (World Wide web) users, the major application thereof, has rapidly increased and the flow of electronic information has becoming extremely active. Accompanying this, a problem of difficulty for users to retrieve truly desired information has emerged due to a dramatic increase in the amount of information. In order to reduce such problems, various search engines came out on networks such as the Internet.

Technology has been disclosed wherein a web page on which the targeted information was found when users performed searches in the past is estimated, and from the estimated results, points are given to the search keywords as well as the URL (Uniform Resource Locator) of the web page, and the presenting order in later searches is determined for search results of contents according to the descending order of points.

[Patent Document 1] Japanese Unexamined Patent Application Publication No. 2004-29943

According to Patent Document 1, the possibility of a web page containing the desired information to be found by the users certainly becomes high. However, when contents posted on a web page is used and if the contents are unreliable contents, it is highly likely that the users suffer from disadvantages. Therefore, it is necessary to create a new information search system to reduce such an inconvenience.

SUMMARY OF THE INVENTION

The present invention has been conducted in view of such an objective, and the purpose of which is to provide an information search provision apparatus and an information search provision system for realizing a new information search service to differentiate reliable contents from unreliable contents.

One embodiment of the present inventions relates to an information search provision apparatus. This information search provision apparatus is an information search provision apparatus for acquiring a search conditional statement and providing contents, matching the search conditional statement, as a search result, and the apparatus comprises: a collection unit which collects contents, to be evaluated, posted on a web page via a network at a predetermined timing; and a reliability control unit which increases or decreases a degree of reliability of the contents to be evaluated, depending on whether it is possible for the collection unit to collect the contents to be evaluated.

According to this embodiment, the contents can be evaluated in terms of reliability, depending on whether it is possible to collect the contents to be evaluated. As a result, reliable contents can be separated from unreliable contents, thus realizing a highly convenient information search service for users.

An information search provision apparatus according to this embodiment may further comprise: a search condition receiving unit which acquires a search conditional statement from a user; a search unit which searches contents matching the acquired search conditional statement; and a reliability presenting unit which presents to the user a degree of reliability of the searched contents. The apparatus may further comprise a prediction unit which predicts the degree of reliability of the contents to be evaluated, based on an element contributed to estimating a duration of contents contained in the contents to be evaluated, wherein the reliability presenting unit may present the predicted reliability to the user.

The reliability control unit may gradually increase the degree of reliability of the contents to be evaluated, in a period of time during which the contents to be evaluated is acquired continuously at a predetermined timing by the collection unit. For example, suppose that the contents to be evaluated had been collected by the collection unit after the first timing and thereafter the contents to be evaluated have not been collected by the collection unit since the second timing and thereafter the contents to be evaluated have been collected by the collection unit since the third timing. Then, an increase range controlling unit may control the increase range in a manner that the increase range of reliability of the contents to be evaluated at the third timing is lower than that at the first timing.

An information search provision apparatus according to this embodiment may further comprise a history increase range controlling unit which controls an increase range in the degree of reliability of the contents to be evaluated, according to a history on whether it is possible to collect the contents to be evaluated. The apparatus may further comprise a relationship determining unit which determines the presence or absence of a relationship between highly reliable contents and the contents to be evaluated, wherein the reliability control unit may control in a manner that an increase range of the contents to be evaluated when the presence of a relation is determined by the relationship determining unit is set higher than that when the absence thereof is determined.

Based on whether or not related information indicative of the presence of a relationship between highly reliable contents and the contents to be evaluated is contained in the contents to be evaluated, the relationship determining unit may determine the presence or absence of a relationship between highly reliable contents and the contents to be evaluated. Based on whether or not related information indicative of the presence of a relationship between highly reliable contents and the contents to be evaluated is contained in the highly reliable contents, the relationship determining unit may determine the presence or absence of a relationship between highly reliable contents and the contents to be evaluated.

Another embodiment of the present inventions relates also to an information search provision apparatus. This information search provision apparatus is an information search provision apparatus for acquiring a search conditional statement and providing contents, matching the search conditional statement, as a search result, and the apparatus comprises: a collection unit which collects contents, to be evaluated, posted on a web page via a network at a predetermined timing; a comparison unit which compares the collected contents to be evaluated with next collected contents, to be evaluated, posted on the same web page; an update determining unit which determines if the contents to be evaluated has been updated or not, based on a result of the comparison; and a reliability control unit which increases or decreases a degree of reliability of the contents to be evaluated according to a result of the determination by the update determining unit.

The reliability control unit may gradually increase the degree of reliability of the contents to be evaluated, in a period of time during which it is determined continuously at a predetermined timing that the contents to be evaluated is updated by the update determining unit. The apparatus may further comprise an update analysis unit which analyzes whether an update of the contents is primarily required or not, and the reliability control unit may increase or decrease the degree of reliability of the contents to be evaluated, according to results of the update determining unit and the update analysis unit.

Still another embodiment of the present invention relates also to an information search provision apparatus. This information search provision apparatus is an information search provision apparatus for acquiring a search conditional statement and providing contents, matching the search conditional statement, as a search result, and the apparatus comprises: a related-contents acquisition unit which acquires contents related to contents to be evaluated; an element extraction unit which extracts an element contributing to increase or decrease in a degree of reliability of the contents to be evaluated, by referring to the acquired contents; and a reliability control unit which increases or decreases the degree of reliability of the contents to be evaluated, by referring to the extracted element.

In terms of each aspect in evaluating the degree of reliability, the element extraction unit may extract an element contributing to increase or decrease in the degree of reliability of the contents to be evaluated, and the reliability control unit may increase or decrease the degree of reliability of the contents to be evaluated, by referring to the element extracted in terms of the each aspect in evaluating the degree of reliability.

An information search provision apparatus according to this embodiment may further comprise a classifying unit which classifies each extracted element into a first group containing elements that contribute to the increase in the degree of reliability of the contents to be evaluated or a second group containing elements that contribute to the decrease in the degree of reliability of the contents to be evaluated, and wherein when the number of elements in the first group classified by the classifying unit is greater than that in the second group, the reliability control unit may increase the degree of reliability of the contents to be evaluated.

Still another embodiment of the present invention relates also to an information search provision apparatus. This information search provision apparatus is an information search provision apparatus for acquiring a search conditional statement and providing contents, matching the search conditional statement, as a search result, and the apparatus comprises: a contents acquisition unit which acquires contents containing an item to be assessed; a contents specifying unit which specifies own contents serving as an information source of the item to be assessed; a consistency determining unit which determines consistency of the item to be assessed in a manner that the specified own contents is compared with contents, in the acquired contents, other than the own contents; and a reliability control unit which increases or decreases a degree of reliability of the own contents and a degree of reliability of the other contents, according to the decision made by the consistency determining unit.

An information search provision apparatus according to this embodiment may be such that when both the degree of reliability of the own contents and the degree of reliability of the other contents are high and the presence of consistency of the item to be assessed is determined by the consistency determining unit, the reliability control unit may increase both the degree of reliability of the own contents and the degree of reliability of the other contents.

The above-described information search provision apparatus may further comprise: an access unit which accesses a server by referring to location information indicative of a location of the server open to the public through a web page; an access determining unit which determines if an access of the access unit to the server is allowed or not; an access history storage which stores correspondence between a decision result by the access determining unit and timing at which the access unit has accessed the server; and a timing specifying unit which specifies timing at which the access of the access unit to the server was first successful, by referring to the correspondence, wherein the reliability control unit may start performing a control of increasing or decreasing the degree of reliability at the specified timing.

Still another embodiment of the present invention relates to an information search provision system. This information search provision system is an information search provision system which includes a terminal apparatus connected on a network, a server for providing a web page via the network and an information search provision apparatus for collecting contents posted on a web page on the server and providing contents, matching a search conditional statement, among the collected contents as a search result to the terminal apparatus, and the information search provision apparatus comprises: a collection unit which collects contents, to be evaluated, posted on a web page via the network at a predetermined timing; and a reliability control unit which increases or decreases a degree of reliability of the contents to be evaluated, depending on whether it is possible to collect the contents to be evaluated.

Still another embodiment of the present invention relates also to an information search provision system. This information search provision system comprises: a contents providing apparatus which posts contents to be evaluated, on a web page; a terminal apparatus which accesses the contents to be evaluated, via a network; and an information search provision apparatus which acquires a search conditional statement and provides contents, matching the search conditional statement, as a search result; wherein the terminal apparatus includes an information transmitting unit which transmits client information associated with the terminal apparatus, and wherein the information search provision apparatus includes: an information receiver which receives directly or indirectly client information transmitted from the terminal apparatus that has accessed via the network the contents to be evaluated; and a reliability varying unit which increases or decreases a degree of reliability of the contents to be evaluated, based on the client information.

Still another embodiment of the present invention relates to an information search provision apparatus. This information search provision apparatus is an information search provision apparatus for acquiring a search conditional statement and providing contents, matching the search conditional statement, as a search result, and the apparatus includes: an information receiver which receives directly or indirectly client information transmitted from a terminal apparatus that has accessed the contents to be evaluated; and a reliability varying unit which increases or decreases a degree of reliability of the contents to be evaluated, based on the client information.

Still another embodiment of the present invention relates to an information search provision system. This information search provision system comprises: a contents providing apparatus which posts contents to be evaluated, on a web page; a terminal apparatus which accesses the contents to be evaluated, via a network; and an information search provision apparatus which acquires a search conditional statement and provides contents, matching the search conditional statement, as a search result, wherein the terminal apparatus includes an information transmitting unit which transmits client information associated with the terminal apparatus, and wherein the information search provision apparatus includes an information receiver which receives directly or indirectly client information transmitted from the terminal apparatus that has accessed via the network the contents to be evaluated; and an asset value varying unit which increases or decreases an asset value estimated for the contents to be evaluated, based on the client information.

Still another embodiment of the present invention relates to an information search provision apparatus. This information search provision apparatus is an information search provision apparatus for acquiring a search conditional statement and providing contents, matching the search conditional statement, as a search result, and the apparatus includes: an information receiver which receives directly or indirectly client information transmitted from a terminal apparatus that has accessed the contents to be evaluated; and an asset value varying unit which increases or decreases an asset value estimated for the contents to be evaluated, based on the client information.

Still another embodiment of the present invention relates to an information search provision apparatus. This information search provision apparatus is an information search provision apparatus for acquiring a search conditional statement and providing contents, matching the search conditional statement, as a search result, and the apparatus comprises: a collection unit which collects contents to be evaluated and contents, other than said evaluating contents, for use in comparison both posted on a web page via a network at a predetermined timing; an update determining unit which acquires respectively publication circumstances of a decision item involving a provider of the contents to be evaluated, about the contents to be evaluated and the comparing contents and determines if the contents to be evaluated is properly updated, by comparing the publication circumstance of a decision item in the contents to be evaluated with that in the comparing contents; and a reliability control unit which increases or decreases a degree of reliability of the contents to be evaluated, according to a result obtained from the update determining unit.

Still another embodiment of the present invention relates to an information search provision apparatus. This information search provision apparatus is an information search provision apparatus for acquiring a search conditional statement and providing contents, matching the search conditional statement, as a search result, and the apparatus comprises: a collection unit which collects contents, to be evaluated, posted on a web page via a network at a predetermined timing; an identity determining unit which determines the identity of the contents, to be evaluated, collected at different timings; and a reliability control unit which increases or decreases a degree of reliability of the contents to be evaluated, according to a result obtained from the identity determining unit.

Still another embodiment of the present invention relates to an information search provision apparatus. This information search provision apparatus is an information search provision apparatus for acquiring a search conditional statement and providing contents, matching the search conditional statement, as a search result, and the apparatus comprises: a collection unit which collects contents to be evaluated and contents, other than said evaluating contents, for use in comparison both posted on a web page via a network at a predetermined timing; a uniqueness determining unit which compares the contents to be evaluated with the comparing contents which had already been collected at the time of collection of the contents to be evaluated and determines uniqueness of the contents to be evaluated; and a reliability control unit which increases or decreases a degree of reliability of the contents to be evaluated, according to a result obtained from the uniqueness determining unit.

It is to be noted that any arbitrary combination or rearrangement of the above-described structural components and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 4 is a diagram showing one example of the data structure of searched information files to be stored in a search information storage;

FIG. 5 is a diagram showing one example of the data structure of access history files stored in an access history storage;

FIG. 25 is a diagram showing one example of the data structure of received information stored in the received information storage related to Embodiment 9;

FIG. 26 is a diagram showing one example of the data structure of searched information files stored in the search information storage related to Embodiment 9;

FIG. 29 is a diagram showing one example of the data structure of searched information files stored in the acquired contents information storage related to Embodiment 10;

FIG. 30 is a diagram showing one example of the data structure of received information stored in the search information storage related to Embodiment 10;

FIG. 31 is a diagram showing one example of the data structure of searched information files stored in the event storage related to Embodiment 10;

FIG. 32 is a diagram showing one example of the data structure stored in the requested information storage related to Embodiment 10;

FIG. 35 is a diagram showing one example of comparing the contents of an information file stored in a contents comparison storage;

FIG. 37 is a diagram showing one example of the data structure of searched information files stored in the search information storage;

FIG. 39 is a diagram showing one example of a table of various degrees of reliability stored in the location information reliability storage;

FIG. 42 is a diagram showing one example of a Domain Name Type table.

DETAILED DESCRIPTION OF THE INVENTION

Embodiment 1

Figure 1:
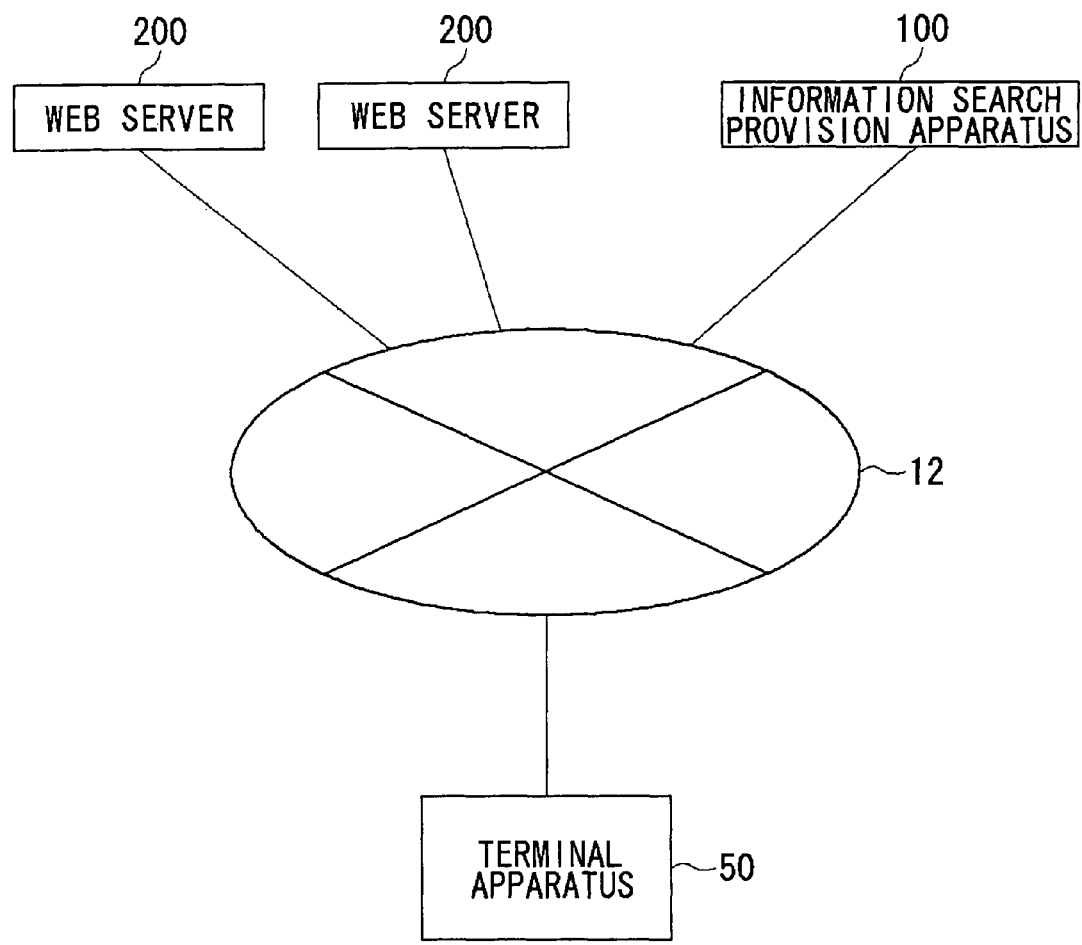
FIG. 1 is a diagram showing the configuration of an information search provision system related to Embodiment 1.

FIG. 1 shows the configuration of an information search provision system 10 related to the present embodiment. The information search provision system 10 shown in FIG. 1 comprises an information search provision apparatus 100, a web server 200, and a network 12. To the network 12, the information search provision apparatus 100, web server 200, and terminal apparatus 50 are connected. Although the network 12 related to the present embodiment is a WAN (Wide Area Network), as with other examples, it may also be, such as a LAN (Local Area Network) or a communication network to send/receive given data, complying with communication standards such as TCP/IP (Transmission Control Protocol/Internet Protocol), etc. The terminal apparatus 50 is a personal computer, PDA (Personal Digital Assistance), or a mobile phone, or alternatively, an information search provision apparatus 100 or web server 200 is installed on a personal computer, etc. The web server 200 publishes contents posted on a web page via a network 12. "Contents" indicates electronically presentable data such as text data, video data, moving picture data, audio data, and the like.

Users access to the information search provision apparatus 100 to conduct a search by designating a search conditional statement using a WWW browser (not illustrated) to be installed on the terminal apparatus 50. The information search provision apparatus 100 extracts contents matching the search conditional statement and information associated with the contents (hereinafter referred to as "contents-associated information") from the large volume of information contained in the database (not illustrated) in FIG. 1, upon receiving the search execution indicated by the search conditional statement, and provides a list of the search results to the terminal apparatus 50. Then, the reliability degree of the contents is further presented. The contents-associated information includes the URL of a web page, the size of the contents, the date on which the contents will be updated, and the title of the contents, etc. Moreover, the large volume of contents contained in a database is regularly or irregularly collected from web pages by the collection controlling unit (not illustrated) in FIG. 1 on the information search provision apparatus 100.

Figure 2:
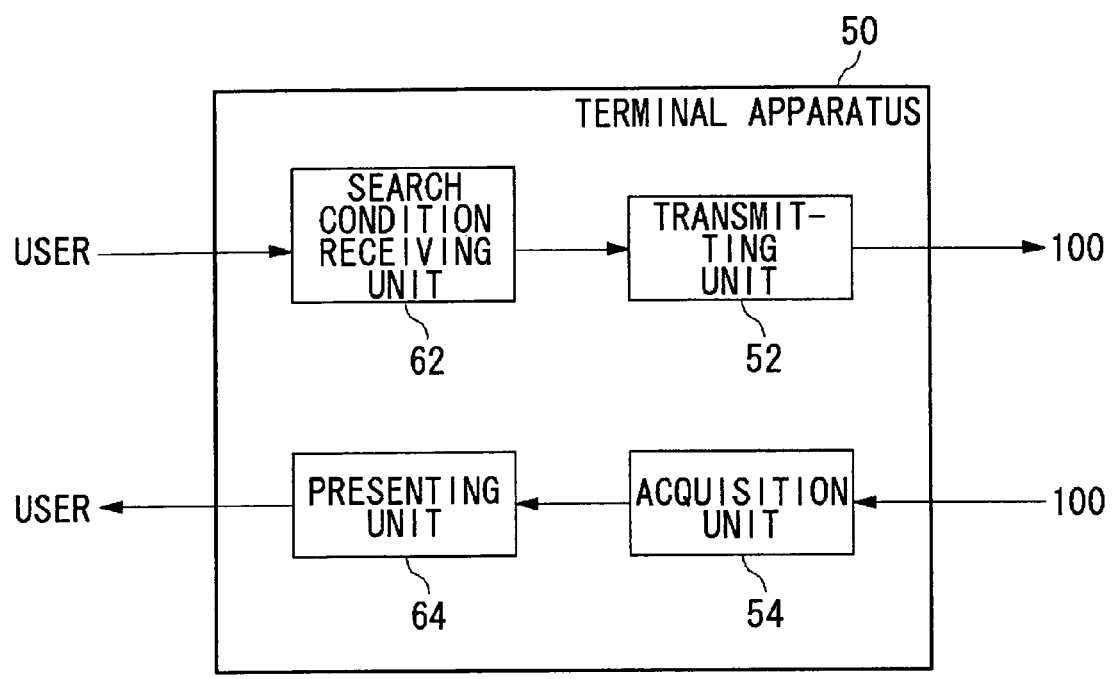
FIG. 2 is a diagram showing the configuration of a terminal apparatus related to Embodiment 1.

FIG. 2 shows the configuration of a terminal apparatus 50 related to the present embodiment. The terminal apparatus 50 comprises a search condition receiving unit 62, a transmitting unit 52, an acquisition unit 54, and a presenting unit 64. The search condition receiving unit 62 acquires data entered by a user-herein the search conditional statement-via a keyboard, mouse, and other peripheral apparatus. The search conditional statement may be in the form of a keyword unit, such as "beef," "dish," "recipe," etc., or may also be in the form of a natural sentence, such as "I would like to know the recipe for a beef dish."

The transmitting unit 52 sends the search conditional statement from the user acquired by the search condition receiving unit 62 to the information search provision apparatus 100 via the network 12. Then, the search process is performed by the information search provision apparatus 100. The acquisition unit 54 acquires contents matching the search conditional statement and contents-associated information, such as the size of the contents and a list of URLs, via the network 12. Then, the reliability degree of the contents is further presented. The presenting unit 64 formats the information acquired by the acquisition unit 54 to be displayed to the user via a display (not illustrated). Moreover, the user may also be notified by voice via a speaker (not illustrated).

Figure 3:
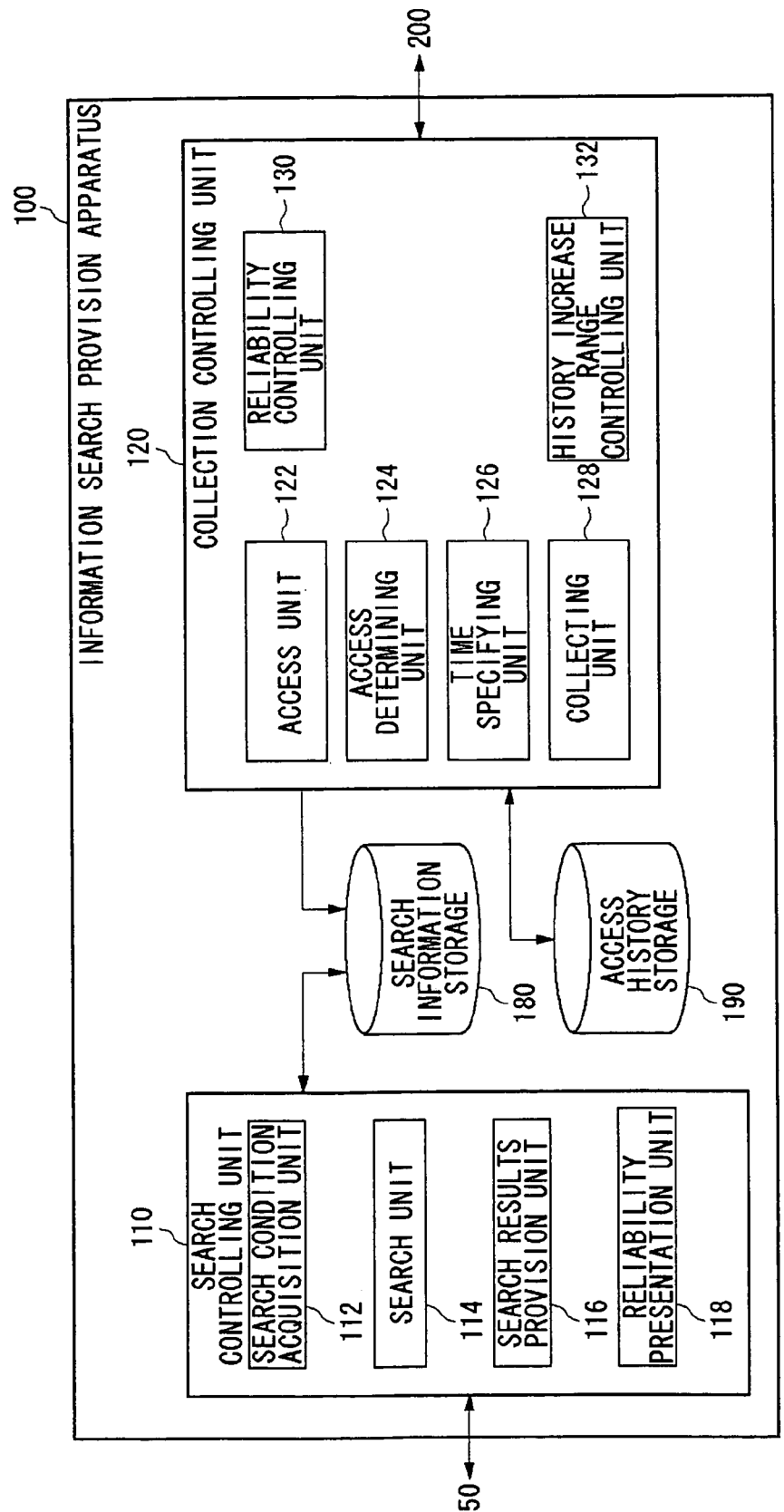
FIG. 3 is a diagram showing the configuration of an information search provision apparatus related to Embodiment 1.

FIG. 3 shows the configuration of an information search provision apparatus 100 related to the present embodiment. The information search provision apparatus 100 comprises a search controlling unit 110 that searches contents matching the search conditional statement designated by the user and provides the same as search results to the terminal apparatus 50, a collection controlling unit 120 that regularly or irregularly collects contents posted on web pages on the web server 200, a search information storage 180 that contains collected contents, and an access history storage 190 that contains the access history to the web server from the collection controlling unit 120. The search controlling unit 110 comprises a search condition acquisition unit 112, a search unit 114, a search results provision unit 116, and a reliability presentation unit 118. The collection controlling unit 120 comprises an access unit 122, an access determining unit 124, a time specifying unit 126, a collecting unit 128, a reliability controlling unit 130, and a history increase range controlling unit 132.

Each configuration element of the information search provision apparatus 100 is realized by the CPU (Central Processing Unit), the memory, and other elements of a given computer in terms of hardware components, and by a program, etc., having an information search, a collection function, a storage function, and other functions loaded into the memory as software. However, herein, function blocks realized by the collaboration of these are illustrated. Therefore, it is understandable among those in the industry that these function blocks may be realized solely by the hardware or the software, or in various forms depending on the combination of these.

The search condition acquisition unit 112 acquires a search conditional statement from a user that has been sent by the transmitting unit 52. Then, if the search conditional statement is in the form of a natural sentence, the search condition acquisition unit 112 may send the search conditional statement to a keyword extracting unit (not illustrated). Then, the keyword extracting unit will break down the search conditional statement into morphemes (In particular, nouns are extracted as keywords such as "beef," "dish," "recipe," etc.), using examples from previous search conditional statements, and the search condition acquisition unit 112 acquires the combination of these keywords as a new search conditional statement.

The search unit 114 searches contents that match the search conditional statement acquired in the search condition acquisition unit 112, the reliability degree of the contents, or contents-associated information, from searched information files stored in the search information storage 180. Then, the search unit 114 may perform a search using what is known as an index file, or in other words, files containing index words with respect to the contents stored in the search information storage 180. Accordingly, a speedy search may be accomplished. The search results provision unit 116 provides a list of information obtained from a search as the search results to the terminal apparatus 50. Then, the reliability presentation unit 118 presents, to the terminal apparatus 50, the reliability degree to be described later of the searched contents. Accordingly, users are able to ascertain the extent of the reliability degree of the contents.

The access unit 122 accesses the web server 200 by referring to location information indicating the location of the web server 200, such as an IP address, contained in access history files in the access history storage 190 to be described later. As another example, the access unit 122 may access a web page by referring to the URL or domain name of the web page. The access unit 122 related to the present embodiment is presumed to access every IP address, including unused IP addresses, contained in the access history files, once a day, such as at 12:00 A.M., following that order. Furthermore, the frequency of accesses by the access unit 122 may be "twice a day" or even "once every two days"—not limited to "once a day." Access by the access unit 122 may be irregular instead of regular.

The access determining unit 124 determines whether access by the access unit 122 to a particular web page was possible. Then, when it is determined that access was not possible, the access determining unit 124 sets an "x" flag in the column of the present date in the Access History column to be described later, under the IP address. Alternatively, when it is determined that access by the access unit 122 was possible, the access determining unit 124 sets an "o" flag in the column of the present date in the Access History column to be described later, under the IP address.

The time specifying unit 126 specifies the time at which access by the access unit 122 to the web page first became possible, by referring to the access history files. More specifically, the time specifying unit 126 regards the date when "x" in the past access history until then first switched to "o" as the web page provision start date. The time specifying unit 126 sets the present date in the column of the web page provision start date to be described later, when it is determined that the present date is equivalent to the web page provision start date. When the web page already exists on the network 12 and an access was made by the access unit 122 later, the time specifying unit 126 may determine that the date when an access was made is equivalent to the web page provision start date.

Meanwhile, in recent years, the shortage of IP addresses has been a problem, accompanied by the increase of servers connected to the Internet. According to the present embodiment, unused IP addresses may be specified by regarding IP addresses with an "x" flag for an extended period of time as being unused. Consequently, if the third-party organizations, etc., managing IP addresses provide their unused IP addresses to information providers who wish to acquire other IP addresses, the IP addresses may more effectively be used.

The access history storage 190 contains access history files including correspondence between a determination by the access determining unit 124 and the time at which the access unit 122 has accessed the web page. As many IP addresses as possible existing on a network 12 are presumed to be held in the access history files. Needless to say, some IP addresses may be retained, or possibly none. The search information storage 180 contains searched information files containing contents collected by the collecting unit 128 to be described later, contents-associated information, and degrees of reliability, etc.

The collecting unit 128 collects the contents to be evaluated, posted on a web page at a predetermined time-herein once a day-when it is determined by the access determining unit 124 that access to the web page was possible. Furthermore, when an access is made using an IP address or a domain name by the access unit 122, the collecting unit 128 may collect the contents to be posted on all the web pages on the web server. In the event of collecting contents, the collecting unit 128 generates contents-associated information of the collected contents, to be held in the search information storage 180. If meta tags are stated in the header of the HTML (Hyper Text Markup Language) sentence within the contents, such as between <HEAD> and </HEAD>, the collecting unit 128 may follow the contents of an indication described in the area surrounded by the meta tag. In other words, if a registration into the information search provision apparatus 100 is clearly stated as unnecessary, the collecting unit 128 does not have to collect information of the page.

The reliability controlling unit 130 increases or decreases the reliability degree of the contents to be evaluated at a predetermined time—herein once a day—depending on whether it was possible for the collecting unit 128 to collect the contents to be evaluated. More specifically, when it was possible to collect the contents to be evaluated from a web page, the reliability controlling unit 130 increases the reliability degree that has been set for the contents to be evaluated, by a predetermined range of increase. Alternatively, when the collecting unit 128 was unable to collect the contents to be evaluated from the web page, the reliability degree that has been set for the contents to be evaluated is decreased. Moreover, from the web page provision start date, the reliability controlling unit 130 starts controlling the increase or decrease of the reliability degree of the contents to be posted on a web page.

Furthermore, the reliability controlling unit 130 gradually increases the reliability degree of the contents to be evaluated, during a period of time in which it continues to be possible to collect, by the collecting unit 128, the contents to be evaluated at a predetermined time. Moreover, in the present embodiment, the reliability degree of contents is increased or decreased, which is essentially the same as increasing or decreasing the reliability degree of the web page posting the contents and the reliability degree of the web server that publishes the web page or of the information provider running the web server. Furthermore, this is essentially the same as increasing or decreasing the reliability degree of various other service-providing servers included in a computer system provided by the information provider running a web server, such as a mail server, an FTP (File Transfer Protocol) server, or a news server, etc.

According to the information search provision apparatus 100 related to the present embodiment, by setting the reliability degree for contents, it becomes possible to present, to users, the extent of the reliability degree of the contents. Consequently, the users are able to easily ascertain the reliability degree of the contents through information search services provided by the information search provision apparatus 100. For example, when dealing with other corporations, one company may wish to know the background of the other party. On such an occasion, the reliability degree of a web page provided by the corporation may be found through the search results from an information search provision apparatus 100. When dealing with overseas corporations, this is especially significant, as there are many occasions on which the background of the other party is not known compared to cases with domestic corporations. Furthermore, because the request from a credit agency for a credit check of the other party in the transaction, for investigating the credit of that corporation, may be eliminated, effort and cost may be reduced.

According to the information search provision apparatus 100 in the present embodiment, as contents are continuously posted on a web page, the reliability degree is increased. Therefore, as a web server 200 provides a web page stably over a long period of time, a higher reliability degree can be set. Suppose that a web page is, for example, the page for a shopping mall providing Internet shopping services; if the reliability degree of the contents posted on the web page is high, users are able to ascertain that the provider providing the web page has been continuously running its business stably for a long time. On the other hand, if the reliability degree is low, the provider of the web page may have just started business, or it may be highly likely that the dealer unscrupulously continues to move the company's web page.

According to the information search provision apparatus 100 in the present embodiment, by differentiating reliable contents from unreliable contents, based on the reliability degree to be presented to users, the users may select only contents having a high reliability degree from among the search results. Accordingly, the users are able to use services provided by reputable dealers by selecting contents having a high reliability degree. Consequently, the information search provision apparatus 100 is capable of accomplishing services that are particularly convenient for users.

A history increase range controlling unit 132 controls the range of increase in the reliability degree of contents to be evaluated, according to the history of whether it was possible for the collecting unit 128 to collect the contents to be evaluated. For example, if the contents to be evaluated were first collected by the collecting unit 128 after "Jan. 1, 2004," and then the contents to be evaluated were not collected by the collecting unit 128 after "Feb. 1, 2004," and further, the contents to be evaluated were collected by the collecting unit 128 after "Mar. 1, 2004," the history increase range controlling unit 132 controls the range of increase of the reliability degree of the contents to be evaluated on "Mar. 1, 2004" in a manner in which it is set lower than the range of increase of the reliability degree of the contents to be evaluated on "Jan. 1, 2004." Furthermore, the history increase range controlling unit 132 may, after a certain period of time, lower the range of increase of the reliability degree of contents that have been controlled to the range of increase estimated when it was not low. More specifically, the reduced range of increase as of "Mar. 1, 2004" may also be added to the range of increase for the current reliability degree, a year later, on "Mar. 1, 2005."

Accordingly, the range of increase of the reliability degree of a web page from which contents have continued to be collectable for a long period of time becomes greater than the range of increase of the reliability degree of a web page from which the contents have become no longer collectable in the process. Thus, the range of increase for both may be differentiated. Consequently, the importance of continuously providing contents can be more evident.

FIG. 4 shows an example of the data structure of searched information files to be stored in a search information storage 180. The searched information file in FIG. 4 includes an IP Address column 302, a URL column 304, a Contents column 306, a Web Page Provision Start Date column 308, a Reliability column 310, and a Range of Increase column 312. Contents collected by the collecting unit 128 are stored in the Contents column 306, and the URLs, as part of the contents-associated information, are stored in the URL column 304.

The IP Address column 302 includes an IP address for the web server 200 to be connected to the network 12. Although the IP addresses stored in the IP Address column 302 in FIG. 4 are in IPv4 format, as another example, IPv6 format may be acceptable. The URL column 304 comprises what is known as a URL, or in other words, information indicating the location of a web page on the network 12. The Contents column 306 includes contents collected by the collecting unit 128, and text data written in HTML (Hyper Text Markup Language) in FIG. 4. The Web Page Provision Start Date column 308 includes the date when the web server 200 began providing a web page. The Reliability column 310 includes the reliability degree of contents to be posted on a web page. The Range of Increase column 312 includes the range of increase of the reliability degree.

For example, with regard to data 314, it is shown therein that the IP address of the web server 200 is "200.100.100.001"; the URL of the web page on the web server 200 is "http://–1"; the web page provision start date is "Jan. 1, 2004"; the current reliability degree of the contents is "600"; and the range of increase of the reliability degree is "5." In other words, it is indicated that the reliability degree of the contents to be posted on the web page having a URL of "http://-1/" is increased by "5" once a day herein at a predetermined time within the period during which the contents are posted on the web page.

FIG. 5 shows an example of the data structure of access history files stored in the access history storage 190. For the same configuration as in FIG. 4, the same symbols are given, and the explanations are omitted as appropriate. The data table in FIG. 5 includes an IP Address column 302 and an Access History column 322. The Access History column 322 contains information indicating whether it was possible for the access unit 122 to access a web server 200, as the access history. More specifically, if an "o" flag is stored on a particular date, the date indicates that access to the web page was possible, but if an "x" flag is stored, access to the web page was not possible.

In FIG. 5, for convenience, the display of access history for the period of "January 2" through "May 1," "May 5" through "May 30," and "June 3" through "August 31" is omitted. However, the access history during the respective period is presumed keep the flag value of the day before the beginning date of the respective period. Furthermore, in FIG. 5, although the access history from "Jan. 1, 2004" to the present date "Sep. 1, 2004" is shown, needless to say, the Access History column 322 may also include access history prior to "Dec. 31, 2003."

For example, with regard to the first data 324, it is shown that the IP address of the web server 200 is "200.100.100.001," and it has been possible for the access unit 122 to access the web page from "January 1" to the present date "September 1." In other words, it is indicated that, during that period, the web server 200 has continuously provided the web page. Alternatively, with regard to the second data 326, it is shown that access to the web page was not possible until "May 31," but since "June 1," access to the web page has been possible. In other words, it is indicated that provision of the web page on the web server 200 with an IP address of "200.100.100.002" began on "June 1." Furthermore, according to the third data 328, the web server 200 with an IP address of "200.100.100.003" began providing the web page on "May 3," but the web page has not been provided since "May 4." Moreover, the date from which to begin increasing/decreasing the reliability degree would be "June 1", in example of the second data 326.

Figure 6:
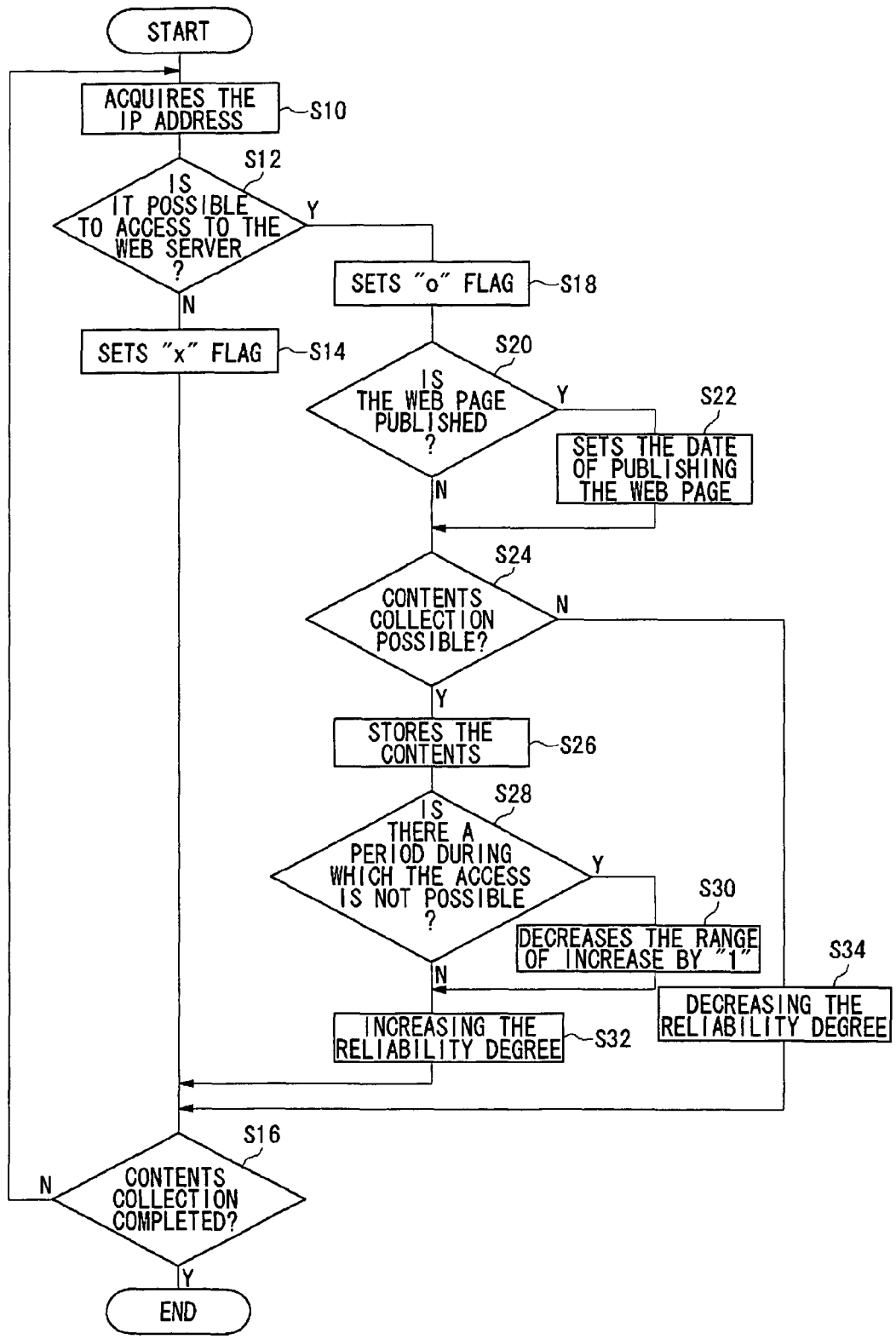
FIG. 6 is a diagram showing the flow of the contents collection process related to Embodiment 1.

The FIG. 6 shows the flow of the contents collection process related to the present embodiment. An information search provision apparatus 100 performs the following contents collection process once a day with respect to all of the IP addresses stored in the access history files. The access unit 122 acquires the IP address (S10) of the web server 200 that is the target of collection of contents from access history files stored in the access history storage 190, and accesses the web server 200. The access determining unit 124 determines whether access by the access unit 122 to the web server 200 was possible, and sets an "x" flag (S14) in the column for the present date in the Access History column 322 under the IP address, when it is determined that access was not possible (S12—N).

The access determining unit 124 sets an "o" flag in a column of the present date in the Access History column 322 under the IP address (S18), when it is determined that access by the access unit 122 was possible (S12—Y). The time specifying unit 126 sets the present date in the Web Page Provision Start Date column 308, when it is determined that the present date is regarded as a web page provision start date (S20—Y), by referring to the access history files. The time specifying unit 126 skips an action to set the present date in the web page provision start date 308, when it is determined that the present date is not regarded as a web page provision start date (S20—N).

When it was possible for the collecting unit 128 to collect contents with the IP address posted on a web page on a web server (S24—Y), the collecting unit 128 stores the contents in the Contents column 306 in a searched information file (S26). Then, the contents-associated information are also stored. The history increase range controlling unit 132 decreases the range of increase by "1" (S30), when it is determined that access by the access unit 122 was not possible on the day before the present date (S28—Y), by referring to the access history files, while the reliability controlling unit 130 increases the current reliability degree of the contents by the range of increase (S32). When the history increase range controlling unit 132 determines that access by the access unit 122 was not possible on the day before the present date, by referring to the access history files (S28—N), the reliability controlling unit 130 increases the current reliability degree of the contents by the range of increase (S32).

When the collection of contents posted on a web page of the IP address was not possible by the collecting unit 128 (S24—N), the reliability controlling unit 130 decreases the current reliability degree of the contents (S34). The collection controlling unit 120 determines whether the contents collection process has finished with respect to the entire IP addresses in the access history files, and when there is any IP address therein, the contents collection process has not been finished yet (S16—N), then the contents collection process is performed with respect to the IP address. If finished, the information search provision apparatus 100 finishes the contents collection process on the day (S16—Y).

Figure 7:
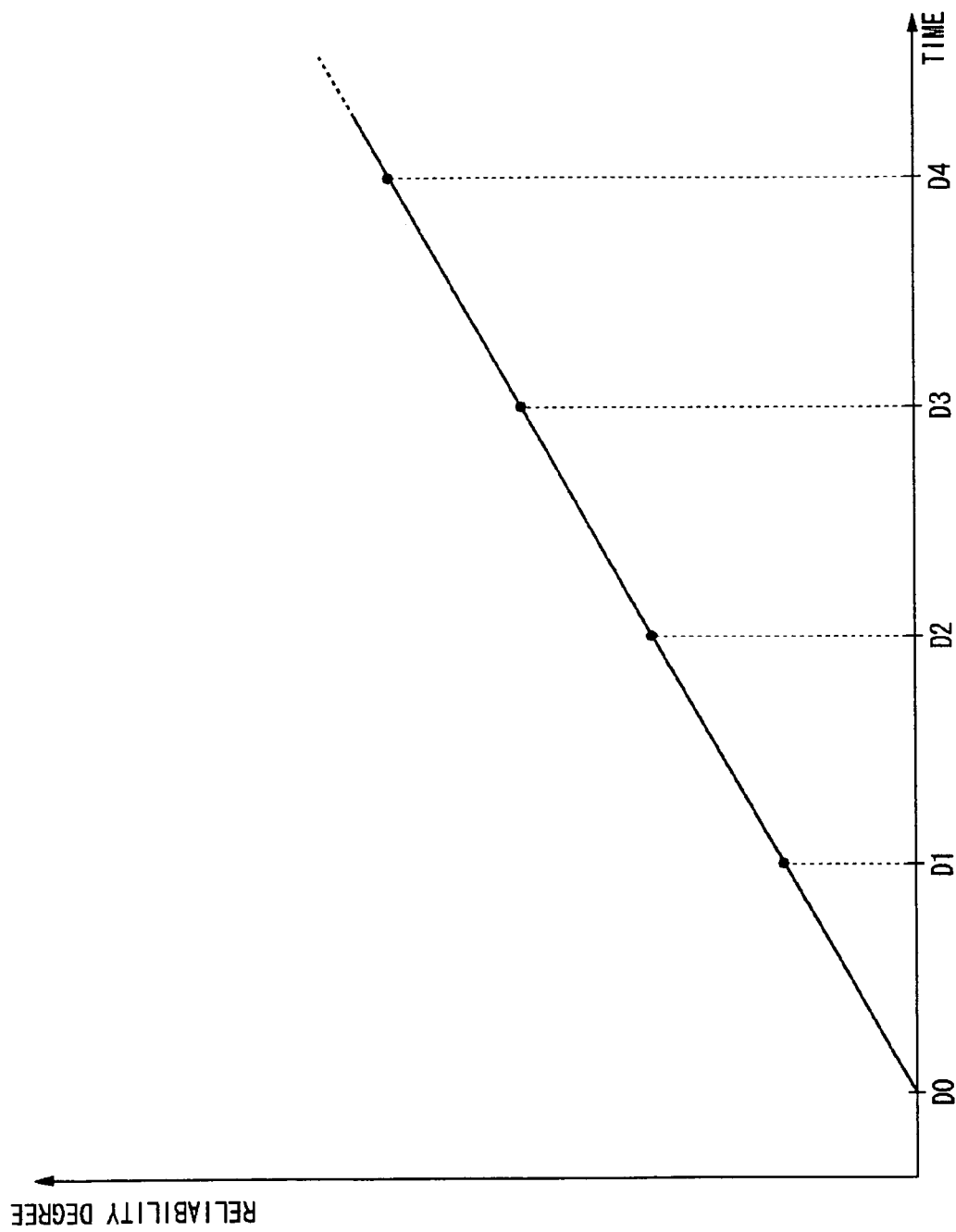
FIG. 7 is a diagram showing the relation between the reliability degree of the contents to be evaluated and the time when the contents continue to be collectable.

FIG. 7 shows the relation between the reliability degree of the contents to be evaluated and the time, when the contents to be evaluated is continuously collectable. The vertical axis indicates the reliability degree of the contents, and the horizontal axis indicates the time. The date D0 in FIG. 7 is a web page provision start date, the dates after the given date are indicated as date D1 through D4 as the days pass. In the present embodiment, as time passes, the reliability degree of contents fluctuates, the degree of actual reliability is represented as a discrete value. However, needless to say, it is also presumable that the reliability degree continuously changes as time elapses, the situation is shown in FIG. 7. As illustrated, the reliability degree of the contents to be evaluated gradually increases in the period during which the contents to be evaluated are continuously collectable by a collecting unit 128, or in other words, in the period after the date D1.

Figure 8:
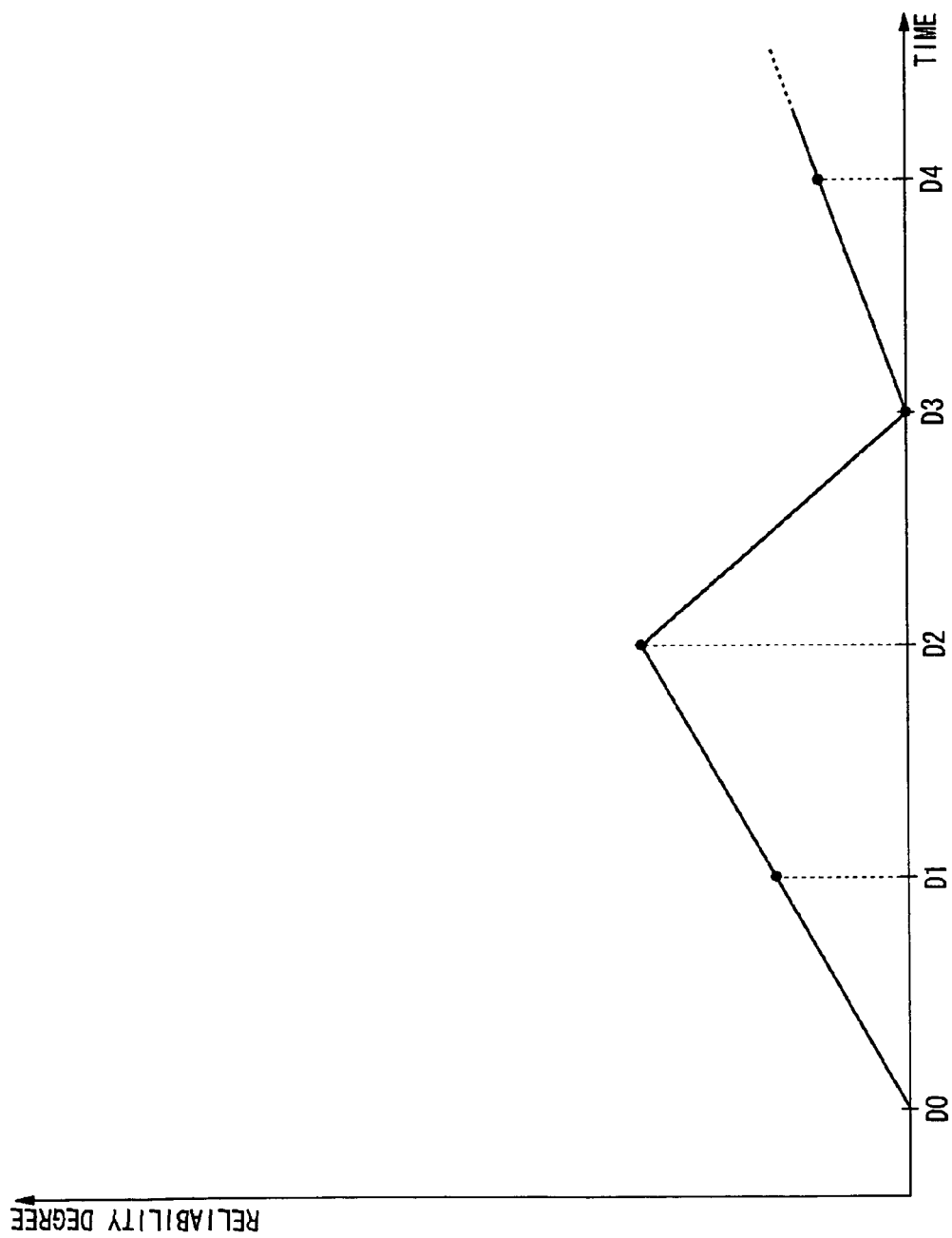
FIG. 8 is a diagram showing the relation between the reliability degree of the contents to be evaluated and the time when the contents are no longer collectable in the process.

FIG. 8 shows the relation between the reliability degree of the contents to be evaluated and the time when the contents became no longer collectable in the process. The vertical axis indicates the reliability degree of the contents, and the horizontal axis indicates a time. For those that are the same as in FIG. 7, the same symbols are given and the explanations are omitted as appropriate. In FIG. 8, the changing state of the reliability degree is shown: on the date D0 the web page provision began and thereafter the collection of the contents posted on the web page has been possible; and after the date D2 it was not possible to collect the contents; and the collection of contents became possible again after the date D3; the period during which the contents are collectable, or in other words, in the period between the date D0 and the date D2, and during the period after the date D3. Although the reliability degree of the contents has been gradually increased by the reliability controlling unit 130, the range of increase of the reliability degree in the latter period is controlled to be smaller than the range of increase of the reliability degree in the former period by a history increase range controlling unit 132.

Embodiment 2

Figure 9:
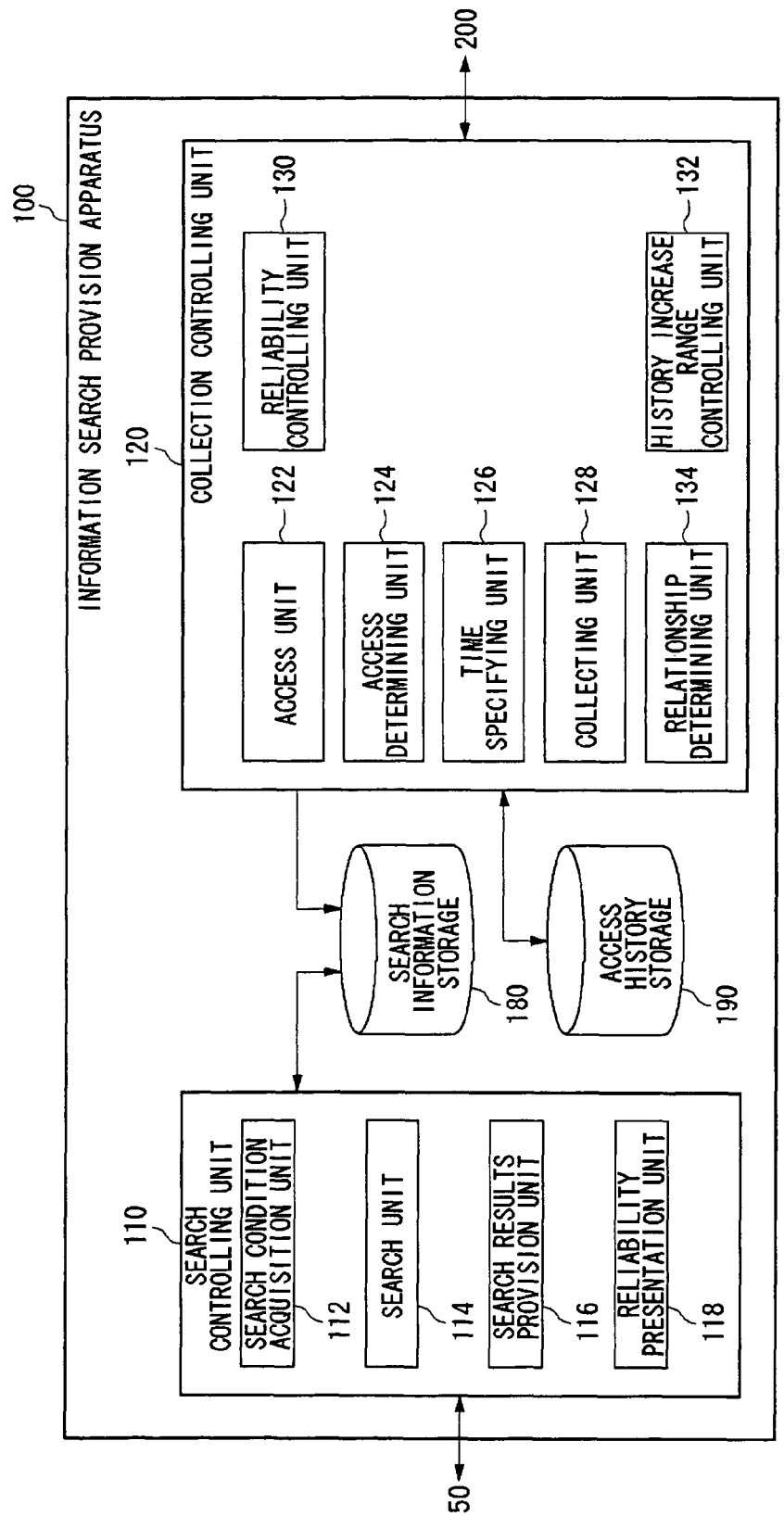
FIG. 9 is a diagram showing the configuration of an information search provision apparatus related to Embodiment 2.

In Embodiment 1, depending on whether it was possible to collect the contents to be evaluated, the reliability degree of the contents is increased or decreased. In Embodiment 2, in addition to results of the possibility/impossibility of collection, the result of the presence or absence of a relationship between the contents to be evaluated and contents having a high reliability degree is reflected by increasing or decreasing the reliability degree of the contents to be evaluated. FIG. 9 shows the configuration of an information search provision apparatus 100 related to Embodiment 2. For the same configuration as in FIG. 3, the same symbols are given and the explanations are omitted as appropriate. The information search provision apparatus 100 related to Embodiment 2 is further equipped with a relationship determining unit 134 that is a different configuration element from the information search provision apparatus 100 related to Embodiment 1 shown in FIG. 3.

The relationship determining unit 134 determines the presence or absence of a relationship between the contents to be evaluated and contents having a high reliability degree, based on whether related information indicating the presence of the relationship between the contents to be evaluated and the contents having a high reliability degree is contained in the contents having a high reliability degree. Then, to take an example, the relationship determining unit 134 determines related information, such as a link from the contents having a high reliability degree to the contents to be evaluated, is contained in the contents having a high reliability degree. More specifically, the relationship determining unit 134 determines whether the URL of the contents to be evaluated is contained in a tag "–" of <A HREF="–"> that is, contained in the contents having a high reliability degree. As another example, the relationship determining unit 134 determines whether a link from the contents to be evaluated, the URL of the web page on which the contents to be evaluated are posted, or the name of the information provider of the web page, are found in the Office Information column, an Introductory Information column, a Related Information column, and a Reference Information column, etc., belonging to the contents having a high reliability degree. Then, the information is acquired from searched information files by the relationship determining unit 134.

The reliability controlling unit 130 controls the range of increase of the reliability degree of the contents to be evaluated when the presence of the relationship is determined by the relationship determining unit 134 in a manner in which it is set higher than the range of increase of the reliability degree of the contents to be evaluated when the absence of the relationship is determined. Accordingly, the reliability degree of the contents to be evaluated may be differentiated, according to the case of whether a link to the contents to be evaluated is available in a highly reliable web page.

Among multiple sets of contents having a high reliability degree, if there are URLs that match the URL of the contents to be evaluated, the reliability controlling unit 130 may increase the range of increase of the reliability degree by the number of matching contents having a high reliability degree. For instance, within three sets of contents having a high reliability degree, if there are URLs matching the URL of the contents to be evaluated, "3" is further added to the current range of increase of the contents to be evaluated. Accordingly, as more links from contents having a high reliability degree to the contents to be evaluated become available in greater number of sets of contents having a high reliability degree, the range of increase of the reliability degree may be greater.

Furthermore, among multiple sets of contents having a high reliability degree, if a link from the contents to be evaluated, the URL of the web page on which the contents to be evaluated is posted, or the name of the information provider of the web page are included in the Office Information column, the Introductory Information column, the Related Information column, and the Reference Information column, in the contents, the reliability controlling unit 130 may increase the range of increase of the reliability degree of the contents to be evaluated by the number of sets of contained contents having a high reliability degree. For example, if the number of sets of contained contents having a high reliability degree is two, "2" is further added to the current range of increase of the contents to be evaluated.

As information providers of contents having a high reliability degree are third parties from a view point of information providers of the contents to be evaluated, in general, the information providers of the contents to be evaluated may not be able to arbitrarily change the contents having a high reliability degree. Therefore, if a link from contents having a high reliability degree to the contents to be evaluated, or information introducing the contents to be evaluated, etc., are posted in the contents having a high reliability degree, that fact has to be respected. As described above, the reliability controlling unit 130 in the present embodiment controls the range of increase of the reliability degree in cases in which the above links or information are posted in a manner in which it is set higher than the range of increase of the reliability degree in cases in which they are not posted, in order to differentiate them.

Figure 10:
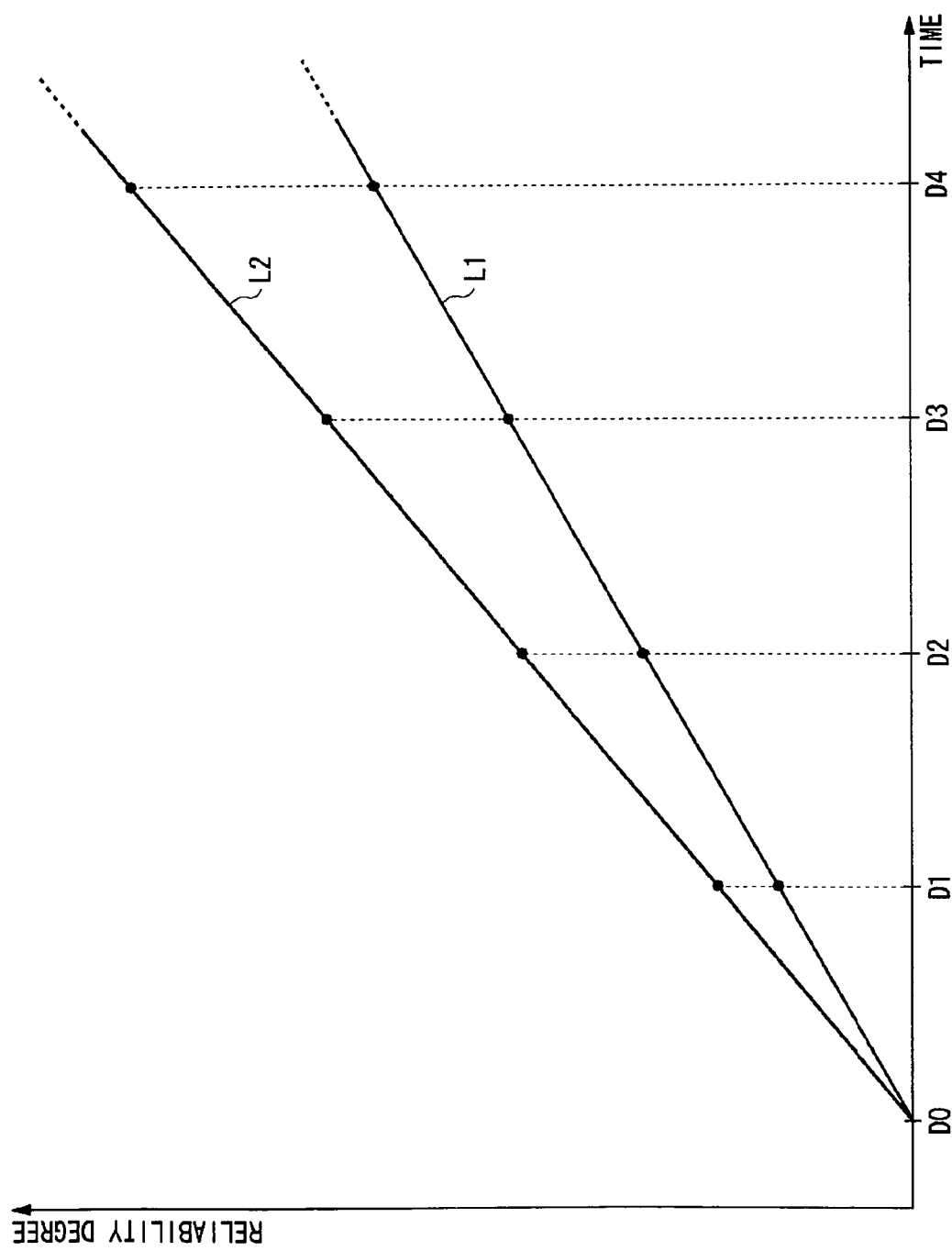
FIG. 10 is a diagram showing the relation between the reliability degree of the contents to be evaluated and the time.

FIG. 10 shows the relation between the reliability degree of the contents to be evaluated and the time. The vertical axis indicates the reliability degree of the contents, and the horizontal axis indicates the time. For those that are the same as in FIG. 7, the same symbols are given and the explanations are omitted as appropriate. In FIG. 10, the solid line L1 indicates a changing state of the reliability degree of the contents to be evaluated in a case in which there is no link to the contents to be evaluated in contents having a high reliability degree, whereas the solid line L2 indicates a changing state of the reliability degree of the contents to be evaluated in a case in which there is a link to the contents to be evaluated in contents having a high reliability degree, from the day after it has been determined, by the relationship determining unit 134 on the date D0, that a relationship exists. The range of increase of the reliability degree in the case of the solid line L2 is greater than the range of increase of the reliability degree in case of the solid line L2, so the solid line L2 exceeds the reliability degree of the solid line L1.

Embodiment 3

Figure 11:
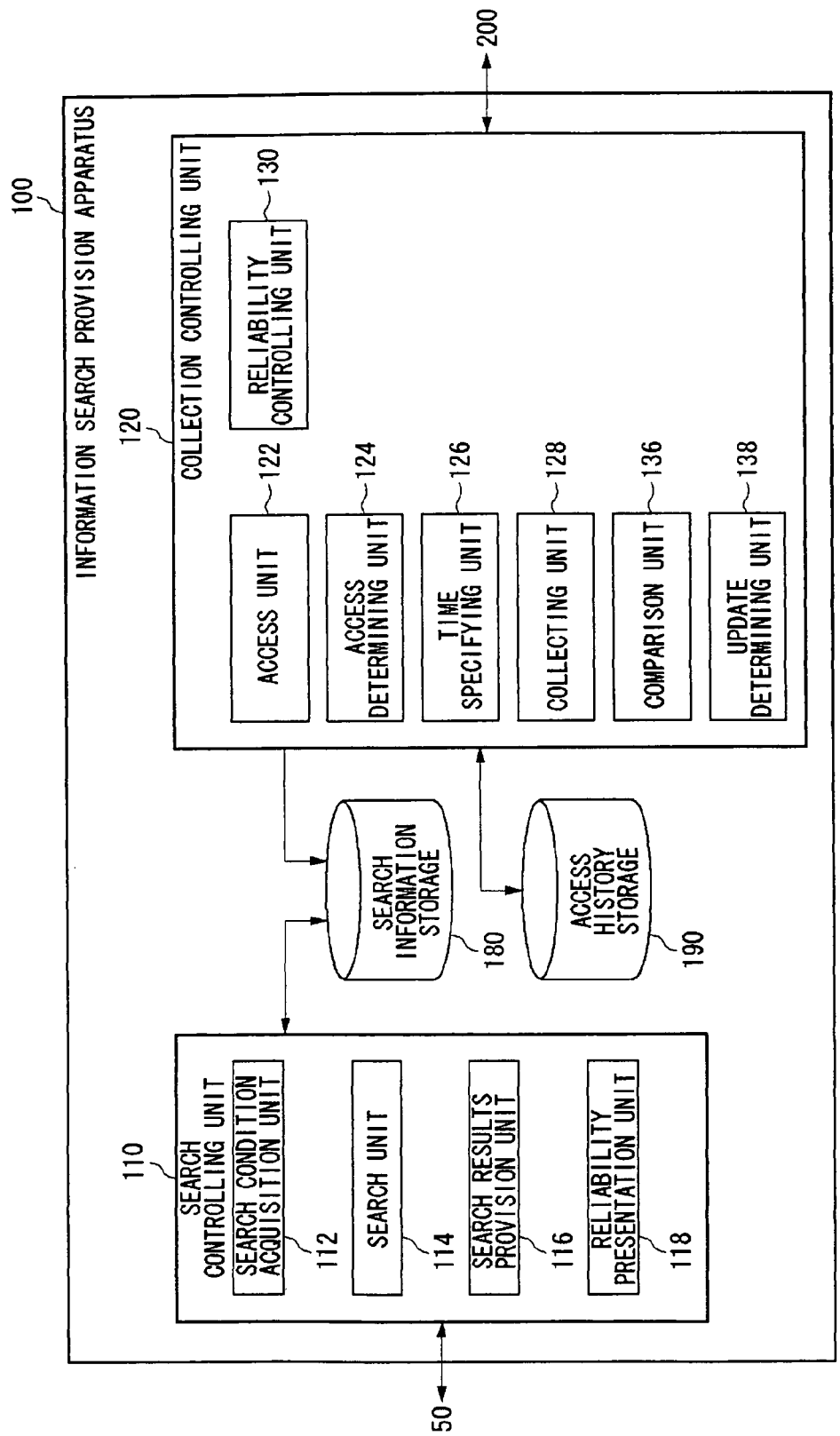
FIG. 11 is a diagram showing the configuration of an information search provision apparatus related to Embodiment 3.

In Embodiment 1, depending on the possibility/impossibility of collection of the contents to be evaluated, the reliability degree of the contents is increased or decreased. In Embodiment 3, the reliability degree of the contents is increased or decreased depending on whether the contents have been updated. FIG. 11 shows the configuration of an information search provision apparatus 100 related to Embodiment 3. For the same configuration as in FIG. 3, the same symbols are given and the explanations are omitted as appropriate. The information search provision apparatus 100 related to Embodiment 3 is further equipped with a comparison unit 136 and an update determining unit 138 as new configuration elements, in place of a history increase range controlling unit 132 of the information search provision apparatus 100 related to Embodiment 1 shown in FIG. 3.

The comparison unit 136 compares the contents to be evaluated, collected by a collecting unit 128 with next the contents to be evaluated, to be collected from and posted on the same web page. In comparison, the comparison unit 136 refers to, for example, HTML language structure, text, images, or programs, etc., contained in both sets of contents. The comparison unit 136 may internally comprise a displacement analysis unit (not illustrated), which analyzes the amount of displacement of HTML language structure, text, images, or programs, etc. The comparison unit 136 may compare proprietary information to the web page, such as the corporation name, address, and telephone number. When the corporation name, address, or telephone number posted on the previously collected contents have been changed without reason in the next collected contents, the reliability controlling unit 130 reduces the reliability degree of the contents.

The update determining unit 138 determines whether the contents to be evaluated have been updated, based on results of comparison by the comparison unit 136. Then, the update determining unit 138 determines that the contents to be evaluated have been updated when there are differences of, for example, more than a predetermined number of letters contained among the previously collected contents and the next collected contents. Furthermore, even if the difference is a single letter, the contents may be determined to have been updated.

To take HTML language structure as another example, if a tag located in a specific position in the previously collected contents to be evaluated has been replaced with another tag, or if a new tag has been inserted as an addition, the update determining unit 138 may determine that the contents to be evaluated have been updated. To take images as a further example, when the photograph of a person in the contents is changed from ten years ago, it may be determined that no update has been made. As a further example, when there has been a break in text posted in a journal of contents, or when no countermeasure has been taken for the inappropriate use of a bulletin board, the update determining unit 138 may determine that the contents to be evaluated has not been updated.

The reliability controlling unit 130 increases or decreases the reliability degree of the contents to be evaluated according to a decision made by the update determining unit 138 at a predetermined time-herein once a day. In other words, when the update determining unit 138 determines that the contents to be evaluated have been updated, and if the contents to be evaluated have been updated, the reliability degree of the contents is gradually increased, once a day, during a period in which such determination is continuous. Alternatively, when the update determining unit 138 determines that the contents to be evaluated has not been updated, and if the contents to be evaluated have not been updated, the reliability degree of the contents is gradually decreased, once a day, during a period in which such determination is continuous.

According to the information search provision apparatus 100 related to the present embodiment, as more updates are made regularly in contents to be posted on a web page, it is more likely that the reliability degree increases. By presenting the reliability degree of contents to users, the users are able to easily ascertain the extent of the reliability degree of the contents. For instance, users can shop comfortably from web pages of an Internet shopping service that have a high reliability degree. Alternatively, the web page provider may get involved in an active update on a regular basis, in order to enhance the reliability degree of their own contents. Thus, it is more likely that the web pages existing on a network over all are to be further updated, leading to the activation of the entire Internet.

Figure 12A:
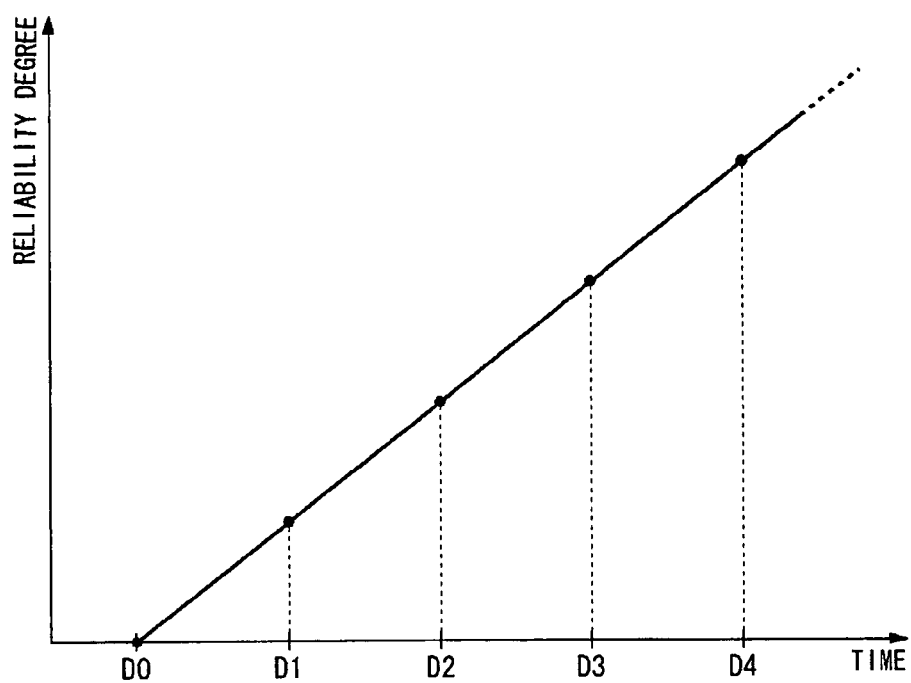
FIG. 12A shows the relation between the reliability degree and the time when the contents to be evaluated continue to be updated and FIG. 12B shows the relation between the reliability degree and the time when the contents to be evaluated are no longer being updated.
Figure 12B:
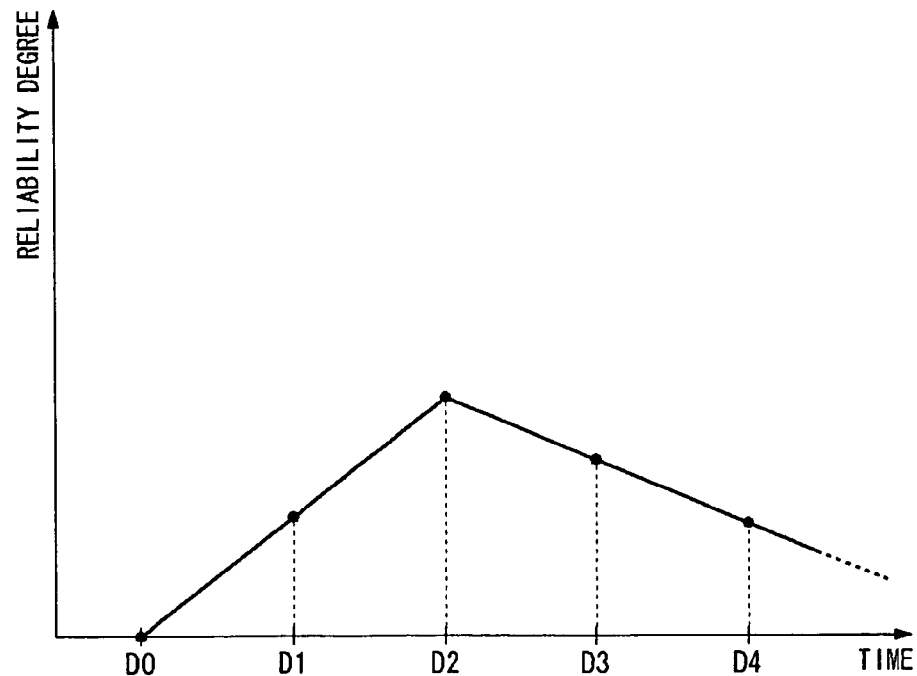

FIG. 12A shows the relation between the reliability degree and the time when the contents to be evaluated continues to be updated. FIG. 12B shows the relation between the reliability degree and the time when the contents to be evaluated are no longer updated in the process. The vertical axis indicates the reliability degree of the contents, and the horizontal axis indicates a time. For those that are the same as in FIG. 7, the same symbols are given and the explanations are omitted as appropriate. In FIG. 12A, the reliability degree in the figure has been gradually increasing, as the contents have continued to be updated everyday since the date D0. Alternatively, in FIG. 12B, during the period from date D0 through date D2, the contents have been updated every day. However, since date D2, the reliability degree has been gradually decreasing, as the contents are no longer being updated.

Embodiment 4

Figure 13:
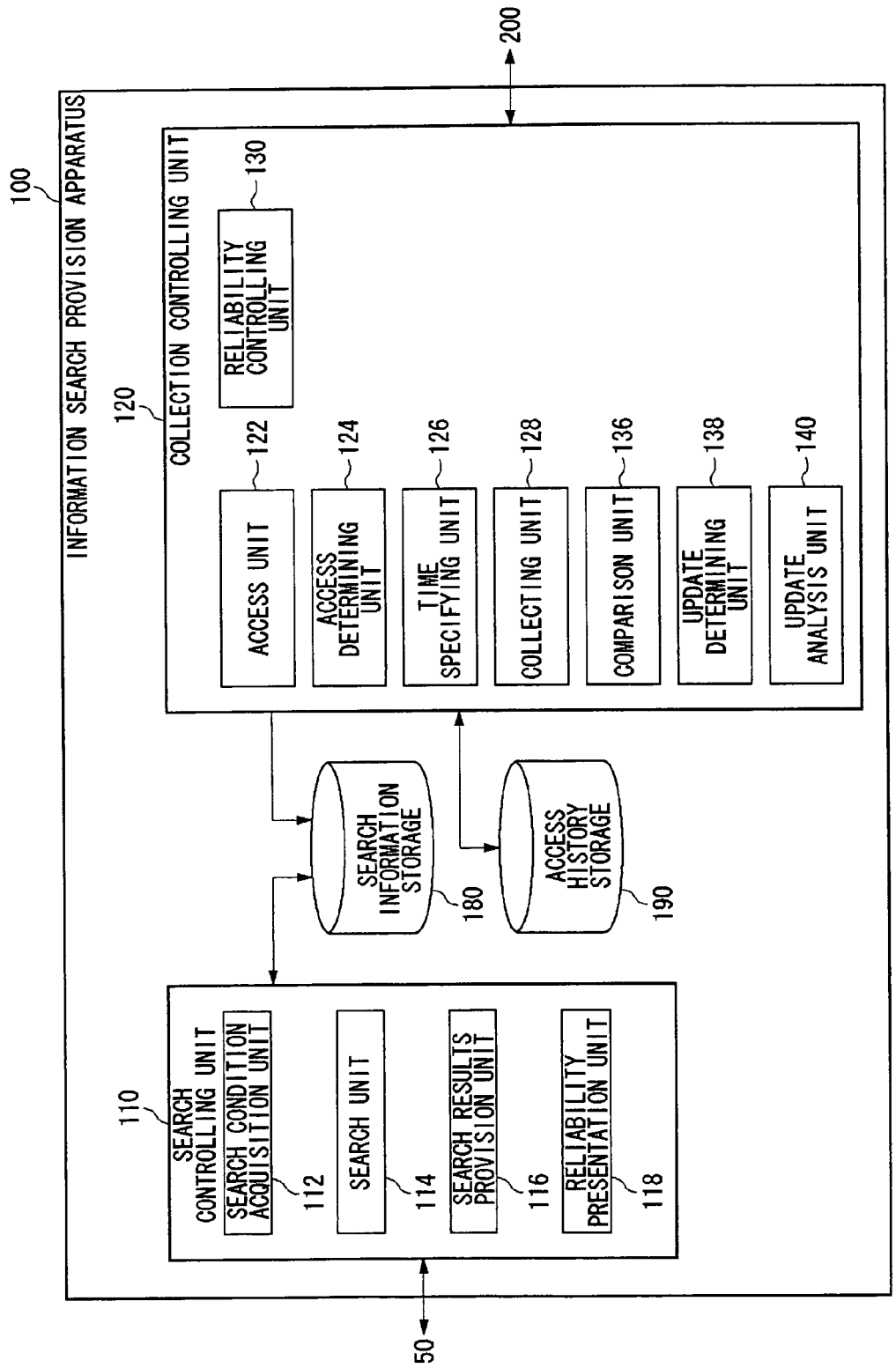
FIG. 13 is a diagram showing the configuration of an information search provision apparatus related to Embodiment 4.

In Embodiment 3, depending on whether the contents have been updated, the reliability degree of the contents is increased or decreased. In Embodiment 4, in addition to the result of whether the contents have been updated, analysis results of whether an update of the contents is primarily required is reflected to increase or decrease the reliability degree of the contents to be evaluated. FIG. 13 shows the configuration of an information search provision apparatus 100 related to the present Embodiment 4. For the same configuration as in FIG. 11, the same symbols are given and the explanations are omitted as appropriate. In addition to the information search provision apparatus 100 related to Embodiment 3 shown in FIG. 11, the information search provision apparatus 100 related to Embodiment 4 is further equipped with an update analysis unit 140 as a new configuration element.

The update analysis unit 140 refers to the contents to be evaluated that have been collected by a collecting unit 128 and analyzes whether an update of the contents is primarily required. More specifically, the update analysis unit 140 classifies the contents to be evaluated into either "a group primarily requiring updates" or "a group primarily not requiring updates". "A group primarily requiring updates" is a group of contents that would become significant by frequently updating the information, including contents such as breaking news, weather, or diary. Alternatively, "a group primarily not requiring updates" is a group of contents that would become significant by not updating the information, including providing contents such as a politician's claims or the basic management policy of a company.

More specifically, if a keyword such as "news" or "weather" that would become significant by frequent updates is contained in contents, the update analysis unit 140 classifies the contents into "a group primarily requiring updates." Alternatively, if a keyword such as "claim" or "basic policy" that would become significant without an update is contained in contents, the contents are classified into "a group primarily not requiring updates." Keywords for classifying contents into these groups provision apparatus 100 related to Embodiment 4 is further equipped with an update analysis unit 140 as a new configuration element.

The update analysis unit 140 refers to the contents to be evaluated that have been collected by a collecting unit 128 and analyzes whether an update of the contents is primarily required. More specifically, the update analysis unit 140 classifies the contents to be evaluated into either "a group primarily requiring updates" or "a group primarily not requiring updates". "A group primarily requiring updates" is a group of contents that would become significant by frequently updating the information, including contents such as breaking news, weather, or diary. Alternatively, "a group primarily not requiring updates" is a group of contents that would become significant by not updating the information, including providing contents such as a politician's claims or the basic management policy of a company.

More specifically, if a keyword such as "news" or "weather" that would become significant by frequent updates is contained in contents, the update analysis unit 140 classifies the contents into "a group primarily requiring updates." Alternatively, if a keyword such as "claim" or "basic policy" that would become significant without an update is contained in contents, the contents are classified into "a group primarily not requiring updates." Keywords for classifying contents into these groups may be registered in the information search apparatus 100 in advance.

The update analysis unit 140 may classify "a group primarily requiring updates" further into "a group requiring regular updates" and "a group not requiring regular updates." The update analysis unit 140 analyzes whether the contents classified into "a group requiring regular updates" are updated regularly. "A group requiring regular updates" includes information related to the ages of people existing in reality, and contents posting the images of their appearance. Ages of people existing in reality and appearances, etc., continue changing, so from an aspect of providing the latest information, it is necessary to update information related to the ages of people existing in reality as well as images of appearances, etc., regularly. Examples of contents of posted images of the appearance of people existing in reality include the images of portrait photos for arranged marriages hosted by a marriage agency, facial images of executives posted on a company brochure, and facial images of members belonged to a certain type of group, etc. The fact that images of the appearance of people existing in reality have been updated is particularly useful when later meeting with the person in reality.

The reliability controlling unit 130 increases or decreases the reliability degree of the contents to be evaluated, according to decisions made by the update determining unit 138 and analytical results of the update analysis unit 140. In other words, contents to be evaluated are classified into "a group primarily requiring updates," and the reliability controlling unit 130 increases the reliability degree of the contents when the update determining unit 138 determines that the contents have been updated, and decreases the reliability degree when it is determined that the contents have not been updated. Alternatively, for the contents to be evaluated, classified into "a group primarily not requiring updates," the reliability controlling unit 130 increases the reliability degree when the update determining unit 138 determines that the contents have not been updated, and decreases the reliability degree when it is determined that the contents have been updated.

According to the present embodiment, in addition to the presence or absence of updated contents, by determining to increase or decrease the reliability degree based on whether the contents primarily require updates, even if the contents have not been updated, if the contents are not supposed to be primarily be updated, the reliability degree may be increased, thus saving the contents.

Embodiment 5

Figure 14:
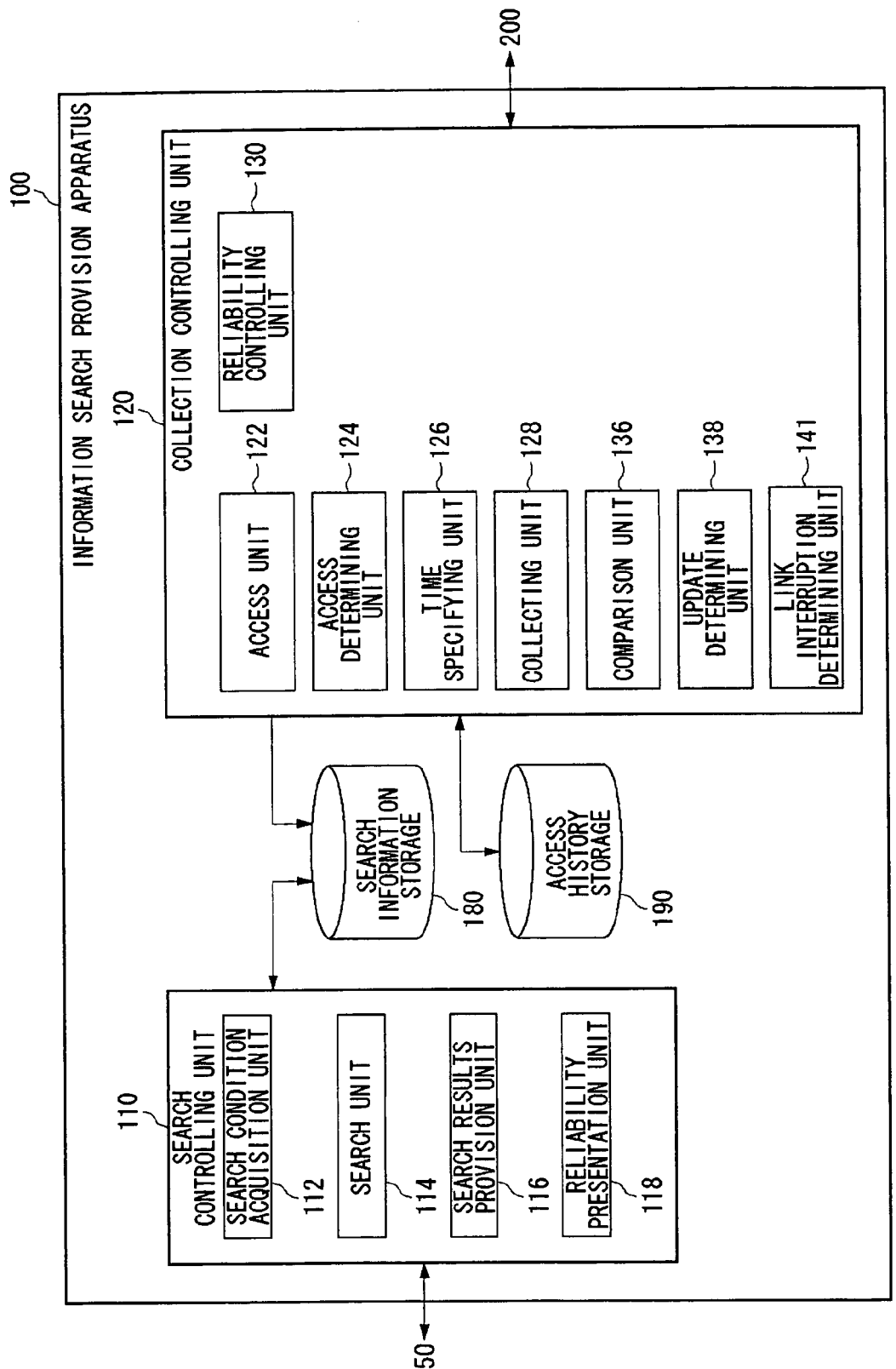
FIG. 14 is a diagram showing the configuration of an information search provision apparatus related to Embodiment 5.

In Embodiment 3, depending on whether the contents to be evaluated have been updated, the reliability degree of the contents is increased or decreased. In Embodiment 5, an examination is performed of whether a link interruption has occurred in the contents when examining whether the contents have been updated. FIG. 14 shows the configuration of an information search provision apparatus 100 related to the present Embodiment 5. For the same configuration as in FIG. 11, the same symbols are given and the explanations are omitted as appropriate. In addition to the information search provision apparatus 100 related to Embodiment 3 shown in FIG. 11, the information search provision apparatus 100 related to Embodiment 5 is further equipped with a link interruption determining unit 141 as a new configuration element.

The link interruption determining unit 141 accesses the web page of the link destination stated in the contents to be evaluated, collected by a collecting unit 128, and determines whether any type of contents are posted on the web page. More specifically, the link interruption determining unit 141 accesses the web pages of other web servers, by referring to "–" in a tag <A HREF="–"> contained in the contents to be evaluated. If there are multiple tags described above, multiple web pages are accessed. Then, when text, such as "Moved" or "FILE NOT FOUND" is found, it is determined that a link interruption has taken place. Alternatively, if any type of contents, such as contents containing text other than those described above are posted, it is determined that a link interruption has not taken place.

Needless to say, the link interruption determining unit 141 may access the link destination on the same web page on the same web server, or a link destination on a different web page on the same web server. Then, the link interruption determining unit 141 determines that a link interruption has occurred, such as when an image or video data does not exist in the link destination.

The reliability controlling unit 130 controls the increase or decrease in the reliability degree of the contents to be evaluated, according to decisions made by the link interruption determining unit 141. More specifically, when it is determined that a link interruption has occurred, the reliability controlling unit 130 maintains the reliability degree of the contents to be evaluated constantly during a period of time in which the link interruption has occurred. Furthermore, in this case, the reliability degree may be decreased. On the other hand, if the contents to be evaluated are updated and the link interruption is resolved, the reliability degree of the contents is increased.

According to the present embodiment, by setting the reliability degree when there is a link interruption on a web page lower than the reliability degree when there is no link interruption, the two may be differentiated. A link connecting a web page to another web page is one important element in the reason for the Internet to have been developed, so it is significant to regard the presence or absence of a link interruption as an index to evaluate the reliability degree of contents. By presenting the reliability degree based on link interruptions, users are enabled to use only contents having a high reliability degree without any link interruption. Alternatively, the web page provider may actively get involved in fixing link interruptions in order to enhance the reliability degree of contents. Accordingly, it is more likely that dead links existing on a network are more commonly fixed overall, thus leading to enhanced quality of the entire web page.

Figure 15:
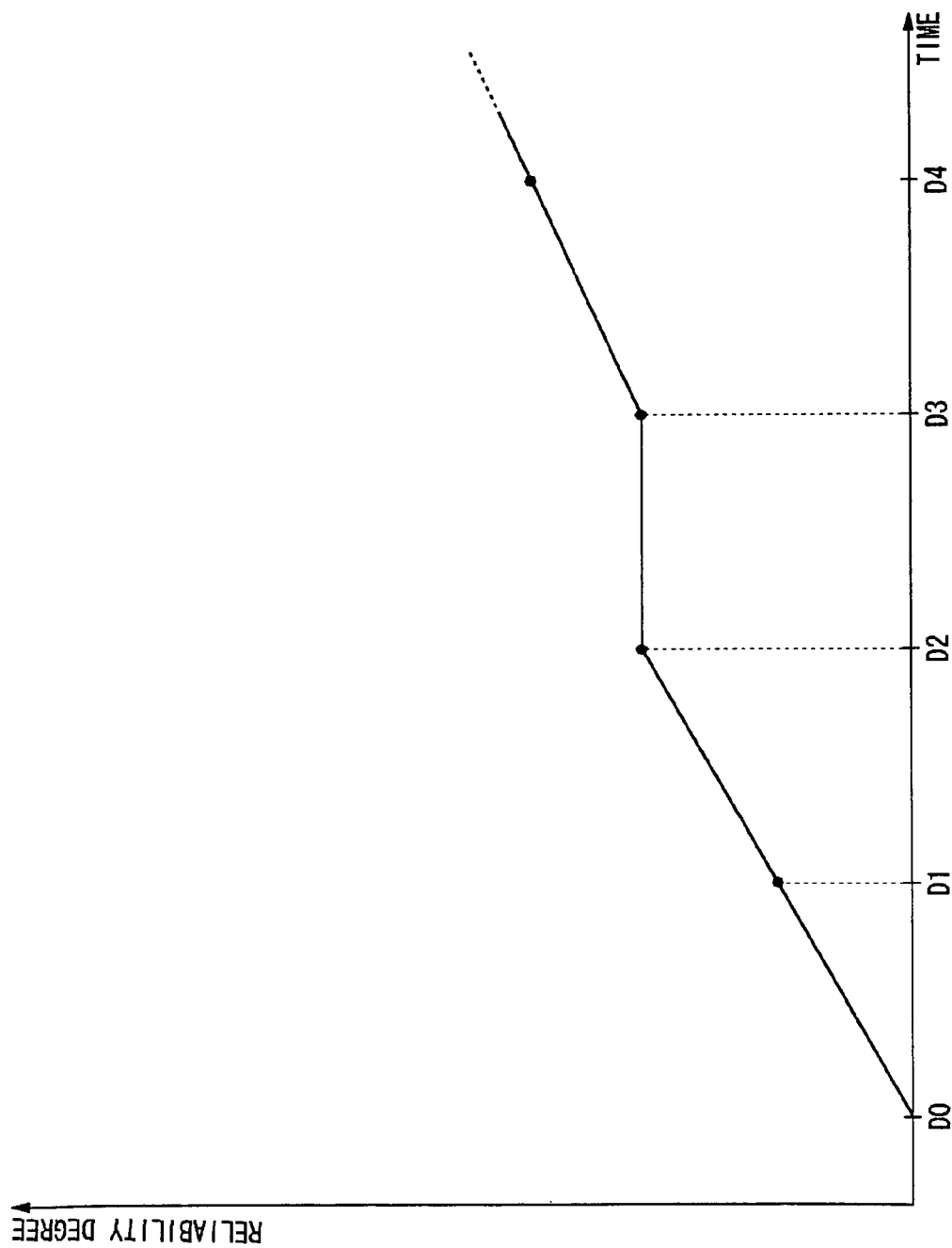
FIG. 15 is a diagram showing the relation between the reliability degree of contents and the time when a link interruption has taken place in the contents to be evaluated in the process.

FIG. 15 shows the relation between the reliability degree of the contents to be evaluated and the time when a link interruption took place in the contents in the process. The vertical axis indicates the reliability degree, and the horizontal axis indicates the time. For those that are the same as in FIG. 7, the same symbols are given and the explanations are omitted as appropriate. In FIG. 15, the changing state of the reliability degree is shown on the date D0 the web page provision started, since that date on contents posted on the web page that have been updated once a day, since the date D2 that a link interruption has taken place in the contents. However, on the date D3 the link interruption was fixed by updating the contents. As shown in FIG. 15, during a period of time in which a link interruption occurred, or in other words, during a period from the date D2 through the date D3, the reliability controlling unit 130 maintained a constant reliability degree of the contents.

Embodiment 6

Figure 16:
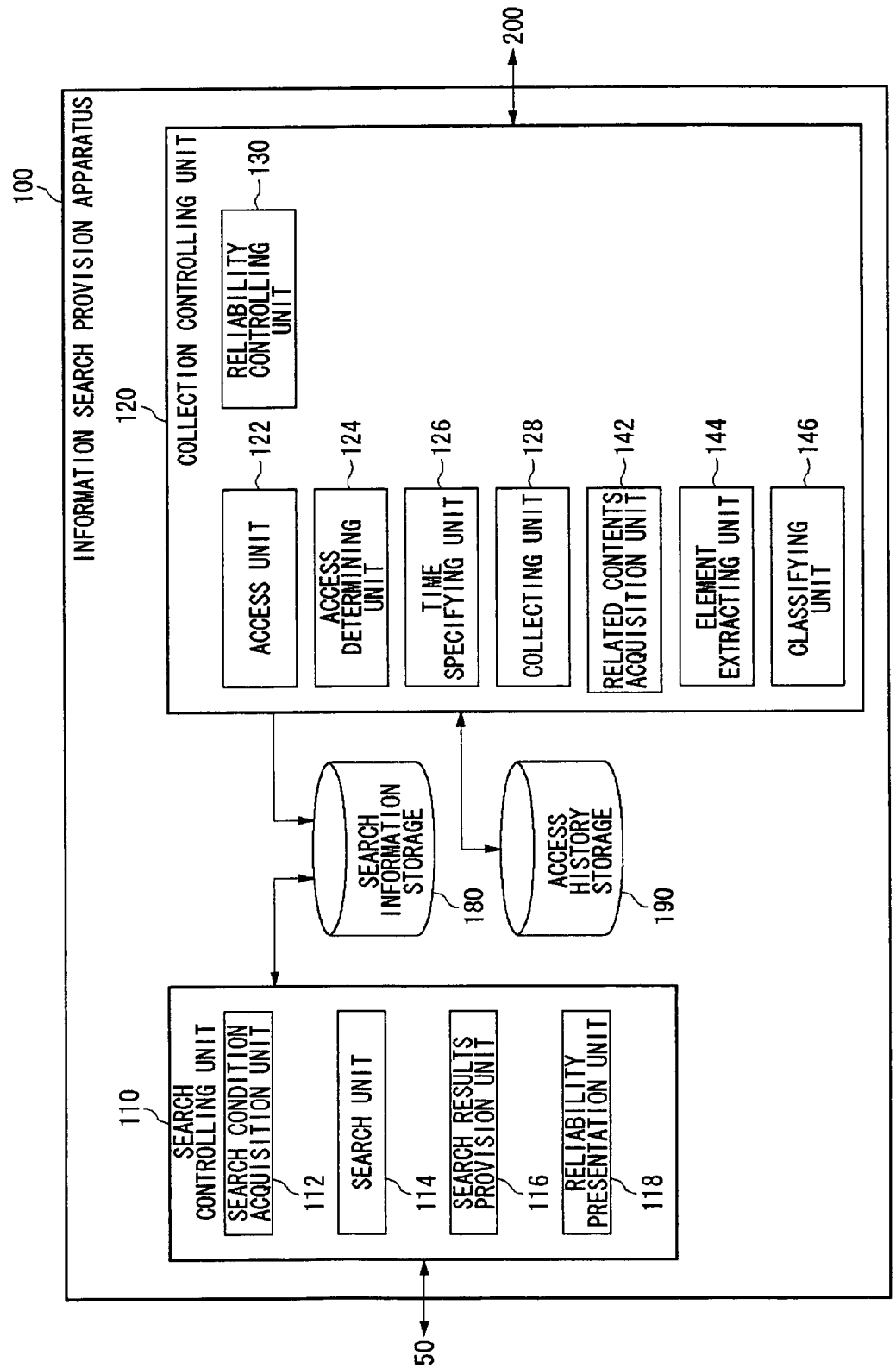
FIG. 16 is a diagram showing the configuration of an information search provision apparatus related to Embodiment 6.

In Embodiment 1, depending on whether it was possible to collect contents, the reliability degree of the contents to be evaluated is increased or decreased. In Embodiment 6, depending on elements contributing to the increase or decrease in the reliability degree of the contents to be evaluated, the reliability degree of the contents is increased or decreased. FIG. 16 shows the configuration of an information search provision apparatus 100 related to Embodiment 6. For the same configuration as in FIG. 3, the same symbols are given and the explanations are omitted as appropriate. The information search provision apparatus 100 related to Embodiment 6 is further equipped with a related contents acquisition unit 142, an element extracting unit 144, and a classifying unit 146 as new configuration elements, in place of a history increase range controlling unit 132 of the information search provision apparatus 100 related to Embodiment 1 shown in FIG. 3.

The related contents acquisition unit 142 acquires contents related to contents to be evaluated. For example, a search unit 114 performs a search by designating a search conditional statement, such as a sentence "ABC company" contained in the contents to be evaluated, and the related contents acquisition unit 142 may regard contents that matches the search conditional statement as related contents (hereinafter, "related contents"). Then, the search unit 114 may acquire related contents from a search information storage 180, or may acquire related contents using other search engines, or web pages. The search conditional statement may be designated by a user via a terminal apparatus 50, or be generated regularly with the use of a dictionary by a search conditional statement generating unit (not illustrated) in the search information provision apparatus 100. Furthermore, related contents may also contain the contents themselves to be evaluated.

The element extracting unit 144 extracts elements contributing to the increase or decrease in the reliability degree of the contents to be evaluated among acquired contents. For example, elements contributing to the increase in the reliability degree indicate keywords such as "new product development," "patent acquisition," "new roll out," "increase in sales and profits," etc., and elements contributing to the decrease in the reliability degree indicate keywords such as "trial," "debt," "arrest," "profit reduction," etc. All the keywords contributing to the increase or decrease in the reliability degree may be held in a contribution storage (not illustrated) in advance. Then, the element extracting unit 144 acquires keywords from the contribution storage, and acquires matching information by designating these keywords with respect to the contents acquired by the related contents acquisition unit 142 to perform a search.

The classifying unit 146 classifies each element extracted by the element extracting unit 144 into a first group contributing to the increase in the reliability degree of the contents to be evaluated, or into a second group contributing to the decrease of the reliability degree of the contents to be evaluated.

The reliability controlling unit 130 increases or decreases the reliability degree of the contents to be evaluated, by referring to the element extracted by the element extracting unit 144. More specifically, the reliability controlling unit 130 increases the reliability degree of the contents to be evaluated when the number of elements in the first group classified by the classifying unit 146 is greater than the number of elements in the second group. Meanwhile, the reliability controlling unit 130 decreases the reliability degree of the contents to be evaluated when the number of elements in the second group is greater than the number of elements in the first group.

According to the present embodiment, the information search provision apparatus 100 is capable of increasing or decreasing the reliability degree of the contents to be evaluated, depending on how the contents to be evaluated have been evaluated by other web pages or contents. Then, by considering not only the elements contributing to the increase in the reliability degree of the contents to be evaluated but also the elements contributing to the decrease in the reliability degree of the contents to be evaluated, an evaluation accuracy of the reliability degree is enhanced.

Embodiment 7

Figure 17:
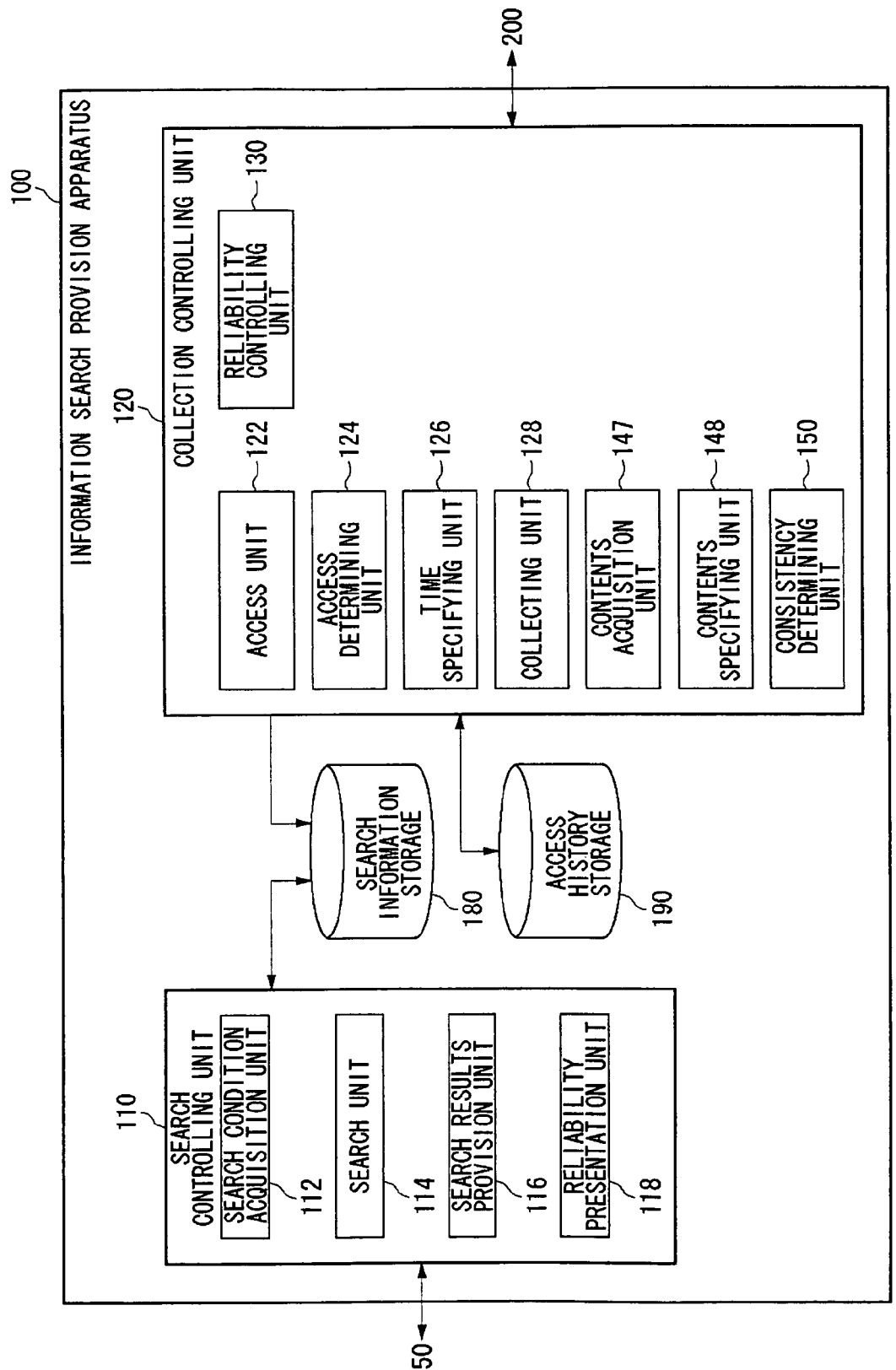
FIG. 17 is a diagram showing the configuration of an information search provision apparatus related to Embodiment 7.

In Embodiments 1 through 6, the reliability degree of the contents to be evaluated is increased or decreased independently. In Embodiment 7, the reliability degree of the contents related to each other is controlled at the same time. FIG. 17 shows the configuration of an information search provision apparatus 100 related to Embodiment 7. For the same configuration as in FIG. 3, the same symbols are given and the explanations are omitted as appropriate. The information search provision apparatus 100 related to Embodiment 7 is further equipped with a contents acquisition unit 147, an contents specifying unit 148, and a consistency determining unit 150 as new configuration elements, in place of a history increase range controlling unit 132 of the information search provision apparatus 100 related to Embodiment 1 shown in FIG. 3.

The contents acquisition unit 147 acquires contents containing an item to be assessed. The item to be assessed is data subject to determine consistency, possibly for example, address, telephone number, facsimile number, hiring information, financial information, and the like. The recruitment related information indicates, for example, the number of people expected to be hired in the following year, or the actual number of people hired this year, and the finance related information indicates sales, or current profit, etc. Furthermore, the data format of the item to be assessed may be any, such as text data, image data, audio data, or video data. The contents specifying unit 148 specifies own contents serving as an information source of the item to be assessed from among acquired contents. Hereafter, one example of determining criteria for specifying own contents will be shown. Needless to say, the determining criteria may be composed of a combination of the following.

(1) Specify by referring to the URL of the contents
(2) Specify by referring to details of the contents
(3) Specify by referring to the search results acquired from other web pages, search engines, or databases
(4) Specify based on the total number of links linked to the contents
(5) Specify-based on the provision start date of the contents In the case of (1), the contents specifying unit 148 determines, by referring to the URL of the acquired contents, for example, when the item to be assessed is a telephone number of a specific corporation, whether the URL contains a domain name "abc" of the corporation; if one is not contained, it is determined that the contents are own contents. Then, the access unit 122 may acquire the domain name of the corporation by accessing the database of a third-party organization that is managing the domain name.

In the case of (2), the contents specifying unit 148 determines own contents by referring to the contents of the acquired contents, for example, when the item to be assessed is a telephone number of a specific corporation, and whether the title area of the contents, for example, the region surrounded by tags <TITLE>-</TITLE>, contains the name of the corporation.

In the case of (3), the contents specifying unit 148 determines the contents located at the top most as own contents among the search results obtained from other web pages, search engines, or database by designating the item to be assessed as a search conditional statement. In the case of (4), the contents specifying unit 148 determines the contents having the most number of links linked from other contents as own contents, by referring to a tag <A HREF="–"> in the contents.

In the case of (5), the contents specifying unit 148 determines the contents with the earliest provision start date as own contents, by referring to the web page provision start date related to the acquired contents.

The consistency determining unit 150 determines the consistency, or lack thereof, of items to be assessed in a manner in which the own contents specified by the contents specifying unit 148 is compared with contents, in the acquired contents, other than the own contents.

The reliability controlling unit 130 increases or decreases the reliability degree of own contents and the reliability degree of other contents, according to the decision made by the consistency determining unit 150. In other words, when both the reliability degree of the own contents and the reliability degree of the other contents are high, and the items to be assessed are determined by the consistency determining unit 150 to be consistent, the reliability controlling unit 130 increases the reliability degree of the own contents as well as the reliability degree of the other contents. When both the reliability degree of the own contents and the reliability degree of the other contents is high, and the lack of consistency is determined, the reliability controlling unit 130 decreases the reliability degree of both. Then, the information search provision apparatus 100 may comprise a notifying unit (not illustrated), and may issue an alert of a correction indication of the item to be assessed to the information provider of the web pages posting each contents.

While the reliability degree of the own contents are high and the reliability degree of the other contents is low, and when it is determined that it is consistent, the reliability controlling unit 130 raises the reliability degree of the other contents. However, the reliability degree of own contents is not to be neither increased nor decreased. Furthermore, while the reliability degree of the own contents is high and the reliability degree of the other contents is low, and when it is determined that there is a lack of consistency, the reliability controlling unit 130 lowers the reliability degree of the other contents. However, the reliability degree of own contents is not be neither increased nor decreased. In other words, because the contents of the other contents with a low reliability degree is not reliable in the first place, the reliability controlling unit 130 controls the reliability degree of own contents so as to not be influenced by the same.

Figure 18:
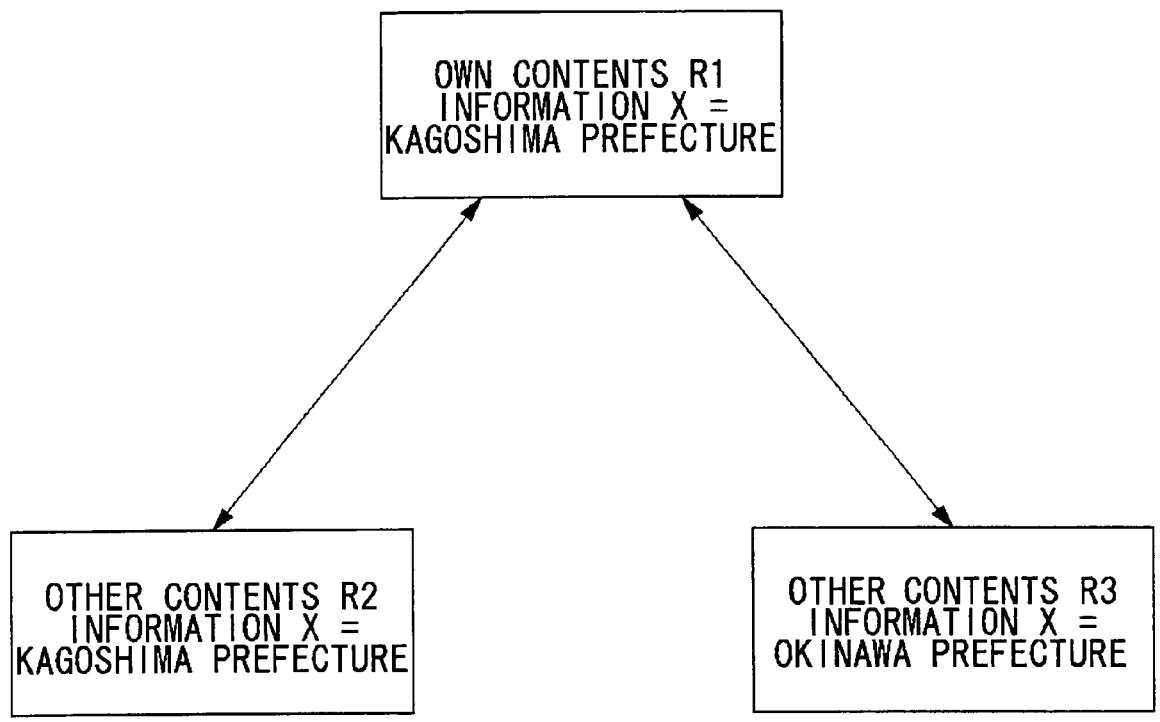
FIG. 18 is a diagram showing the interrelation between the contents themselves and other contents.

FIG. 18 schematically shows the relation to an item to be assessed with respect to the own contents and other contents. The own contents R1 includes "Information X=Kagoshima prefecture," the other contents R2 includes an item to be assessed, which is "Information X=Kagoshima prefecture," and the other contents R3 includes "Information X=Okinawa prefecture." The consistency determining unit 150 determines the consistency or lack thereof by comparing the own contents R1 and the other contents R2, or own contents R1 and other contents R3. In FIG. 18, it is determined by the consistency determining unit 150 that there is consistency for the own contents R1 and the other contents R2, but that there is a lack of consistency for the own contents R1 and the other contents R3.

The other contents may be contents provided by public or highly public agencies. The public or highly public agencies indicated here are, for example, agencies run by a nation, a local municipality, or a third party organization. Because the reliability degree of the contents provided by these agencies is generally high, the consistency determining unit 150 may increase the reliability degree of the own contents, for example, for the telephone number or address, when it is determined that there is consistency between the own contents and the other contents.

In general, there is some contents containing fallacies or mistakes within the contents. Therefore, it is significant to determine consistency or the lack thereof with respect to contents sent by information providers and contents posted in other contents or web pages. Due to the information search provision apparatus 100 related to the present embodiment, by being notified of the reliability degree of contents based on consistency or lack thereof, users are able to use only contents having a high reliability degree that is less likely to contain fallacies or mistakes in the contents. Alternatively, the web page provider may actively fix fallacies or mistakes in order to enhance the reliability degree of the contents. Accordingly, it is highly probable that fallacies or mistakes of contents overall are more likely to be fixed when seen overall, thereby leading to the quality enhancement of the entire web page.

Embodiment 8

The information search provision apparatus 100 related to Embodiment 8 comprises configuration elements to realize functions related to Embodiment 1, Embodiment 3, Embodiment 5, Embodiment 6, and Embodiment 7. Then, the reliability degree realized by the configuration elements related to each embodiment is kept in a Reliability column 310 within a searched information file as a respectively different reliability degree. Furthermore, the information search provision apparatus 100 related to Embodiment 8 may comprise configuration elements to realize functions related to Embodiment 2 in place of configuration elements to realize functions related to Embodiment 1, and configuration elements to realize functions related to Embodiment 4 in place of configuration elements to realize functions in Embodiment 3.

Figure 19:
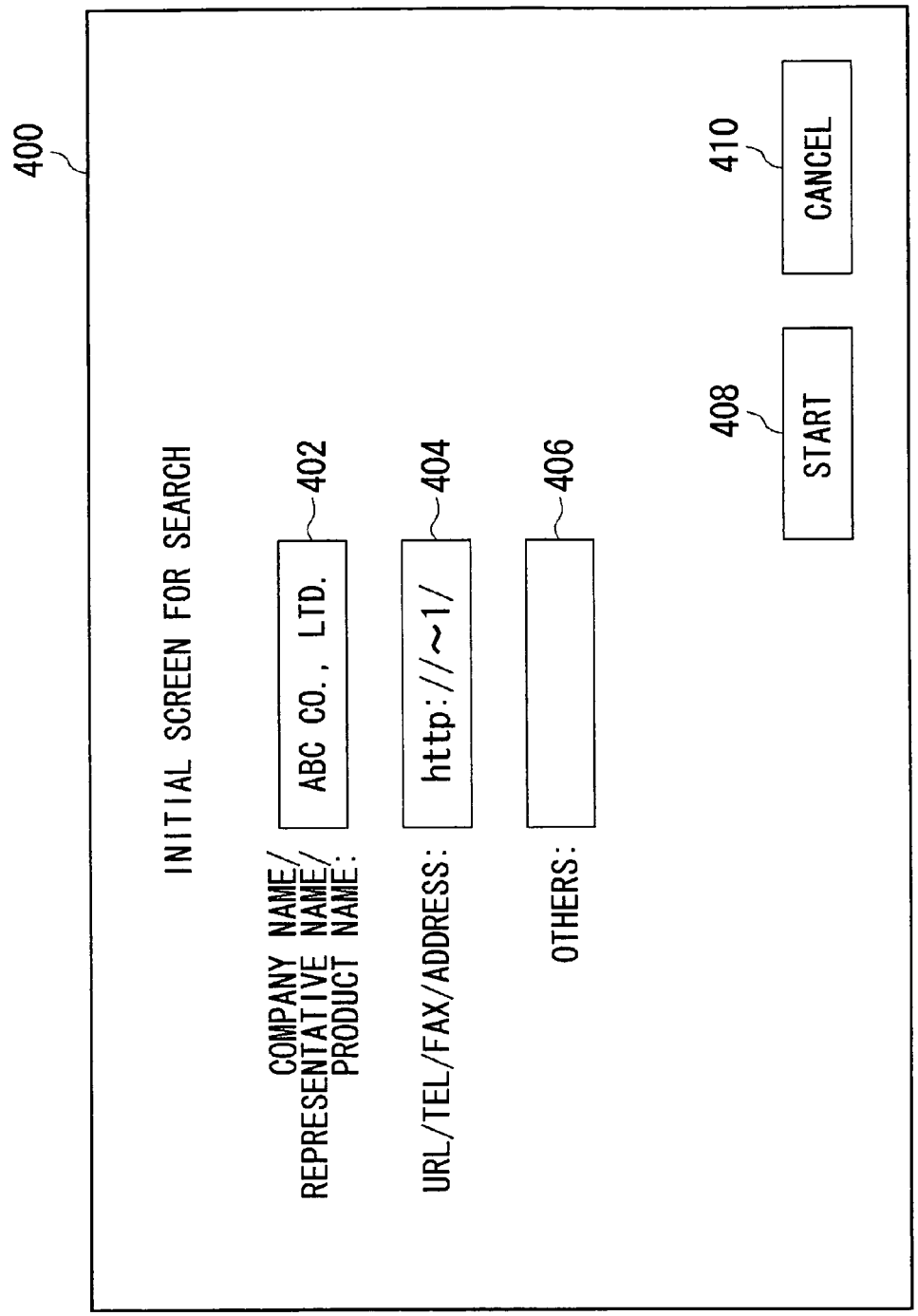
FIG. 19 is a diagram showing one example of an initial screen for search.

FIG. 19 shows an example of an initial screen for search provided by the information search provision apparatus 100. The initial screen for search 400 comprises a first input box 402, a second input box 404, and a third input box 406 for receiving a search conditional statement, a start button 408, and a cancel button 410, etc. A search conditional statement related to the company name, representative name, or product name are entered into the first input box 402, URL, telephone number, facsimile number, or address are entered into the second input box 404, and into the third input box 406 a search conditional statement to perform a so-called free search is entered by a user. After the search conditional statement is entered into at least one box, when the start button 408 is pressed, the entered search conditional statement is sent to the information search provision apparatus 100 by a transmitting unit 52 for a search process to be performed. While still being sent, if the cancel button 410 is pressed, the information search provision apparatus 100 stops the search process.

Figure 20:
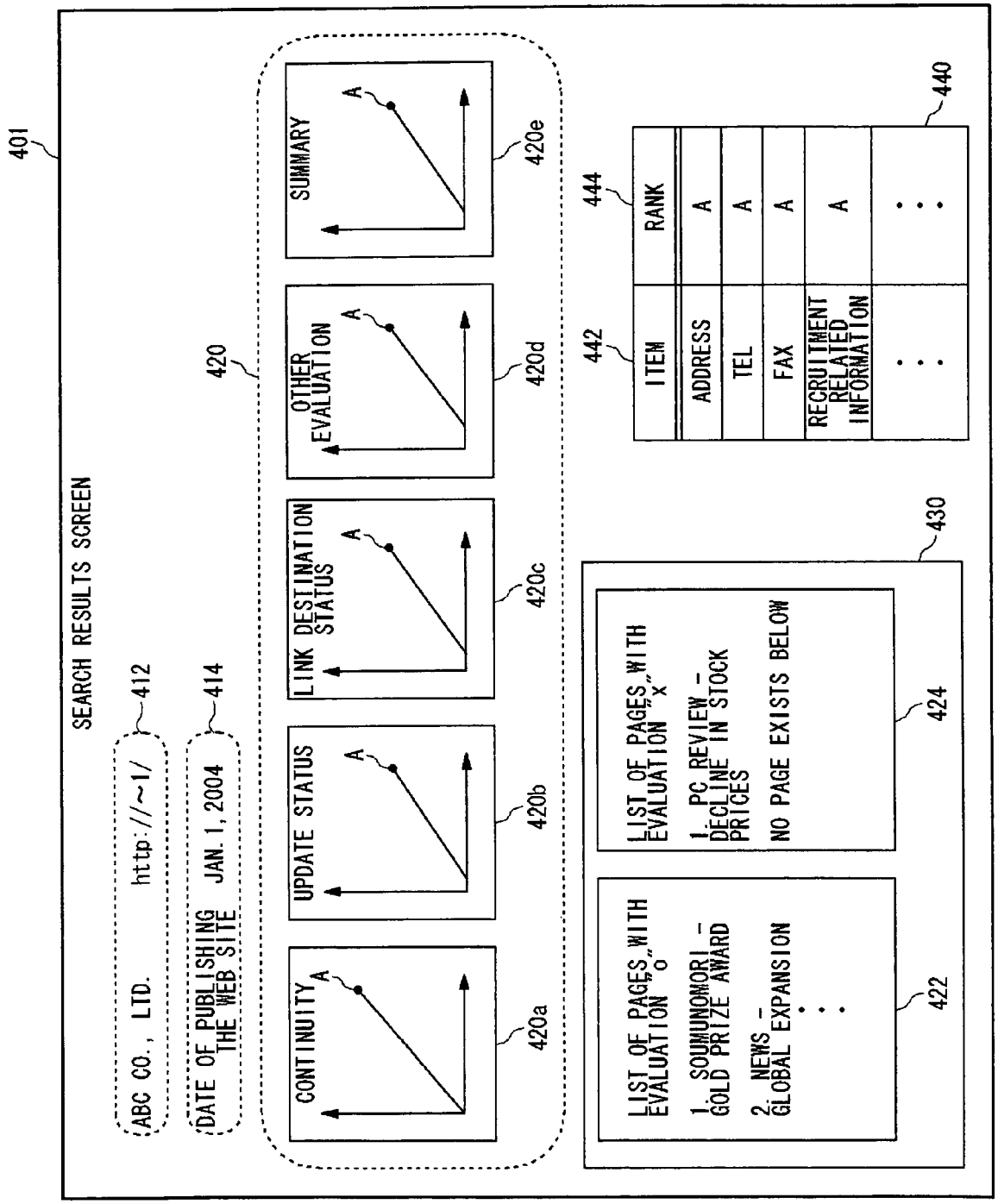
FIG. 20 is a diagram showing one example of the search results screen.

FIG. 20 shows an example of the search results screen 401 provided by the information search provision apparatus 100. Contents matching a search conditional statement and various information related to the contents, such as the reliability degree, are shown on the search results screen 401. The search results screen 401 is composed of a region 412 displaying the information provider of the web page posting the contents, a region 414 displaying the web page provision start date, a reliability table 420 displaying the relation between the reliability degree and the time in a table format, a list region 430 showing a list of other contents on which evaluation contents in the displayed contents are being posted, a reliability ranking table 440 displaying the reliability degree on a particular item in an alphabetic format, and the like.

The reliability table 420 is comprised of five tables—a first through fifth reliability table 420a through 420e. Herein, the first reliability table 420a is the reliability degree table related to the continuity of the involved in Embodiment 1 or Embodiment 2, the second reliability table 420b is the reliability degree table related to an update status of the contents involved in Embodiment 3 or Embodiment 4, the third reliability table 420c is the reliability degree table related to the link destination status of contents involved in Embodiment 5, the fourth reliability table 420d is the reliability degree table related to an evaluation from other contents with respect to the contents involved in Embodiment 6, the fifth reliability table 420e is the reliability degree table in which the results of these first to fourth reliability tables, 420a through 420d, are summarized. A point A in five—the first through fifth reliability tables, 420a through 420e—indicates the current reliability degree of the contents.

The list region 430 comprises a first list region 422 storing a list of other web pages in which a favorable evaluation is given with respect to the searched contents, and a second list region 424 storing a list of other web pages in which an unfavorable evaluation is given with respect to the searched contents. More specifically, the contents contributing to the increase or decrease in the reliability degree of the contents to be evaluated are displayed among contents acquired by a related contents acquisition unit 142 involved in Embodiment 6. As shown, a list of web pages posting contents containing keywords that increase the reliability degree of searched contents is stored in the first list region 422, and a list of web pages posting contents containing keywords that decrease the reliability degree of searched contents is stored in the second list region 424.

The reliability ranking table 440 includes an item column 442 and a rank column 444. The table shows the reliability degree to be controlled as results of the decision regarding consistency made by a configuration element related to Embodiment 7. The reliability ranking table 440 includes said items to be assessed, such as address, telephone number, facsimile number, or recruitment related information, etc. For the information included in the rank column 444, the reliability degree of contents is classified into several categories according to degree, and are shown in alphabetical form. For example, rank "A" indicates a high reliability degree, after which the order of the reliability degree decreases, shown as "B," "C," and "D" in an alphabetical order.

According to the present embodiment, by presenting the reliability degree of contents from multiple aspects to users, such as from the aspect of continuity of the contents, or an update status of the contents, the users are able to ascertain the reliability degree of contents from various aspects. Particularly, the reliability degree of overall evaluation is a summary of degrees of reliability from multiple aspects, and is thereby excellent in terms of balance, so users are able to ascertain far more reliable evaluation results related to the contents.

Embodiment 9

In Embodiment 1, the reliability degree of the contents is increased or decreased depending on whether it is possible to collect the contents to be evaluated. In Embodiment 9, in addition to whether it was possible to collect the contents to be evaluated, the reliability degree of the contents is increased or decreased based on client information associated with a network terminal apparatus that is accessed via a network of the contents. Cited as client information are information related to the status of access to the contents from said network terminal apparatus, and information entered into the contents from said network terminal apparatus.

Figure 21:
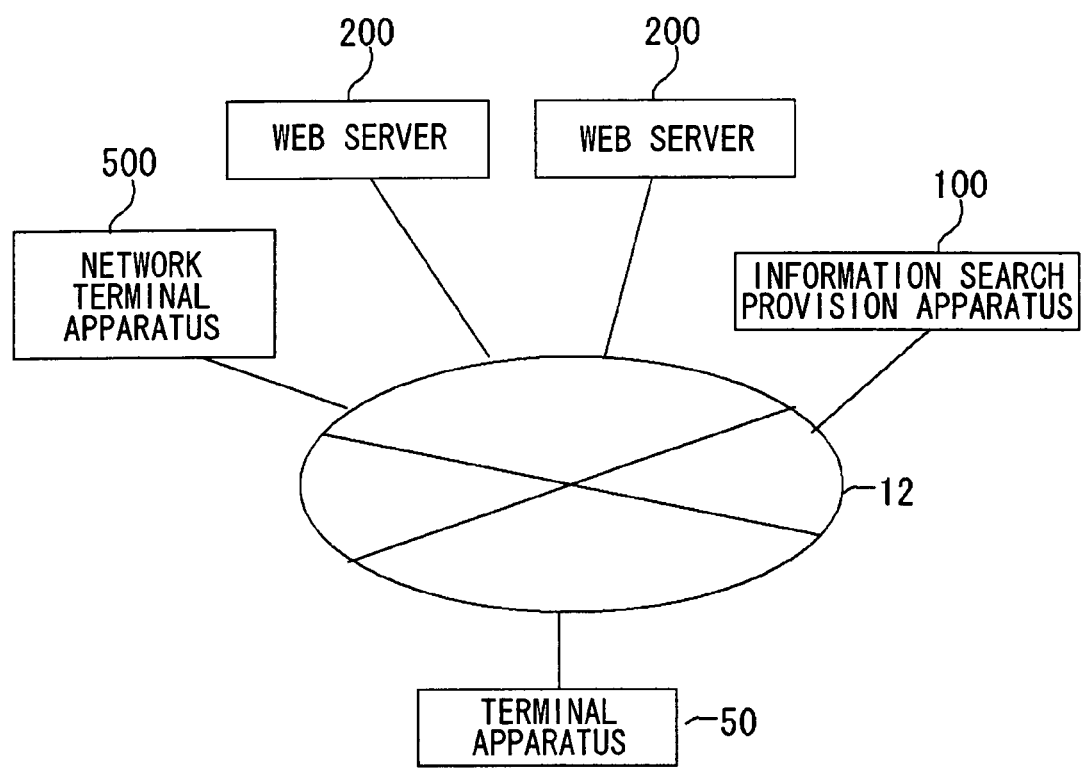
FIG. 21 is a diagram showing the configuration of an information search provision system related to Embodiment 9.

FIG. 21 shows the configuration of an information search provision system 11 related to Embodiment 9. With regard to the information search provision system 11 related to Embodiment 9, for the same configuration as in FIG. 1, the same symbols are given and the explanations are omitted as appropriate. In addition to an information search provision system 10 related to Embodiment 1 shown in FIG. 3, the information search provision system 11 related to Embodiment 9 has a network terminal apparatus 500 for using the contents.

Figure 22:
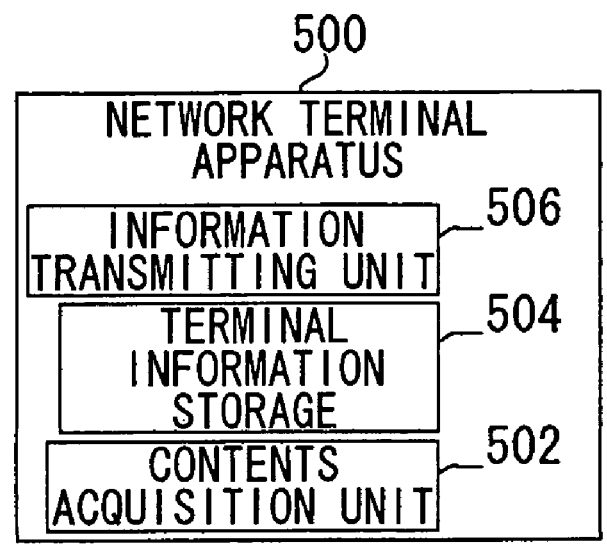
FIG. 22 is a diagram showing the configuration of a network terminal apparatus related to Embodiment 9.

FIG. 22 shows the configuration of a network terminal apparatus 500 related to Embodiment 9. The network terminal apparatus 500 comprises a contents acquisition unit 502, a terminal information storage 504, and an information transmitting unit 506.

The contents acquisition unit 502 acquires contents provided by a web server 200 via a network 12. More specifically, from a WWW browser to be installed on the network terminal apparatus 500 (not illustrated), an acquisition request of the contents provided by the web server 200 is sent. Responding to the contents acquisition request, the contents sent from the web server 200 is taken into the network terminal apparatus 500 and displayed on the WWW browser. The date and time when the contents were acquired by the contents acquisition unit 502 or the number of contents acquisitions, etc., are saved in the network terminal apparatus 500 as access status log data, such as cookies and the like.

The terminal information storage 504 stores information related to the network terminal apparatus 500. As example of information held in the terminal information storage 504, cited are information related to the acquired date and time of contents obtainable from cookies, the number of contents acquisitions, information related to a bypassed URL when contents were acquired, information related to the operating system (hereinafter, "OS") of the network terminal apparatus 500, information related to the browser used in the network terminal apparatus 500, and information related to the Internet service provider (hereinafter, "ISP") that the network terminal apparatus 500 is using.

The information transmitting unit 506 sends client information associated with the network terminal apparatus 500 to the web server 200. Practical examples of the client information sent by the information transmitting unit 506 are information related to: the acquired date and the time of contents, the number of contents acquisitions, and the OS, information related to ISP, etc., as described above. Furthermore, as described later, if the contents provided by a contents provision unit 202 contains a contents of product sales using the Internet, the information transmitting unit 506 sends information such as the name of the purchaser of the product, the product name, the unit price of the purchasing product, and the volume to the web server 200 as client information.

Figure 23:
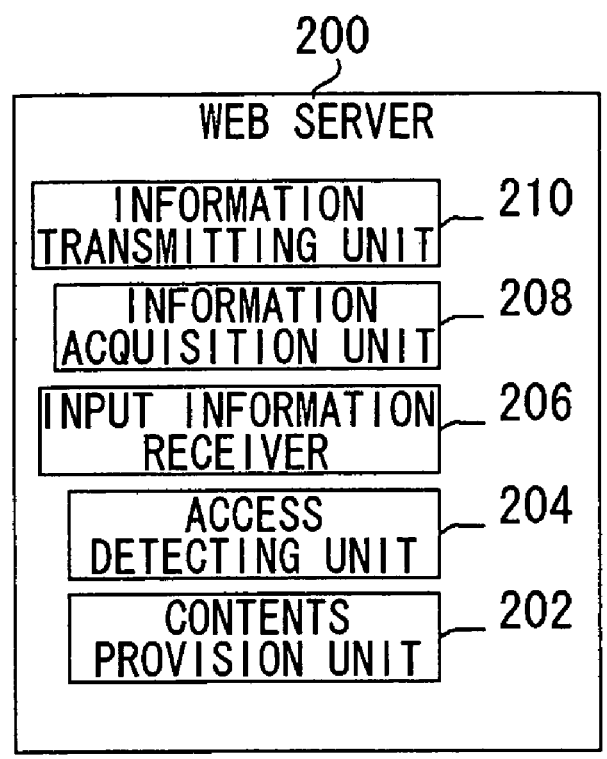
FIG. 23 is a diagram showing the configuration of a web server related to Embodiment 9.

FIG. 23 shows the configuration of a web server 200 related to Embodiment 9. The web server 200 related to Embodiment 9 comprises a contents provision unit 202, an access detecting unit 204, an input information receiver 206, an information acquisition unit 208, and an information transmitting unit 210.

The contents provision unit 202 provides contents in response to requests from the network terminal apparatus 500. Contents provided by the contents provision unit 202 may be contents intended to browse news, blogs, images, moving pictures, etc., or contents related to product sales using the Internet. The contents provision unit 202 is suited for providing contents in which an instruction program (written in JavaScript, etc.) is embedded to send and receive information from the web server 200, when the network terminal apparatus 500 browses contents or enters any type of information with respect to the contents, in order to realize the transmission of the client information from the information transmitting unit 506 described above.

When entering any type of information with respect to contents, such as an input form composed of textboxes or radio buttons, etc., created by a CGI program, etc., may be used.

The access detecting unit 204 detects access to the contents by the network terminal apparatus 500, such that the network terminal apparatus 500 browses the contents, or that any type of information has been entered from the network terminal apparatus 500 with respect to the contents.

The input information receiver 206 receives input information from the network terminal apparatus 500 with respect to the contents. For example, if the contents provided by the contents provision unit 202 are on a web page for product sales using the Internet, the input information receiver 206 receives information such as the name of the purchaser of the product, the product name, the unit price of the purchasing product, and the volume.

The information acquisition unit 208 acquires information related to the acquired date and time of the contents, the number of contents acquisitions, the OS, and information related to the ISP, transmitted from the information transmitting unit 506 of the network terminal apparatus 500.

The information transmitting unit 210 sends obtained client information to the information search provision apparatus 100.

Figure 24:
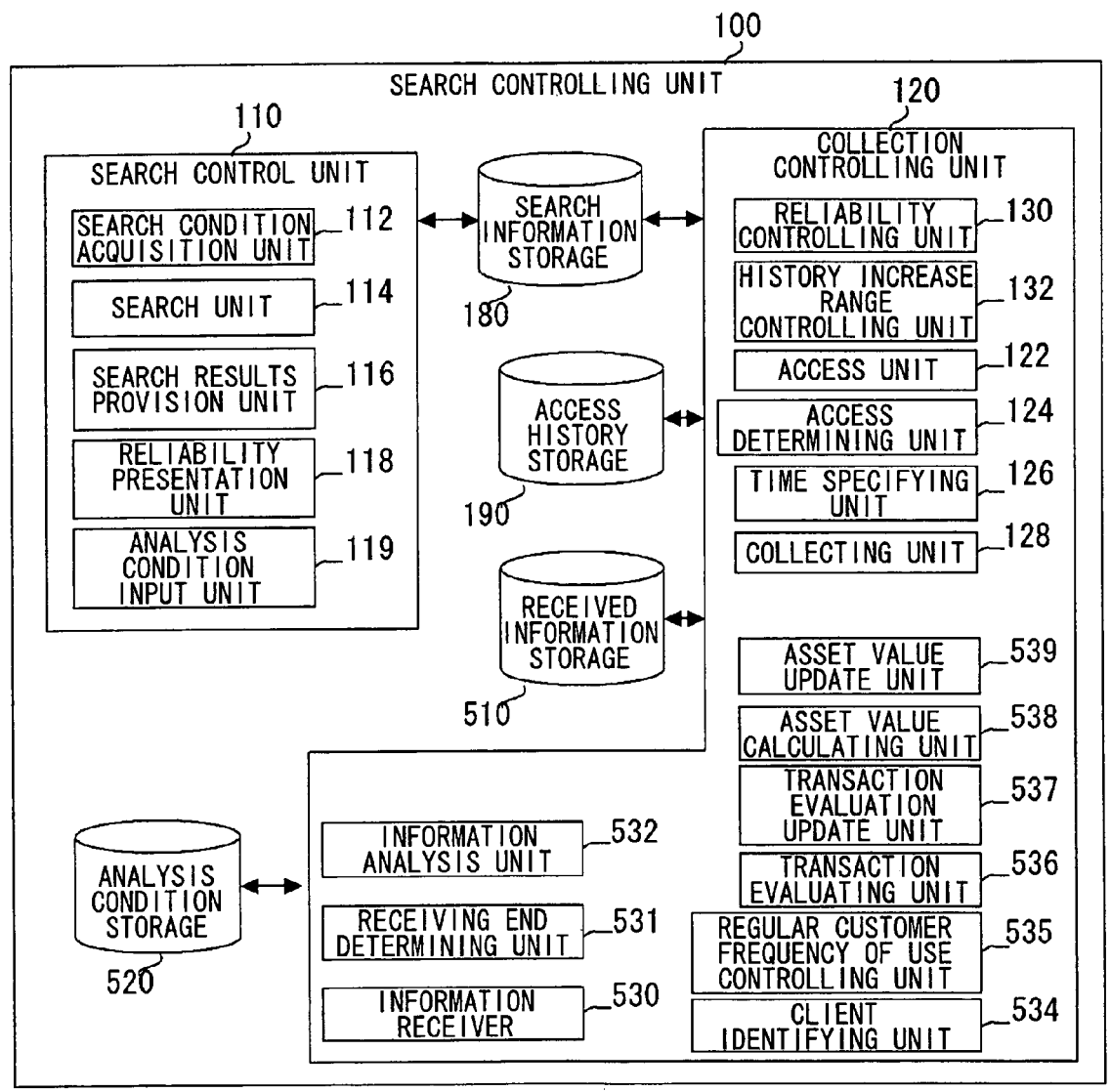
FIG. 24 is a diagram showing the configuration of an information search provision apparatus related to Embodiment 9.

FIG. 24 shows the configuration of an information search provision apparatus 100 related to Embodiment 9. With regard to the information search provision apparatus 100 shown in FIG. 24, the same symbols are given for the same configuration as in FIG. 3, so the explanations are omitted as appropriate. In addition to the configuration elements of the information search provision apparatus 100 related to Embodiment 1 shown in FIG. 3, the information search provision apparatus 100 related to Embodiment 9 further comprises a received information storage 510 and an analysis condition storage 520. Moreover, a collection controlling unit 120 related to Embodiment 9 further includes an information receiver 530, an information receiving end determining unit 531, an information analysis unit 532, a client identifying unit 534, a regular customer frequency of use controlling unit 535, a transaction evaluating unit 536, a transaction evaluation update unit 537, an asset value calculating unit 538, and an asset value update unit 539.

The information receiver 530 receives information sent from the information transmitting unit 210 of the web server 200, to be stored in the received information storage 510. When continuing to be accessed from the network terminal apparatus 500, it is received as client information in a series of accesses.

FIG. 25 shows an example of the data structure of received information stored in the received information storage 510. In FIG. 25, the same symbols are given for the same configuration as in FIG. 4, so the explanations thereof are omitted as appropriate. When the network terminal apparatus 500 accesses contents, the network terminal apparatus 500 uses software for browsing contents such as a browser to access via a network 12. The received information storage 510 contains client information related to access history from the network terminal apparatus 500 received at the information receiver 530, and client information related to the data entered from the network terminal apparatus 500.

Examples of client information related to access history are the access date/time 550 when the network terminal apparatus 500 accessed the contents, the access source IP address 552 assigned to the network terminal apparatus 500, the bypassing URL 554 held in the network terminal apparatus 500, the OS information 556 used in the network terminal apparatus 500, and the like.

Examples of client information related to input data are the purchasing amount 568, the product name 560, and the user name 562, etc., automatically entered into a form for purchasing a product that has been set in the contents by the network terminal apparatus 500.

To return to the explanation of the configuration of FIG. 24, the information receiving end determining unit 531 determines whether information has continued to be received in order to determine when a series of accesses ended. For example, whether information has continued to be received is determined based on whether the interval between receiving information from the same network terminal apparatus 500 is within a predetermined period.

The information analysis unit 532 analyzes information stored in the received information storage 510, based on analysis conditions influencing the reliability degree held in the analysis condition storage 520. The reliability controlling unit 130 increases or decreases the reliability degree stored in a search information storage 180 in accordance with the analysis results. It is preferable to store said analysis conditions in the analysis condition storage 520 in advance, but updates may appropriately be made when necessary.

For instance, if a condition is set in the analysis condition storage 520 as "in case of an access from the same network terminal apparatus 500, set the reliability degree higher than that in the first access," the information analysis unit 532 analyzes whether the access is from the same network terminal apparatus 500, by referring in the received information storage 510 to information received in the past held. If the access is from the same network terminal apparatus 500, the reliability controlling unit 130 raises the reliability degree higher than an access from a different network terminal apparatus 500.

When the network terminal apparatus 500 browses the contents, examples of factors that increase the reliability degree of contents include increased accesses to the contents from the network terminal apparatus 500, accesses through sites with a high reliability degree, and accesses to contents from a network terminal apparatus 500 using an OS with a high reliability degree. On the other hand, examples of decreased reliability degree of the contents include decreased accesses to the contents from the network terminal apparatus 500, accesses through sites with a low reliability degree, and accesses to the contents from a network terminal apparatus 500 using an OS with a low reliability degree. For the reliability degree of the site, information held in the search information storage 180 is to be referenced. Other than these, the reliability degree of the contents may be increased or decreased based on the type of browser or program used in the network terminal apparatus 500, the updated version, the presence or absence of countermeasures against vulnerabilities, the existence or lack of possibility that other sites may be harmed, and the reliability degree of the ISP that the network terminal apparatus 500 is using, etc.

Examples of factors that increase the reliability degree of the contents, when the network terminal apparatus 500 enters any type of information with respect to the contents, include when the network terminal apparatus 500 uses the contents for shopping, and the same network terminal apparatus 500 uses the contents for multiple instances of shopping. Using contents for shopping may be considered proof that the network terminal apparatus 500 uses the contents reliably. Therefore, as more network terminal apparatuses 500 engage in shopping, the reliability degree of the contents may also be increased or decreased. Furthermore, cases in which the same network terminal apparatus 500 using contents for multiple instances of shopping are determined as a regular customer of the contents, it may be considered that the more regular the contents is, the higher the reliability degree that the contents becomes.

Moreover, when the network terminal apparatus 500 uses the contents for shopping, and when payment is made by credit card, it is determined to be an access from a user with a higher reliability degree. Then, by judging whether the purchase involves the use of a credit card, based on the client information related to the input data, the reliability degree of the contents may be set higher as more network terminal apparatuses 500 carry out shopping using credit cards. The fact that a credit card is being used is one example of the capability of identifying a user who uses the network terminal apparatus 500. As long as the method is capable of identifying the identity of the user, it does not have to be limited to the use of a credit card.

The client identifying unit 534 confirms whether the user of the contents held in the received information storage 510 matches any of the latest user names 562 held in the received information storage 510.

FIG. 26 shows an example of the data structure of searched information files stored in the search information storage 180. With regard to the search information storage 180 related to the present embodiment, for the same configuration as in FIG. 4, the same symbols are given and the explanations are omitted as appropriate. In addition to the configuration shown in FIG. 4, the search information storage 180 in the present embodiment further includes a total purchasing amount 570, a total product property evaluation 572, a regular customer frequency of use 574, and an asset value 576.

The regular customer frequency of use controlling unit 535 increases the frequency of use by the regular customer, held in the search information storage 180, when a match is confirmed by the client identifying unit 534.

For example, in the contents of (http://−1), when information such as "Taro Yamazaki purchased product A101 at 29,600 yen" is stored in the received information storage 510, the corresponding total purchasing amount of the contents (http://−1) in the search information storage 180 would be "279,600 yen" by adding "29,600 yen" to "250,000 yen." Furthermore, if product "A101" has been evaluated as "5," which is the highest rank in the evaluation of five levels for a food product not influenced by trends, the total product property evaluation would be "11" by adding "5" to "6." Furthermore, if "Taro Yamazaki" has a purchase history of "3" times in the contents of (http://−1) in the past, the regular customer frequency of use would be "23" by adding "3" to "20."

The transaction evaluating unit 536 acquires the latest purchasing amount 568 and the product name 560 held in the received information storage 510. The transaction evaluating unit 536 seeks the payment size or the transaction contents in the contents, by acquiring the payment amount or the product information entered during the shopping. The reliability controlling unit 130 may increase or decrease the reliability degree based on the payment size or the transaction contents in the contents. Furthermore, the transaction evaluating unit 536 may perform an evaluation based on the product properties such as the trend of product name, product type, etc. In this case, it is preferable to prepare the criteria for the product property evaluation in advance.

For instance, if the payment amount within a month in the contents exceeds a predetermined amount, dealing with products not influenced by trends, and having many regular customers, the reliability controlling unit 130 may greatly increase the reliability degree.

The transaction evaluation update unit 537 updates the total purchasing amount 570 and the total product property evaluation 572 held in the search information storage 180 following the process of transaction evaluating unit 536.

As described above, by collecting information related to a payment in the contents, the transaction of the contents or the asset value of the contents may be calculated.

The asset value calculating unit 538 calculates the profit in a transaction by acquiring the latest purchasing amount 568 and the product name 560 held in the received information storage 510, as well as by acquiring the cost of the product from a sales management system (not illustrated) or an accounting system (not illustrated) where data related to the contents are stored. By considering the figure of the profit totaled during a certain period, the frequency of use of regular customers, and the property of the product, and by estimating a future profit, the asset value of the contents are calculated.

The asset value update unit 539 updates an asset value held in the search information storage 180 based on the asset value calculated by the asset value calculating unit 538.

For instance, when seeking an asset value of contents containing (http://−1), if the annual profit is "100 million yen," the regular customer frequency of use is "20," and the total product property evaluation is "6," then it is estimated that the profit will continue for the next "3" years based on the regular customer frequency of use and the total product property evaluation. From this, the asset value of the contents are calculated as "300 million yen." Furthermore, it is preferable to prepare a standard for calculating the profit calculation period based on the regular customer frequency of use and the total product property evaluation in advance.

Figure 27:
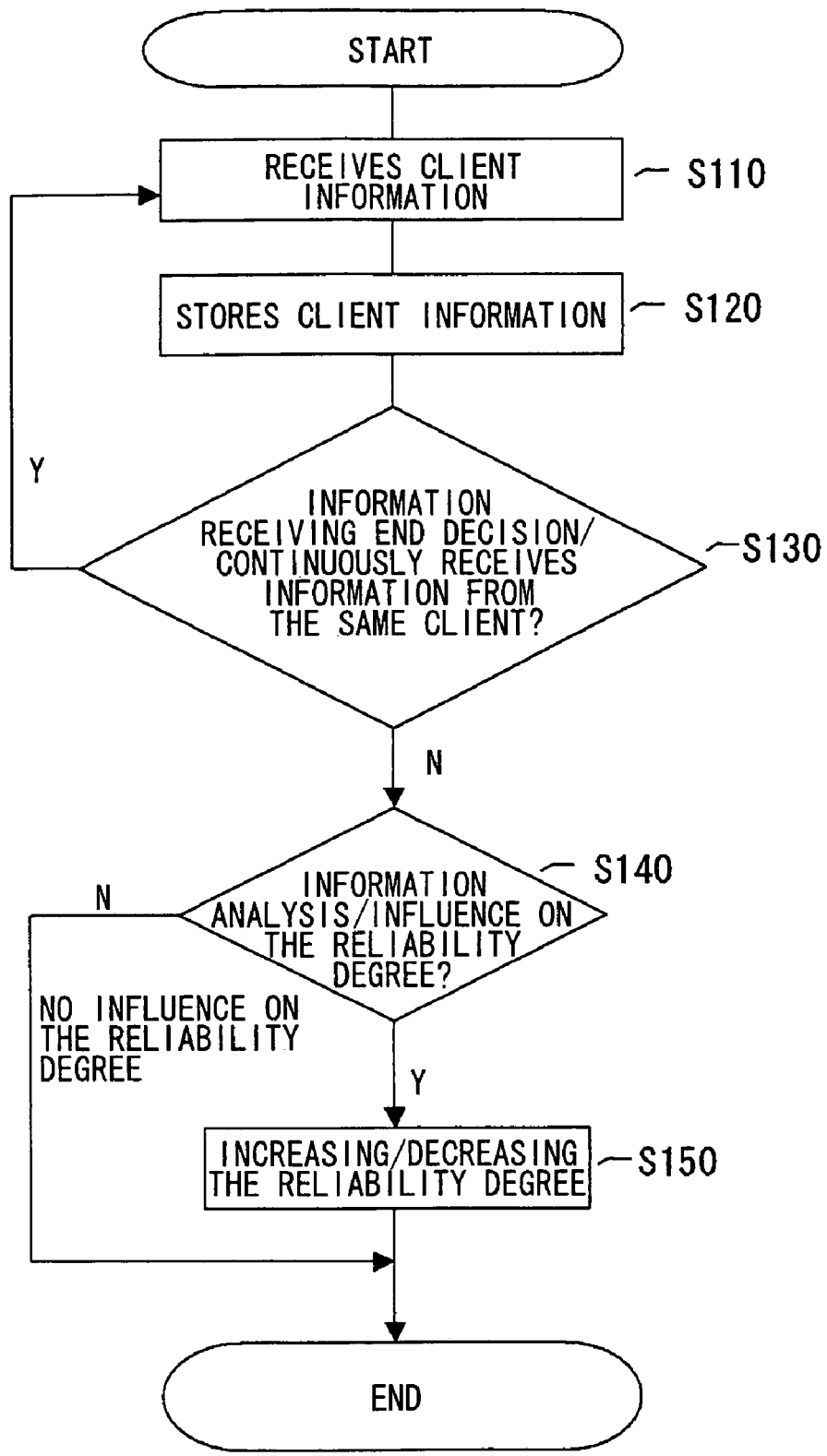
FIG. 27 is a flow chart showing a process flow of the increase/decrease in the reliability degree depending on the information received, related to Embodiment 9.

The FIG. 27 shows the process flow of the increase/decrease in the reliability degree related to the present embodiment. First, the information search provision apparatus 100 is in standby mode for receiving information transmitted from the web server 200. When the information receiver 530 receives client information (S110), the received client information is stored in the received information storage 510 (S120).

By the information receiving end decision (S130), while continuously receiving the information (S130—Y), the received client information continues to be stored. However, based on the condition that a predetermined period of time has elapsed after receiving the client information from the network terminal apparatus 500 for the first time, it is allowed to proceed to the information analysis step (S140).

On the other hand, when the information receiving end determining unit 531 determines that information has not continued to be received (S130—N), then an information analysis (S140) is performed by the information analysis unit 532. When the information analysis unit 532 has determined that "the reliability degree increases/decreases" (S140—Y), an increasing/decreasing process of the reliability degree (S150) is carried out by the reliability controlling unit 130, and then the process ends. Alternatively, when the information analysis unit 532 determines that there has been "no influence on the reliability degree" (S140—N), the process ends.

According to the present embodiment, with the information held in the network terminal apparatus 500 using contents, control of the reliability degree becomes possible. Furthermore, by collecting the payment information between the network terminal apparatus 500 and the contents, calculation of the asset value of the contents becomes possible. On a network, particularly on the Internet, various contents are run regardless of whether it is by/for corporations or individuals, and there is a large number of beneficial contents existing among them. However, the history of running contents are minimal, and such methods used in evaluating land or buildings existing in reality have not been established. Along with a calculation of the reliability degree, calculation of asset value of the contents are expected to be the foundation of a new system, or in other words, the logistics of contents, besides being useful for smoothly performing a transfer or an inheritance of contents owned by an individual, the succession or transfer of contents owned by a corporation, or a merger and absorption of a corporation that owns further beneficial contents, and investments or loans to said corporation, etc.

Furthermore, in Embodiment 9, although the client information of the network terminal apparatus 500 is delivered to the information search provision apparatus 100 via a web server 200, the client information of the network terminal apparatus 500 may directly be delivered to the information search provision apparatus 100. In addition, the client information of the network terminal apparatus 500 may be delivered to the information search provision apparatus 100 via an information collection apparatus run by a third party. In addition, the information search provision apparatus 100 may serve as a web server 200 to provide contents.

Embodiment 10

In Embodiment 3, depending on whether the contents to be evaluated have been updated, the reliability degree of the contents to be evaluated is increased or decreased. In Embodiment 10, with regard to decision items related to a provider of contents to be evaluated, the publication circumstances of the contents to be evaluated and of compared contents respectively are acquired, and by comparing the publication circumstance of decision items in the contents to be evaluated with the publication circumstance of decision items in the compared contents, it is determined whether the contents to be evaluated is properly assessed. More specifically, the decision items related to the provider of the contents to be evaluated consist of event information publicized by the organizers who run the contents to be evaluated, and the like.

In general, when any type of event is publicized, the event information would be posted not only in the contents to be evaluated, run by the organizers themselves, but also be posted in contents other than the contents to be evaluated that is not run by the organizer. Examples of information sources to be posted in contents other than the contents to be evaluated include the contents to be evaluated when bypassing a network 12, a press conference, and an independent report, etc., when the network 12 is not bypassed. Herein, in spite of the fact that an event information is not posted in the contents to be evaluated, when the event information is posted in contents other than the contents to be evaluated, or when the event information has been posted in contents other than the contents to be evaluated prior to posting in the contents to be evaluated, it is determined that the contents to be evaluated is not appropriately updated.

In the present invention, event information is publicized by the organizers, but not only that, the event information may be publicized by a third party other the organizers. For example, there are some cases in which fraud or social wrongdoings of organizers is posted in contents run by a third party to be publicized, without being publicized by the organizers themselves. In such a case, when event information such as fraud, etc., of an organizer is posted in contents run by a third party, depending on whether an appropriate comment or an apology, etc., regarding the event information is posted in the contents run by the organizer, it is determined whether the contents run by the organizer have been updated appropriately.

Figure 28:
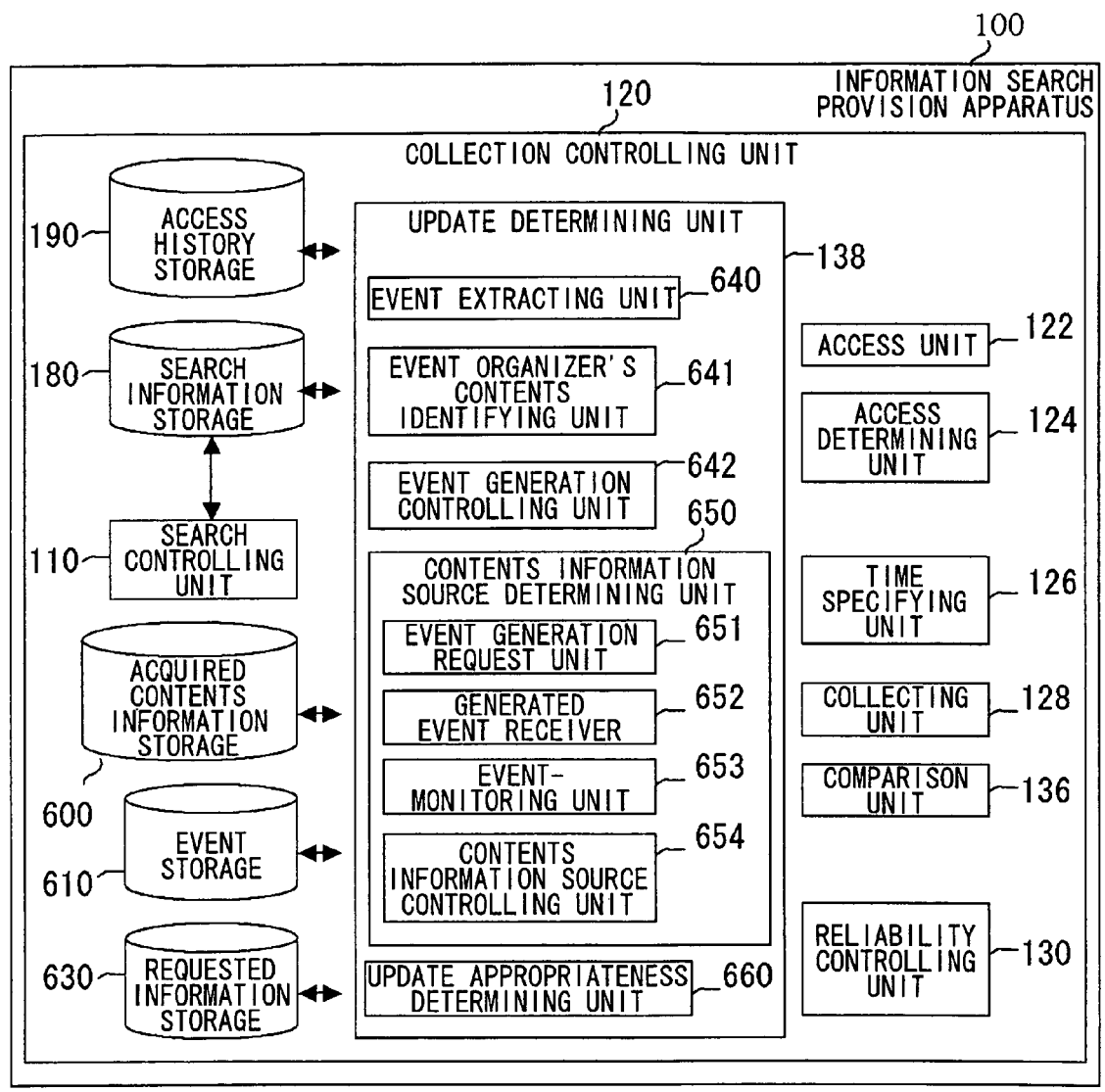
FIG. 28 is a diagram showing the configuration of an information search provision apparatus related to Embodiment 10.

FIG. 28 shows the configuration of an information search provision apparatus 100 related to Embodiment 10. With regard to FIG. 28, for the same configuration as in FIG. 11, the same symbols are given and the explanations are omitted as appropriate. In addition to the configuration of an information search provision apparatus 100 related to Embodiment 3 shown in FIG. 11, the information search provision apparatus 100 related to Embodiment 10 further comprises an acquired contents information storage 600, an event storage 610, and a requested information storage 630. Furthermore, an update determining unit 138 in the present embodiment further includes an event extracting unit 640, an event organizer's contents identifying unit 641, an event generation controlling unit 642, a contents information source determining unit 650, and an update appropriateness determining unit 660. The contents information source determining unit 650 includes an event generation request unit 651, a generated event receiver 652, an event-monitoring unit 653, and a contents information source controlling unit 654.

FIG. 29 shows an example of the data structure of searched information files stored in the acquired contents information storage 600. The searched information file in FIG. 29 includes an IP address 601, a URL 602, contents 603, and a contents acquisition date 604 as data columns. Contents collected by a collecting unit 128 is held not only in a search information storage 180 but also in the acquired contents information storage 600. The acquired contents are stored in a column of contents 603, and the URL—which is part of the contents-associated information—is stored in a URL column 602.

FIG. 30 shows an example of the data structure of received information stored in the search information storage 180. With regard to the search information storage 180 in Embodiment 10, for the same configuration as in FIG. 4, the same symbols are given and the explanations are omitted as appropriate. The data structure described in FIG. 30 further includes a contents organizer 620 and a contents information source 622 as data columns in addition to the same configuration as in FIG. 4. Herein, the contents organizer indicates corporations, individuals, or groups that run contents. The contents information source indicates what has been referenced for the event to be posted in the contents to be posted.

FIG. 31 shows an example of the data structure of searched information files stored in the event storage 610. The searched information file shown in FIG. 31 includes, as data columns, an event 611, an event organizer 612, a posting in the event organizer's own contents 613, an independent report generated prior to the posting in the own contents 614, a web page generated after having been posted in the own contents 615, an independent report generated after having been posted in the own contents 616.

Herein, "a posting in the event organizer's own contents" indicates posting of an event generated by the contents organizers themselves in their own contents. "An independent report generated prior to the posting in the own contents" indicates that the generated event has been posted in other contents by an independent report, etc., before being posted in the own contents. "A web page generated after having been posted in the own contents" indicates that the generated event has been posted in other contents after having been posted in the own contents, by referring to the posted contents. "An independent report generated after having been posted in the own contents" indicates that the generated event has been posted in other contents by an independent report, etc., after having been posted in the own contents.

FIG. 32 shows an example of the data structure stored in the requested information storage 630. The searched information file shown in FIG. 32 includes, as data columns, an event 631, a contents organizer generating the event 632, a public announcement date 633, a method of publicizing the event 634.

To return to an explanation of the configuration of FIG. 28, the event extracting unit 640 analyzes accumulated contents as needed and extracts events. For instance, information such as "A new release of product X from company A on February 4" is extracted as an event.

The event organizer's contents identifying unit 641 identifies the event organizer's contents by referring to the contents organizer 620 in FIG. 30 stored in a search information storage 180, when the event extracting unit 640 extracts an event. If the identified contents contains "A new release of product X from company A on February 4," it is clear that company A is the organizer of the event. If company A is found in the contents organizer 620, the information related to contents run by company A may be acquired. Furthermore, the contents organizer of the acquired contents may be identified by comparing the URL 602 and the URL column 304 of the acquired contents. For instance, when the URL (http:///–1/a.html) of the contents to be analyzed ("A new release of product X from company A on February 4" has been posted therein), as containing a URL (http://–1/) of company A, it is regarded that an event organized by company A has been posted in company A's own contents. Alternatively, when the URL of the contents to be analyzed ("A new release of product X from company A on February 4" has been posted therein) is (http://–3/c.html), as containing a URL of group X (http://–3), it is regarded that an event organized by the group A has been posted in group X's own contents. Furthermore, by referring to the contents information source 622, the information source of the contents from the contents organizer may also be identified. In the case above, the information source of the contents of group X is from an "independent report."

The contents information source determining unit 650 is used to establish the value of the contents information source 622 shown in FIG. 30.

The event generation request unit 651 requests a contents organizer (hereinafter referred to as "a contents organizer generating the event") held in a search information storage to generate an event to be publicized without being posted on a web page, or an event to be publicized by being posted only on a web page. Such a request is presumed to have been agreed upon in advance with the contents organizer generating the event. The contents organizer generating the event publicizes an event according to the requested method, and transmits the event information to the generated event receiver 652. For example, in FIG. 32, it is clear that an event generated by company D, which is the contents organizer generating the event (expected number of recruits to be hired is announced to be 500 people), is an event to be publicized without being posted on a web page.

The generated event receiver 652 receives said generated event information to be held in the requested information storage 630. Afterwards, the event-monitoring unit 653 monitors whether the event stored in the requested information storage 630 has been extracted by the event extracting unit 640. When an event that is to be publicized without being posted on a web page is extracted, the information source of the contents of the contents organizer is determined to be an independent report. Alternatively, when an event that is to be publicized by being posted only on a web page is extracted, the information source of the contents of the contents organizer is determined to be a web page.

The contents information source controlling unit 654 stores results monitored by the event-monitoring unit 653 in the corresponding contents information source 622 in FIG. 30, held in a search information storage 180. In addition, values may be entered for the contents information source 622 according to research based on auditing the contents operators.

The event generation controlling unit 642 extracts events, and stores data shown in FIG. 31 in the event storage 610 after identifying the event organizer (the contents organizer who has posted the event) and the contents information source. If there is an identical event in the event storage 610, the event generation controlling unit 642 increases the value of corresponding items among items related to the event, including a posting in the event organizer's own contents 613, an independent report generated prior to the posting in the own contents 614, a web page generated after having been posted in the own contents 615, and an independent report generated after having been posted in the own contents 616. If there is no identical event, a record is added as a new event; then, the event 611 and the event organizer 612 are entered. Furthermore, a FIG. 1 is entered into either the posting in the event organizer's own contents 613 or the independent report generated prior to the posting in the own contents 614, whichever corresponds most closely. Normally, for an event, after a certain period of time, the number of appearances are considered to be decreased. Therefore, after a certain period of time following the first time when an event is generated, when the event is extracted, the unit may do nothing.

The update appropriateness determining unit 660 determines whether an event organizer's own contents are updated appropriately by referring to the event storage 610.

For instance, when an event shown in FIG. 31 is (September 6, announcement of expected number of recruits to be hired, company W), and the event organizer is "company W," it indicates that the posting in the organizer's own contents are "0" and the independent report generated prior to the posting in the own contents are "10." It is determined as not having been posted in the own contents, even though it had been posted in other contents. In this case, it is determined that an appropriate update has not been made. Likewise, when an event is (February 6, Mr. R. Kagoshima's visit, company A), and the event organizer is "company A," it indicates that the posting in the organizer's own contents are "1," the independent report generated prior to the posting in the own contents are "5," the web page generated after having been posted in the own contents are "6," and the independent report generated after having been posted in the own contents are "8." This can be determined as, even though it had been posted in the own contents, the posting in the own contents were delayed due to the prior posting in the other contents. Furthermore, in this case, it is determined that an appropriate update has not been made. However, for values such as "an independent report generated prior to the posting" in the own contents, it may be determined depending on whether the appropriate update has been made, when exceeding the threshold value. An example in which the update has been made appropriately in one in which the event is (February 4, a new release of product X, company A), and the event organizer is (company A). In this case, after having been posted in the own contents, the event was posted in other contents. In this case, it is determined that an appropriate update has not been made. Even in such a case, if "the independent report generated after having been posted" in the own contents are "0" or extremely low, then it is determined that the event is not important enough to be picked up as contents for an independent report, so as to whether the update is appropriate, it may be treated as being undetermined.

In the present embodiment, a means for determining whether the contents have been appropriately updated is to observe how an event generated by an organizer of the contents to be evaluated proliferates its own contents, which is the contents to be evaluated, or to other contents. When this is accomplished, those who run the contents will try to update information on a timely basis, and moreover contribute to enhancement of the reliability degree of the contents.

Furthermore, in the present embodiment, even if an event requested from the event generation request unit 651 is independent, both an event that is to be publicized without being posted on a web page and an event that is to be publicized by being posted only on a web page may be requested from the event generation request unit 651 at the same time. In this case, it is preferable that the types of both events be similar. Moreover, "the same time" includes not only the same day but also a range of several days or a few weeks.

Accordingly, by regarding the way in which information related to an event that is to be publicized by being posted only on a web page spreads to other contents in the standard way that information related to any type of event spreads to other contents, based on that standard, the way in which information related to an event that is to be publicized without being posted on a web page spreads to other contents may be evaluated.

For instance, the period from when an event is posted only on a web page and is publicized, until it is posted in other contents, and the way in which the number of other contents posting the event increases as time elapses may be regarded as an evaluation standard for the manner of spreading to other contents. If the way the information related to an event that is to be publicized without being posted on a web page spreads to other contents are the same as or similar to the evaluation standard, it is determined that the event that has been publicized without being posted on a web page was posted in the own contents shortly after having been publicized.

Furthermore, if an event that is to be publicized without being posted on a web page is extracted after the second access of other contents, an event that is similar to the type of event that is to be publicized without being posted on a web page and that is to be publicized by being posted only on a web page at the same time, is either posted in the other contents extracted after the second one, or was posted in the past, it may be assumed that the information source of the other contents extracted after the second one is other contents in which the event that is to be publicized without being posted on a web page has been posted for the first time, or in other words, from a web page. Alternatively, if an event that is to be publicized by being posted only on a web page is not posted in other contents extracted after the second one, nor was it posted in the past, it may be assumed that the information source of the other contents extracted after the second one is from an independent report.

Embodiment 11

Figure 33:
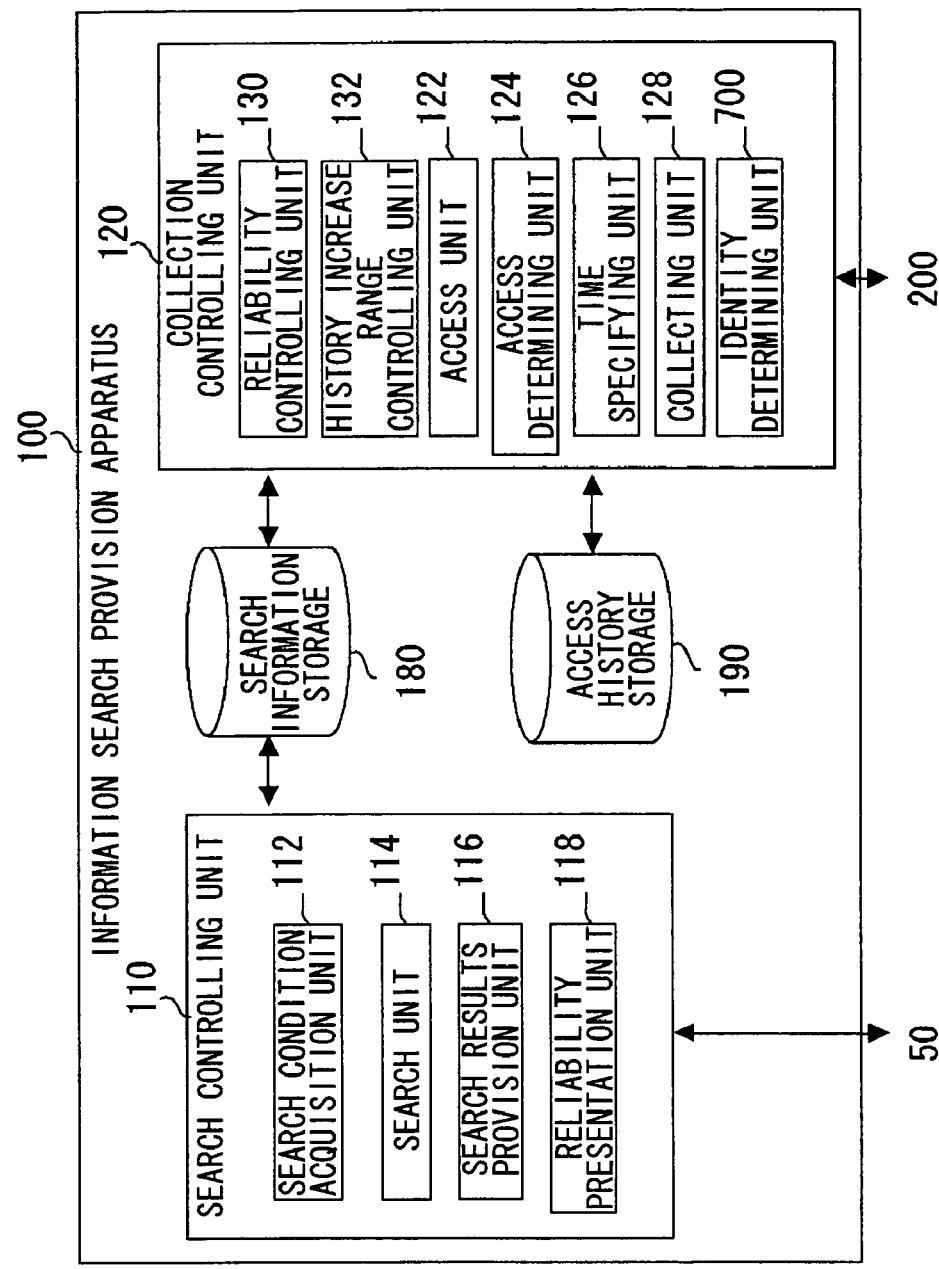
FIG. 33 is a diagram showing the configuration of an information search provision apparatus related to Embodiment 11.

In Embodiment 1, depending on whether it was possible to collect contents to be evaluated, the reliability degree of the contents is increased or decreased. In Embodiment 11, in addition to the results of the possibility/impossibility of the collection, the identity of the contents to be evaluated, collected at different timings is determined, and the reliability degree of the contents to be evaluated is increased or decreased, according to the determination. FIG. 33 shows the configuration of an information search provision apparatus 100 related to Embodiment 11. For the same configuration as in FIG. 3, the same symbols are given and the explanations are omitted as appropriate. In addition to the configuration of the information search provision apparatus 100 related to Embodiment 1 shown in FIG. 3, the information search provision apparatus 100 related to Embodiment 11 further comprises an identity determining unit 700.

The identity determining unit 700 determines the identity of the contents to be evaluated, collected at different timings. More specifically, when determining the identity of the contents to be evaluated, the contents to be evaluated would be newly collected by a collecting unit 128. The identity determining unit 700 determines whether the identity of the contents to be evaluated is maintained, by comparing the contents to be evaluated, collected in the past and stored in a Contents column 306 in a search information storage 180, with the contents to be evaluated, newly collected.

A reliability controlling unit 130 increases the reliability degree of the contents to be evaluated, when the identity determining unit 700 determines that the identity of the contents to be evaluated is maintained. Alternatively, the reliability controlling unit 130 may decrease the reliability degree of the contents to be evaluated, when the identity determining unit 700 determines that the identity of the contents to be evaluated is not maintained. Accordingly, a web page, for example, in which the identity of the contents are maintained, may be differentiated from a web page in which the identity of the contents are not maintained.

Furthermore, the identity determining unit 700 does not have to make a complete match between the contents to be evaluated, collected in the past, and the contents of the newly collected contents to be evaluated, as a condition for an identity. For instance, in contents such as a blog or news, there are cases in which new items are added one after another to items posted in the past. In such a case, even if the contents to be evaluated, collected at an earlier time is determined to be identical to part of the contents to be evaluated, collected at a subsequent time, the identity determining unit 700 may determine that the identity is maintained. Accordingly, even in a case in which the contents to be evaluated, collected at an earlier time, is included as part of the contents to be evaluated, collected at a subsequent time, and at the same time, the identity of the contents to be evaluated, collected at an earlier time, is maintained, the reliability degree is increased.

Embodiment 12

Figure 34:
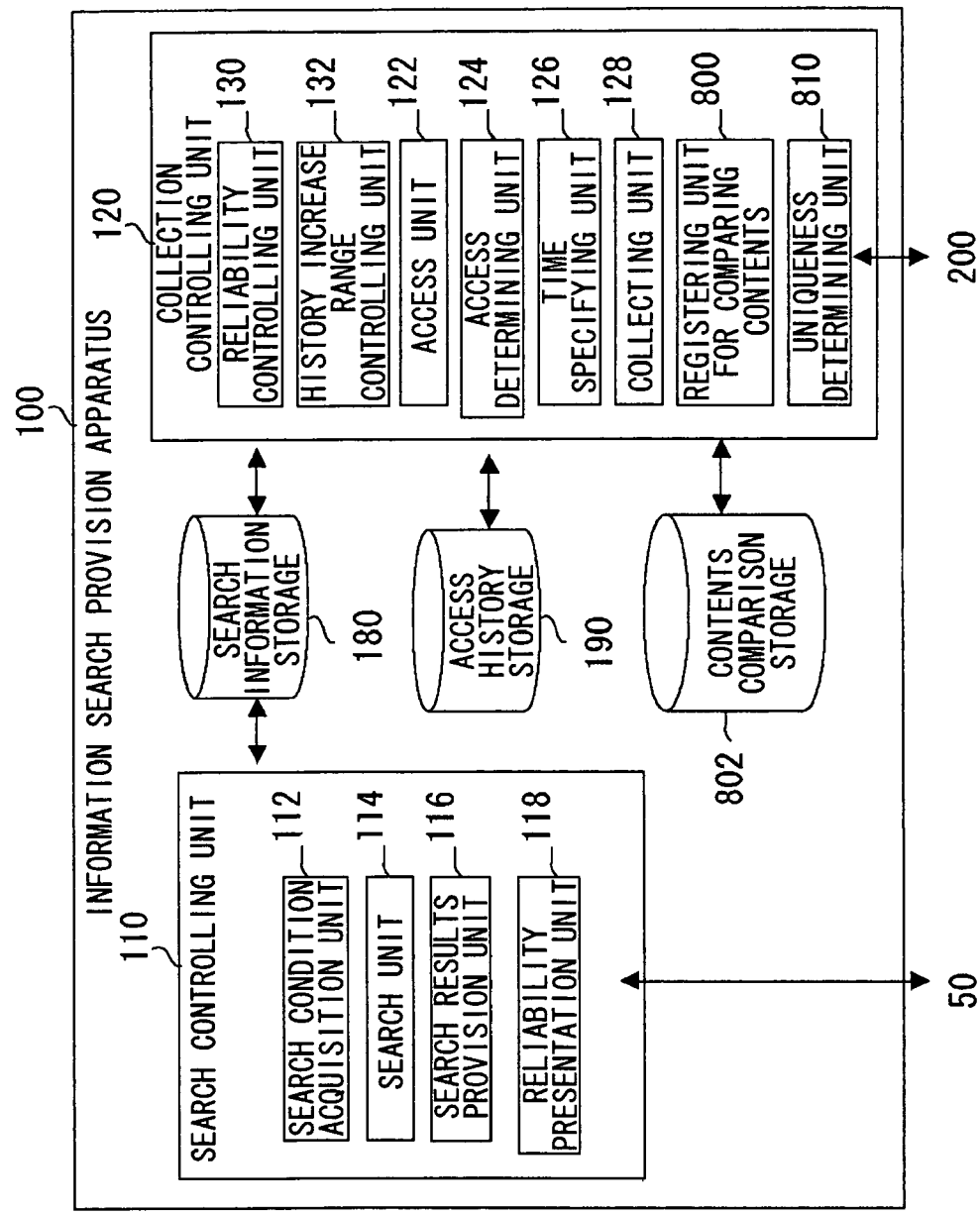
FIG. 34 is a diagram showing the configuration of an information search provision apparatus related to Embodiment 12.

In Embodiment 1, depending on whether it was possible to collect contents to be evaluated, the reliability degree of the contents is increased or decreased. In Embodiment 12, in addition to results of the possibility/impossibility of the collection, the uniqueness of the contents to be evaluated is determined, depending on the determination, the reliability degree of the contents to be evaluated is increased or decreased. FIG. 34 shows the configuration of an information search provision apparatus 100 related to Embodiment 12. For the same configuration as in FIG. 3, the same symbols are given and the explanations are omitted as appropriate. In addition to the configuration of the information search provision apparatus 100 related to Embodiment 1 shown in FIG. 3, the information search provision apparatus 100 related to Embodiment 12 further comprises a registering unit for comparing contents 800, a contents comparison storage 802, and a uniqueness determining unit 810.

The registering unit for comparing contents 800 receives unique contents such as images, moving pictures, text, audio data, and programs, etc., for comparing contents, to be registered in the contents comparison storage 802. It is preferable that the compared contents already be copyrighted. In the present embodiment, when registering contents, information on the registrant of the contents and the rights holder of the contents would also be registered together.

FIG. 35 shows an example of contents comparison information files, stored in the contents comparison storage 802. A contents comparison information file stores the contents 804, registration date 805, registrant 806, and rights holder 807, mapped to a contents ID 803 to identify the contents.

The uniqueness determining unit 810 determines the uniqueness of the contents to be evaluated, by comparing the contents to be evaluated with the compared contents that had already been collected at the time when the contents to be evaluated was collected. The uniqueness determining unit 810 examines whether the contents to be evaluated has already been registered, by referring to the contents comparison storage 802. If the contents to be evaluated has not been registered in the contents comparison storage 802, it is determined that the contents to be evaluated is highly unique.

Furthermore, even if the contents to be evaluated has not been registered in the contents comparison storage 802, when it is determined that the contents to be evaluated is a partial modification of contents registered in the contents comparison storage 802, the uniqueness determining unit 810 may determine that the contents to be evaluated is low in terms of uniqueness. Whether or not the contents to be evaluated is a partial modification of contents registered in the contents comparison storage 802 may be determined, for example, by quantifying the similarities between the contents to be evaluated and the contents registered in the contents comparison storage 802 based on a predetermined standard, depending on whether the obtained figure is above the standard value.

The reliability controlling unit 130 increases the reliability degree of the contents to be evaluated, when the uniqueness determining unit 810 determines that the uniqueness of the contents to be evaluated is high. Alternatively, the reliability controlling unit 130 may decrease the reliability degree of the contents to be evaluated, when the uniqueness determining unit 810 determines that the contents to be evaluated is a modification of other contents. Furthermore, even if the contents to be evaluated is a modification of other contents, if the rights holder in the contents comparison storage 802 and the provider of the contents to be evaluated are the same, it is not necessary to lower the reliability degree of the contents to be evaluated. Accordingly, a web page, for example, containing contents that is highly unique may be differentiated from a web page containing contents that is low in terms of uniqueness.

Embodiment 13

In Embodiment 1, depending on whether it was possible to collect contents to be evaluated, the reliability degree of the contents is increased or decreased. It has already been mentioned that the reliability degree of the contents run by an information provider also corresponds to the reliability degree of other systems run by the same. In Embodiment 13, the reliability degree of location information for the contents are obtained in accordance with the reliability degree of the contents. For the location information of the contents, the URL of the contents and a domain name further extracted from said URL is given as a practical example. In addition, if an IP address assigned for the domain name is fixed, the reliability degree of the IP address is obtained by relating the IP address and the reliability degree of the contents. Furthermore, the reliability degree of the electronic mail address is obtained by relating the reliability degree of an electronic mail address containing the domain name and the reliability degree of the contents. By obtaining the reliability degree of an individual domain name or of an IP address, the reliability degree of each group classified by predetermined attributes with respect to the domain name or the IP address is obtained.

Figure 36:
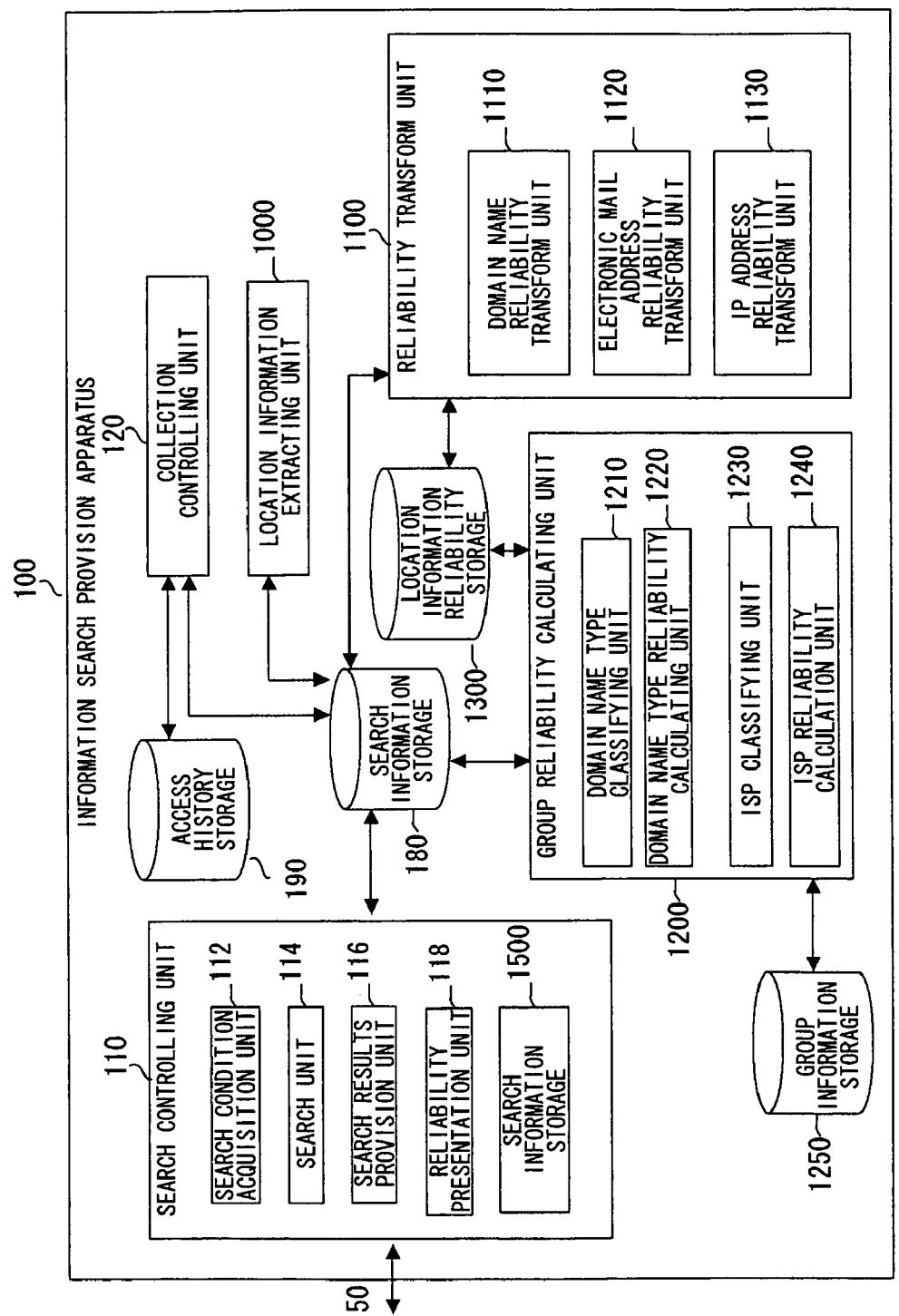
FIG. 36 is a diagram showing the configuration of an information search provision apparatus related to Embodiment 13.

FIG. 36 shows the configuration of an information search provision apparatus 100 related to Embodiment 13. With regard to the information search provision apparatus 100 related to Embodiment 13, for the same configuration as in FIG. 3, the same symbols are given and the explanations are omitted as appropriate. In addition to the configuration related to the information search provision apparatus 100 of Embodiment 1, the information search provision apparatus 100 related to Embodiment 13 comprises a location information extracting unit 1000, a reliability transform unit 1100, a group reliability calculating unit 1200, a group information storage 1250, and a location information reliability storage 1300. Furthermore, a search controlling unit 110 provided with the information search provision apparatus 100 related to Embodiment 13 further includes a search condition analysis unit 1500.

The location information extracting unit 1000 extracts the domain name from a URL held in a search information storage 180, to be stored in a search information storage 180. For example, the location information extracting unit 1000 extracts the domain name "abc.co.jp" from the URL "http://www.abc.co.jp/a.html." FIG. 37 shows an example of the data structure of searched information files stored in the search information storage 180. The search information storage 180 in the present embodiment includes an extracted domain name 1400 in addition to the configuration shown in FIG. 4. The domain name extracted from the location information extracting unit 1000 is written into a column of the extracted domain name 1400.

The reliability transform unit 1100 includes a domain name reliability transform unit 1110, an electronic mail address reliability transform unit 1120, and an IP address reliability transform unit 1130.

The domain name reliability transform unit 1110 calculates the reliability degree of a domain name based on the reliability degree of contents, to be stored in the location information reliability storage 1300. Principally, the reliability degree of a domain name is obtained directly from the reliability degree of contents. However, information other than the reliability degree of contents may be added to calculate the reliability degree of a domain name. For example, information such as a group owning the domain name or domain attributes or the unjustified use of a domain name may be added to calculate the reliability degree of a domain name.

To calculate the reliability degree of a domain name may be considered an equivalent of calculating the reliability degree of an electronic mail address containing the domain name. Hence, the electronic mail address reliability transform unit 1120 calculates the reliability degree of a domain name contained in an electronic mail address based on the reliability degree of the contents, to be stored in the location information reliability storage 1300. Principally, the reliability degree of an electronic mail address matches the reliability degree of the domain name obtained from the reliability degree of contents. However, information other than the reliability degree of contents may be added for the calculation. The reliability degree of an electronic mail address may be calculated by adding information other than contents, such as the domain name used for unsolicited spam messages, etc.

Furthermore, the reliability degree of a domain name may be considered equivalent to the reliability degree of an IP address assigned to the domain name. Hence, the IP address reliability transform unit 1130 calculates the reliability degree of a domain name based on the reliability degree of contents, the calculated reliability degree is stored in the location information reliability storage 1300 as the reliability degree of an IP address assigned to the domain name. Principally, the reliability degree of an IP address matches the reliability degree of the domain name. However, information other than the reliability degree of contents may be added to calculate the reliability degree of a domain name. For example, the reliability degree of an IP address may be calculated by adding information such as spamming due to the server to which the IP address has been assigned, or a security vulnerability of the server, etc.

The group reliability calculating unit 1200 includes a domain name type classifying unit 1210, a domain name type reliability calculating unit 1220, an ISP classifying unit 1230, and an ISP reliability calculating unit 1240.

The domain name type classifying unit 1210 further extracts the domain name according to type, such as com, co.jp, etc., from a domain name extracted from a URL held in a search information storage 180, to be stored in the search information storage 180. As shown in FIG. 37, with the search information storage 180 of the present embodiment, the domain name type 1402 has been further added as a data column. The domain name type extracted by the domain name type classifying unit 1210 is written into a column of the domain name type 1402.

The domain name reliability calculating unit 1220 calculates the reliability degree per domain type, such as com, co.jp, etc., to be stored in the location information reliability storage 1300. For instance, if the domain name reliability 1306 of a .com domain is 300, 300, and 200, respectively, $(300+300+200) \div 3=267$ is obtained.

Figure 38:
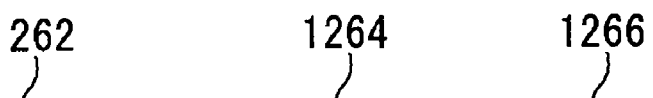
FIG. 38 is a diagram showing one example of an IP address information table stored in the group information storage.

The ISP classifying unit 1230 acquires information related to a corresponding ISP from an IP Address column 302 stored in a search information storage 180, to be stored in the search information storage 180, by referring to the group information storage 1250. FIG. 38 shows an example of an IP address information table stored in the group information storage 1250. The IP address information table shown in FIG. 38 includes an IP address 1262, a registry in charge by nation 1264 being in charge of each IP address, and an ISP in charge 1266 being in charge of each ISP. Furthermore, information on IP addresses to be stored in the group information storage 1250 and the associated ISP in charge, etc., is capable of being added or corrected when necessary by a grouping information input unit (not illustrated).

When the ISP classifying unit 1230 extracts information on the ISP in charge corresponding to one IP address, to be stored in the search information storage 180, by referring to the ISP in charge corresponding to the IP address in reference to the IP address information table shown in FIG. 8. As shown in FIG. 37, in the search information storage 180 of the present embodiment, an ISP in charge 1404 has been further added as a data column. The ISPs extracted by the ISP classifying unit 1230 are written into a column of the ISP in charge 1404. The search information storage 180 may also store information in a relevant registry corresponding to the IP address, name of the server, etc.

The ISP reliability calculating unit 1240 calculates the reliability degree per ISP, to be stored in the location information reliability storage 1300, by referring to the search information storage 180. For example, if the reliability degree of an IP address of company A as the ISP is 600, 200, and 80, respectively, the reliability degree of the ISP is obtained by $(600+200+80) \div 3=293$.

The location information reliability storage 1300 contains degrees of reliability related to the location of contents, such as the reliability degree per domain name or IP address, the reliability degree per domain name type, and the reliability degree per ISP in charge, etc.

Figure 40:
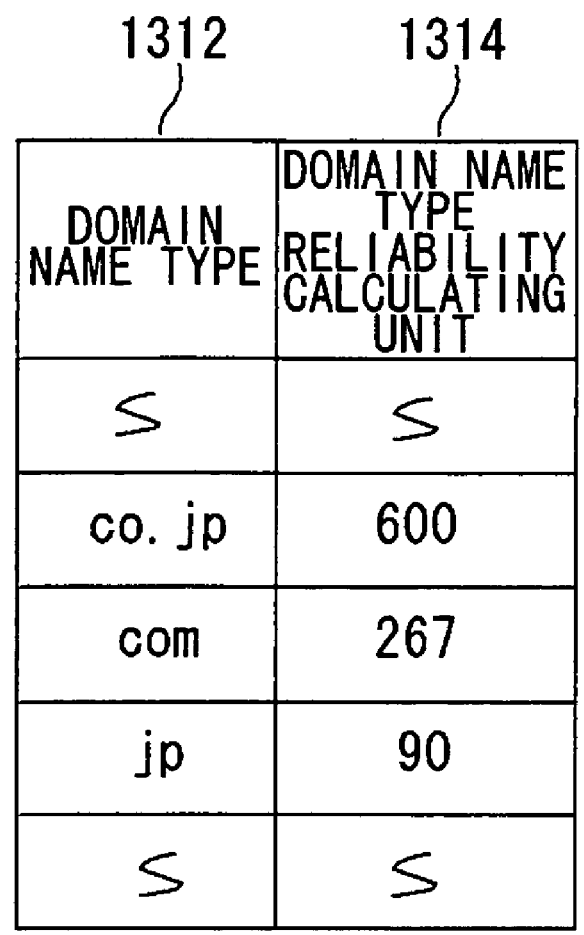
FIG. 40 is a diagram showing one example of a table of various degrees of reliability stored in the location information reliability storage.
Figure 41:
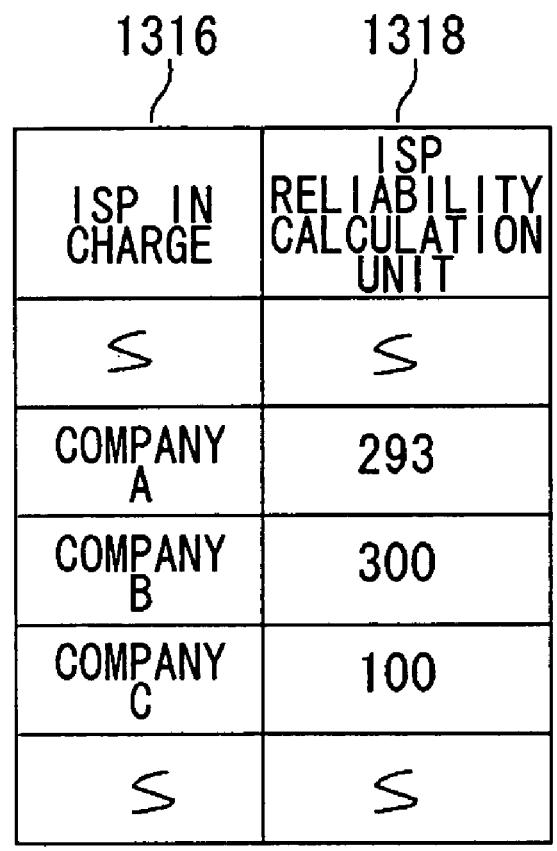
FIG. 41 is a diagram showing one example of a table of various degrees of reliability stored in the location information reliability storage.

FIG. 39, FIG. 40, and FIG. 41 respectively show examples of a table of various reliability degree stored in the location information storage 1300.

The FIG. 39 shows an example of a reliability table mapped to a domain name and an IP address. The reliability table shown in FIG. 39 includes an IP address 1302, an extracted domain name 1304, the domain name reliability 1306, the electronic mail address reliability 1308, and the IP address reliability 1310. By referring to the Reliability degree table shown in FIG. 39, it is possible to extract the domain name reliability 1306, the electronic mail address reliability 1308, or the IP address reliability 1310, corresponding to a particular IP address 1302 or extracted domain name 1304.

FIG. 40 shows an example of the Reliability degree table mapped to a domain name type. The Reliability degree table shown in FIG. 40 includes a domain name type 1312 and the domain name reliability 1314. By referring to the Reliability degree table shown in FIG. 40, it is possible to extract the domain name reliability 1314 corresponding to a particular domain name type 1312.

FIG. 41 shows an example of the Reliability degree table mapped to an ISP in charge. The Reliability degree table shown in FIG. 41 includes an ISP in charge 1316 and the ISP reliability 1318. By referring to the Reliability degree table shown in FIG. 41, it is possible to extract the ISP reliability 1318 corresponding to a particular ISP in charge 1316.

A search conditional statement entered into a terminal apparatus 50 by a user is acquired by a search condition acquisition unit 112 of an information search provision apparatus 100. A search condition analysis unit 1500 analyzes whether an acquired search conditional statement contains a domain name, an electronic mail address, or an IP address.

Whether a search conditional statement contains a domain name is determined depending on whether the search conditional statement satisfies the configuration format of the domain name. For instance, when a search conditional statement meets the following conditions, it is determined that the search conditional statement contains a domain name.

Conditions
(1) A series of letters is separated by a period ".".
(2) The right side portion of a series of letters from the first period, when counted from the right, matches a top level domain such as "com," "net," and "jp," etc.
(3) A portion of a series of letters between the second period when counted from the right and the first period when counted from the right, matches the second level domain such as "ac" or "co."

Whether or not a search conditional statement contains an electronic mail address is determined depending on whether the search conditional statement satisfies the configuration format of an electronic mail address. For instance, if the search conditional statement is "x@y.z" (x is a series of any letters or numerals, y.z is a domain name matching the conditions above), it is determined that the search conditional statement contains an electronic mail address.

Furthermore, whether or not a search conditional statement contains an IP address is determined depending on whether the search conditional statement satisfies the configuration format of an IP address. For instance, if the search conditional statement falls in a range of "0.0.0.0-255.255.255.255," it is determined that the search conditional statement contains an IP address.

When the search condition analysis unit 1500 determines that a search conditional statement contains a domain name, a search unit 114 searches information matching the domain name of the search conditional statement from extracted domain names 1400, by referring to searched information files stored in a search information storage 180. A search results provision unit 116 provides, as the search results, a list of information obtained from the search to a terminal apparatus 50. Then, a reliability presentation unit 118 presents, to the terminal apparatus 50, the domain name reliability 1306 corresponding to the extracted domain name 1304 by referring to FIG. 39.

When the search condition analysis unit 1500 determines that a search conditional statement contains an electronic mail address, the search unit 114 searches information matching the domain name contained in an electronic mail address of the search conditional statement from extracted domain names 1400, by referring to searched information files stored in the search information storage 180. The search results provision unit 116 provides, as the search results, a list of information obtained from the search to the terminal apparatus 50. Then, the reliability presentation unit 118 presents, to the terminal apparatus 50, the electronic mail address reliability 1308 corresponding to the extracted domain name 1304, by referring to FIG. 39.

When the search condition analysis unit 1500 determines that a search conditional statement contains an IP address, the search unit 114 searches information matching the IP address of the search conditional statement from an IP Address column 302, by referring to searched information files stored in the search information storage 180. The search results provision unit 116 provides, as the search results, a list of information obtained from the search to the terminal apparatus 50. Then, the reliability presentation unit 118 presents the IP address reliability 1310 corresponding to the IP address 1302 to the terminal apparatus 50, by referring to FIG. 39.

Furthermore, when a search conditional statement is acquired by a search condition acquisition unit 112, the search condition analysis unit 1500 may analyze whether the acquired search conditional statement contains a domain name type or an ISP name.

Whether or not a search conditional statement contains a domain name type is determined depending on whether the domain name is classifiable to predetermined domain name types, in addition to whether the search conditional statement satisfies the configuration format of the domain name. In this case, it is favorable for a group information storage 1250 to store a Domain Name Type table as shown in FIG. 42. The Domain Name Type table shown in FIG. 42 includes a purpose 1270 of the use or the operation, and a nation 1272 to which the domain name has been assigned, corresponding to the domain name type 1268.

Furthermore, whether or not a search conditional statement contains an ISP is determined depending on whether the search conditional statement corresponds to any of ISP in charge 1316, by referring to the Reliability degree table shown in FIG. 41.

When the search condition analysis unit 1500 determines that a search conditional statement contains a domain name type, the search unit 114 searches information matching the domain name type of the search conditional statement from a domain name type 1402, by referring to searched information files stored in the search information storage 180. The search results provision unit 116 provides, as the search results, a list of information obtained from the search to the terminal apparatus 50. Then, a reliability presentation unit 118 presents, to the terminal apparatus 50, the domain name reliability 1314 corresponding to the domain name type 1312, by referring to FIG. 40.

When the search condition analysis unit 1500 determines that a search conditional statement contains an ISP, the search unit 114 searches information matching the ISP of the search conditional statement from an ISP in charge 1404, by referring to searched information files stored in the search information storage 180. The search results provision unit 116 provides, as the search results, a list of information obtained from the search to the terminal apparatus 50. Then, the reliability presentation unit 118 presents, to the terminal apparatus 50, the ISP reliability 1318 corresponding to the ISP in charge 1316, by referring to FIG. 41.

According to the present embodiment, based on the reliability degree of contents, by calculating the reliability degree of an IP address or a domain name, corresponding to the contents, including the reliability degree of an electronic mail address, the reliability degree of the ISP in charge, the registry, and the domain type per nation, etc., may be obtained. Thus, by quantifying not only the contents but also the reliability degree of the domain name related to the contents, etc., it is expected to have an effect on urging operators of the domain, etc., to improve the reliability degree of contents. More specifically, examples include restraining ISPs from assigning IP addresses to malicious venders, or executing appropriate policies to manage IP addresses by an entire nation.

In the present embodiment, based on the reliability degree of the contents to be provided, the reliability degree of a domain name, an electronic mail address, or an IP address is provided, but the configuration of any combinations containing at least one reliability degree among a domain name, an electronic mail address, or an IP address is possible.

The present invention has been explained thus far based on the embodiments. It is understandable for those in the industry that the embodiments are examples, various modified examples are possible in combinations of each configuration element and each treatment process thereof, and such modified examples are in a scope of the present invention. The modified examples are provided from hereon.

Modified Example 1

The information search provision apparatus 100 in the embodiments was made to exist as one apparatus, however, the information search provision apparatus 100 may be realized by cooperation between two servers as the configuration of a modified example. As an example, a search controlling unit 110 in FIG. 3 may be installed on a search server, and function blocks other than that may be placed on a collection server side. Needless to say, the configuration in FIG. 3 may be divided at a unit other than this, to distribute to the search server and to the collection server. The suitable distribution may be determined considering elements such as the convenience of management for the server administrators, the load balance of the two servers, and the communication volume of both, etc.

Modified Example 2

The information search provision apparatus 100 in Embodiment 8 is comprised of configuration elements belonged to an information search provision apparatus 100 related to Embodiment 1, Embodiment 3, Embodiment 5, Embodiment 6, and Embodiment 7, but as the configuration of other modified example, the combination thereof is not limited to this. For example, a apparatus including configuration elements of an information search provision apparatus 100 related to Embodiment 1 and configuration elements of an information search provision apparatus 100 related to Embodiment 2 may be regarded as a new information search provision apparatus 100.

Modified Example 3

In Embodiment 3, depending on whether the contents to be evaluated have been updated, the reliability degree of the contents is increased or decreased, and as a further different modified example, the information search provision apparatus 100 may comprise an analysis unit that analyzes the contents, as an analysis result by the analysis unit. When an item that increases the reliability degree of the contents to be evaluated is contained therein, the reliability degree of contents to be evaluated may be increased. Hereafter, an example of such an item is described. Furthermore, this analysis unit is presumed to internally comprise a source analysis unit that analyzes the source of a timer or a program for acquiring time information.
(a) when security measures are being implemented for contents such as SSL (Secure Sockets Layer), etc.
(b) when credit payments are handled in the contents
(c) when a paid domain name is used in the contents
(d) when a malicious program is not used in the contents
(e) when there is a large number of users and accesses to the contents
(f) when the response time is short in the event of accessing the contents
(g) when an electronic mail address in the contents contains the domain name of the web page of the contents
(h) when contents against a public order or morality such as sexual contents or violent contents, etc., is not contained Modified Example 4

In the embodiments, all the contents stored in a search information storage 180 is the subject to be presented as the search results. As a further different modified example, the information search provision apparatus 100 may comprise a presentation limit unit that presents only contents having a high reliability degree to users from the search results. There are web pages with malicious contents on the Internet, and by not presenting contents with a low reliability degree to users in the first place, accesses to web pages with a low reliability degree may be reduced among all users.

Modified Example 5

In Embodiment 7, the reliability degree of own contents and other contents related to each other was controlled at the same time, depending on consistency or lack thereof of an item to be assessed, such as recruitment related information. As a further different modified example, among contents acquired by a contents acquisition unit 147, the reliability degree of own contents may be raised as more contents posts items to be assessed. For example, suppose the item to be assessed is recruitment information "recruiting new graduates," the reliability controlling unit 130 increases the reliability degree of the own contents, as more contents contains "recruiting new graduates."

Modified Example 6

As a further different modified example, the information search provision apparatus 100 related to Embodiment 1 through 8 may further comprise a predicting unit that predicts the reliability degree of contents in future. The predicting unit predicts the reliability degree of contents to be evaluated, based on an element contributed to estimating the duration of contents contained in the contents to be evaluated. The element contributed to estimating the duration of contents is, for example, equivalent to the age of an individual if the contents information provider is an individual, equivalent to the growth rate of the company in case of a corporation. To take an example of the former, if an individual's age is "30," by "80 years old" the life of a normal being, or in other words the reliability degree of contents 50 years later, is predicted. In the event of prediction, the reliability degree of the contents 50 years later may be predicted, based on conditions under which the range of increase of the current reliability degree is to be maintained. A reliability presentation unit 118 presents the predicted reliability degree to users. Accordingly, if the reliability degree has been further increased, the users may use the contents more comfortably, not only by knowing the way the reliability degree changed in the past, but also by knowing the reliability degree of contents in the future.

Modified Example 7

In Embodiment 1, the reliability degree was controlled depending on whether it was possible for a collecting unit 128 to collect the contents. As a further different modified example, when the contents are not collected by the collecting unit 128, a confirming unit newly installed on an information search provision apparatus 100 may make a confirmation in relation to the absence of contents collection with respect to an item to be confirmed. Hereafter, an example of an item to be confirmed is described. Server transfer information or a keyword contained in server failure information is already held in a confirmation item storage (not illustrated).
(A) whether the contents contains server transfer information such as "moved," etc.
(B) whether the contents contains server failure information such as "web server unavailable," etc.

When such server transfer information or server failure information is contained in the contents to be evaluated, even if the contents to be evaluated is not collected, a reliability controlling unit 130 may control the reliability degree of the contents to be evaluated so as not to be decreased. Furthermore, then, during a period in which the information is being posted in the contents, an access determining unit 124 sets an "o" flag in an Access History column 322 of the contents to be evaluated. Moreover, for example, when the absence of the collection of the contents to be evaluated continues for ten days, the confirming unit may grasp the status of the information provider providing the web server, by accessing a database of a third party organization that manages the domain name, a key for which is a domain name of the web server on which the contents to be evaluated is posted. Accordingly, when there is no reason attributed to the responsibility of the information provider but the information provider is still unable to provide the contents, it is possible to save the contents by not decreasing the reliability degree of the contents.

Modified Example 8

In Embodiment 1 thorough 8, as the search results, the information search provision apparatus 100 shows a list of contents and the reliability degree of the contents to the user. As a further different modified example, using information such as when a user went to an actual shop or is involved in purchasing or selling by Internet shopping, the information search provision apparatus 100 acquires an evaluation value related to the reliability degree of the contents from the user to be reflected on the current reliability degree of the contents. In the present modified example, an evaluation value acquisition unit is newly installed on the information search provision apparatus 100 related to Embodiment 1 through 8.

The evaluation value acquisition unit acquires an evaluation value related to the reliability degree of contents from a user. Through the evaluation value acquisition unit, an evaluation value represented in a ten step evaluation of "−5" through "5" from low to high is acquired, the evaluation value is added by a reliability controlling unit 130 to the current reliability degree of the contents. Accordingly, it is possible to involve an evaluation with respect to the contents from the user when the contents are used. Thus, information search service capable of presenting the reliability degree with further accuracy may be realized.

Modified Example 9

In Embodiment 2, based on whether related information indicating the presence of a relationship between contents having a high reliability degree and the contents to be evaluated was contained in the contents having a high reliability degree, the presence or absence of the relationship was determined, in the present modified example, based on whether related information indicating the presence of a relationship between the contents to be evaluated and contents having a high reliability degree is contained in the contents to be evaluated, the presence or absence of the relationship is determined. For instance, a relationship determining unit 134 determines whether the related information, such as a link from the contents to be evaluated to contents having a high reliability degree is contained in the contents to be evaluated. More specifically, the relationship determining unit 134 determines whether the URL of the web page posting the contents having a high reliability degree is included in "−" of a tag "<A HREF="−"> contained in the contents to be evaluated. Then, the URL of the web page posting the contents having a high reliability degree is acquired by the relationship determining unit 134 from searched information files held in a search information storage 180.

A reliability controlling unit 130 controls in a manner in which the range of increase of the reliability degree of the contents to be evaluated when the presence of the relationship is determined by the relationship determining unit 134 is set higher than the range of increase of the reliability degree of the contents to be evaluated when the absence of the relationship is determined. Accordingly, such as it is possible to differentiate a case in which a link to a web page with a high reliability degree is available in the contents to be evaluated from a case in which a link to a web page with a high reliability degree is not available. If URLs matching with multiple sets of contents having a high reliability degree are found in the contents to be evaluated, the reliability controlling unit 130 may increase the range of increase of the reliability degree by the number of matching contents. For instance, if there are three matches, then, "3" is further added to the current range of increase of the contents to be evaluated. Accordingly, as more links to contents having a high reliability degree become available in the contents to be evaluated, the range of increase of the reliability degree may be greater.

Modified Example 10

In Embodiment 2 and Modified Example 9, the presence or absence of a relationship between the contents to be evaluated and the contents having a high reliability degree has been determined. As a further different modified example, the presence or absence of a relationship between the contents to be evaluated and contents with a low reliability degree is determined. A method of determining the presence or absence of the relationship by the relationship determining unit 134 in the present modified example is the same as the method of determining the presence or absence of the relationship in Embodiment 2 and Modified Example 9. In other words, based on whether related information indicating the presence of a relationship between the contents with a low reliability degree and the contents to be evaluated is contained in the contents with a low reliability degree, the relationship determining unit 134 determines the presence or absence of a relationship between the contents to be evaluated and the contents with a low reliability degree. Furthermore, based on whether related information indicating the presence of a relationship between the contents to be evaluated and the contents with a low reliability degree is contained in the contents to be evaluated, the relationship determining unit 134 may determine the presence or absence of the relationship between the contents to be evaluated and the contents with a low reliability degree.

In case of the former decision, a reliability controlling unit 130 does not reflect the determination of the presence of absence of the relationship made by the relationship determining unit 134 to increase or decrease the range of increase of the reliability degree of the contents to be evaluated. Since the contents with a low reliability degree are more likely to possess unreliable information, it is significant to ignore the existence of the related information such as links, etc. In case of the later decision, the reliability controlling unit 130 controls in a manner in which the range of increase of the reliability degree of the contents to be evaluated when the presence of a relationship is determined by the relationship determining unit 134 is set lower than the range of increase of the reliability degree of the contents to be evaluated when the absence of the relationship is determined. Accordingly, such as it is possible to differentiate a case in which a link to contents with a low reliability degree containing a contents against a public order and moral such as sexual contents or violent contents, etc., is present in the contents to be evaluated from a case in which a link to a web page with a low reliability degree is absent.

Modified Example 11

In Embodiment 6, from a single aspect, the reliability degree of the contents to be evaluated has been increased or decreased, in the present modified example, from multiple aspects, the reliability degree of the contents to be evaluated is increased or decreased. Then, an element extracting unit 144 extracts an element contributing to the increase or decrease in the reliability degree of said contents to be evaluated in terms of each aspect in evaluating the reliability degree. More specifically, the aspect in evaluating the reliability degree is, such as "hiring," from the contents acquired by a related contents acquisition unit 142 the element extracting unit 144 extracts an element related to "hire," which contributes to the increase or decrease in the reliability degree of the contents to be evaluated.

The aspect in evaluating the reliability degree, such as keywords related to "hire" may be held in an aspect storage preliminary (not illustrated). The keywords related to "hire" may be, for example, "the actual number of people hired" or "the number of people expected to be hired," etc. Then, on the contents acquired by the related contents acquisition unit 142, the element extracting unit 144 designates keywords held in the aspect storage and keywords held in said contribution storage, and conducts a search to acquire matching information. More specifically, when the search is performed with "the actual number of people hired" and "increase" as an AND condition, the element extracting unit 144 may extract an element contributing to increase in the reliability degree from an aspect of "hiring."

The reliability controlling unit 130 increases or decreases the reliability degree of the contents to be evaluated, by referring to the element extracted in terms of the each aspect in evaluating the reliability degree. For example, if the contents to be evaluated are provided by "ABC company," and if posted in the acquired contents as "the number of people hired by ABC company increased," then from an aspect of "hire" an element "increase" is extracted by the element extracting unit 144, and the element is classified into said a first group by a classifying unit 146. Then, a reliability controlling unit 130 increases the reliability degree of contents to be evaluated from an aspect in evaluating the reliability degree of "hire". Furthermore, the reliability controlling unit 130 may set the reliability degree in terms of each aspect to increase or decrease the reliability degree of the each aspect, based on the result extracted by the element extracting unit 144 in terms of each aspect in evaluating the reliability degree. Then, the reliability controlling unit 130 may sum each reliability degree respectively obtained in terms of each aspect, as the reliability degree of the contents to be evaluated. According to the present modified example, the reliability degree of contents to be evaluated may be evaluated from various aspects, thus increasing the accuracy of the reliability degree.

INDUSTRIAL APPLICABILITY

According to the present invention, an information search service that is highly convenient to users may be provided.

What is claimed is:

1. An information search provision apparatus comprising:
at least one processing unit that operates to perform at least the steps of acquiring a search conditional statement and providing contents, matching the search conditional statement, as a search result;
a collection unit which collects contents, to be evaluated, posted on a web page via a network at predetermined timings;
a reliability control unit which determines a value, which is indicative of a degree of reliability of the contents to be evaluated, depending on whether or not it is possible for the collection unit to collect the contents to be evaluated;
a history increase range controlling unit which controls an increase range in the value indicative of the degree of reliability of the contents to be evaluated, according to a history on whether or not it is possible for the collection unit to collect the contents to be evaluated, and
a presenting unit which displays the value, which is indicative of the degree of reliability of the contents, and the search result to a user of the apparatus on a display,
wherein the collection unit repeatedly accesses a uniform resource locator (URL) of the web page at the predetermined timings for collecting the contents to be evaluated and stores a plurality of collection histories that are indicative of whether or not the contents to be evaluated could be collected by the collection unit at the predetermined timings respectively, and
the plurality of collection histories are used to determine the degree of reliability of the contents.

2. An information search provision apparatus according to claim 1, further comprising:
an acquisition unit which acquires a search conditional statement from the user; and
a search unit which searches contents matching the acquired search conditional statement.

3. An information search provision apparatus according to claim 1, further comprising a prediction unit which predicts the degree of reliability of the contents to be evaluated, based on an element contributed to estimating a duration of contents contained in the contents to be evaluated, wherein the presenting unit displays the predicted reliability to the user on the display.

4. An information search provision apparatus according to claim 1, wherein the reliability control unit gradually increases the value indicative of the degree of reliability of the contents to be evaluated, in a period of time during which the contents to be evaluated is acquired continuously at a predetermined timing by the collection unit.

5. An information search provision apparatus according to claim 1, further comprising a relationship determining unit which determines the presence or absence of a relationship between highly reliable contents and the contents to be evaluated, wherein the reliability control unit controls in a manner that an increase range of the contents to be evaluated when the presence of a relation is determined by the relationship determining unit is set higher than that when the absence thereof is determined.

6. An information search provision apparatus according to claim 5, wherein, based on whether or not related information indicative of the presence of a relationship between highly reliable contents and the contents to be evaluated is contained in the highly reliable contents, the relationship determining unit determines the presence or absence of a relationship between highly reliable contents and the contents to be evaluated.

7. An information search provision apparatus according to claim 1, further comprising:
- an access unit which accesses a server by referring to location information indicative of a location of the server open to the public through a web page;
- an access determining unit which determines whether an access of the access unit to the server is allowed or not;
- an access history storage which stores correspondence between a decision result by the access determining unit and timing at which the access unit has accessed the server; and
- a timing specifying unit which specifies timing at which the access of the access unit to the server was first successful, by referring to the correspondence,
- wherein the reliability control unit starts performing a control of increasing or decreasing the value, which is indicative of the clearer of reliability, at the specified timing.

8. An information search provision apparatus according to claim 1, further comprising:
- a specifying unit which specifies location information indicative of a location of the contents to be evaluated; and
- a reliability transform unit which transforms the value, which is indicative of the degree of reliability, of the contents to be evaluated, increased or decreased by the reliability control unit into a value, which is indicative of a degree of reliability of the location information.

9. An information search provision apparatus according to claim 8, further comprising: a location information classifying unit which classifies the location information into a plurality of groups each of which belongs to a common attribute; and a location information group reliability calculating unit which calculates a value, which is indicative of a degree of reliability of location information for each of the plurality of classified groups.

10. An information search provision apparatus according to claim 8, wherein the specifying unit specifies a domain name as the location information, and
- wherein the reliability transform unit transforms the value, which is indicative of the degree of reliability of the contents to be evaluated into a value, which is indicative of a degree of reliability of the domain name.

11. An information search provision apparatus according to claim 8, wherein the specifying unit specifies an IP address as the location information, and
- wherein the reliability transform unit transforms the value, which is indicative of the degree of reliability of the contents to be evaluated into a value, which is indicative of a degree of reliability of the IP address.

12. An information search provision apparatus according to claim 8, wherein the reliability transform unit calculates a value, which is indicative of a degree of reliability of an electronic mail address including the location information, based on the obtained value, which is indicative of the degree of reliability of the location information.

13. An information search provision apparatus comprising:
- at least one processing unit that operates to perform at least the steps of acquiring a search conditional statement and providing contents, matching the search conditional statement, as a search result;
- a collection unit which repeatedly collects contents, to be evaluated, posted on a web page via a network at predetermined timings;
- a comparison unit which compares the collected contents to be evaluated with subsequently collected contents, to be evaluated, posted on the same web page;
- an update determining unit which identifies whether an update was performed on the contents to be evaluated, based on a result of the comparison;
- a reliability control unit which determines a value, which is indicative of a degree of reliability of the contents to be evaluated according to a result of the determination by the update determining unit; and
- a presenting unit which displays the value, which is indicative of the degree of reliability of the searched contents, and the search result to a user of the apparatus on a display,
- wherein a plurality of updates on the contents are used to determine the degree of reliability of the contents.

14. An information search provision apparatus according to claim 13, wherein the reliability control unit gradually increases the value indicative of the degree of reliability of the contents to be evaluated, in a period of time during which it is determined continuously at predetermined timings that the contents to be evaluated are updated by the update determining unit.

15. An information search provision apparatus according to claim 13, further comprising an update analysis unit which analyzes whether an update of the contents is intrinsically required or not,
- wherein the reliability control unit increases or decreases the value indicative of the degree of reliability of the contents to be evaluated, according to results of the update determining unit and the update analysis unit.

16. An information search provision apparatus according to claim 13, further comprising:
- an access unit which accesses a server by referring to location information indicative of a location of the server open to the public through a web page;
- an access determining unit which determines whether an access of the access unit to the server is allowed or not;
- an access history storage which stores correspondence between a decision result by the access determining unit and timing at which the access unit has accessed the server; and
- a timing specifying unit which specifies timing at which the access of the access unit to the server was first successful, by referring to the correspondence,
- wherein the reliability control unit starts performing a control of increasing or decreasing the value, which is indicative of the degree of reliability, at the specified timing.

17. An information search provision apparatus according to claim 13, further comprising:
- a specifying unit which specifies location information indicative of a location of the contents to be evaluated; and
- a reliability transform unit which transforms the value, which is indicative of the degree of reliability, of the contents to be evaluated, increased or decreased by the reliability control unit into a value, which is indicative of a degree of reliability of the location information.

18. An information search provision apparatus according to claim 17, further comprising:
- a location information classifying unit which classifies the location information into a plurality of groups each of which belongs to a common attribute; and
- a location information group reliability calculating unit which calculates a value, which is indicative of a degree of reliability of location information for each of the plurality of classified groups.

19. An information search provision apparatus according to claim 17, wherein the specifying unit specifies a domain name as the location information, and
wherein the reliability transform unit transforms the value, which is indicative of the degree of reliability of the contents to be evaluated into a value, which is indicative of a degree of reliability of the domain name.

20. An information search provision apparatus according to claim 17, wherein the specifying unit specifies an IP address as the location information, and
wherein the reliability transform unit transforms the value, which is indicative of the degree of reliability of the contents to be evaluated into a value, which is indicative of a degree of reliability of the IP address.

21. An information search provision apparatus according to claim 17, wherein the reliability transform unit calculates a value, which is indicative of a degree of reliability of an electronic mail address including the location information, based on the obtained value, which is indicative of the degree of reliability of the location information.

22. An information search provision apparatus comprising:
at least one processing unit that operates to perform at least the steps of acquiring a search conditional statement and providing contents, matching the search conditional statement, as a search result;
a related-contents acquisition unit which acquires contents related to contents to be evaluated;
a contribution storage which stores keywords as elements which contribute to increase in a value, which is indicative of a degree of reliability of the contents to be evaluated, and/or keywords as elements which contribute to decrease in the value;
an element extraction unit which extracts an element, which is one of the keywords stored in the contribution storage, from the acquired contents;
a reliability control unit which increases or decreases the value, which is indicative of the degree of reliability of the contents to be evaluated, by referring to the extracted element; and
a presenting unit which displays the value, which is indicative of the degree of reliability of the searched contents, and the search result to a user of the apparatus on a display.

23. An information search provision apparatus according to claim 22, wherein, in terms of each aspect in evaluating the degree of reliability, the element extraction unit extracts an element contributing to increase or decrease in the value, which is indicative of the degree of reliability of the contents to be evaluated, and
wherein the reliability control unit increases or decreases the value, which is indicative of the degree of reliability of the contents to be evaluated, by referring to the element extracted in terms of the each aspect in evaluating the degree of reliability.

24. An information search provision apparatus according to claim 22, further comprising a classifying unit which classifies each extracted element into: (i) a first group containing elements that contribute to the increase in the value, which is indicative of the degree of reliability of the contents to be evaluated, or (ii) a second group containing elements that contribute to the decrease in the value, which is indicative of the degree of reliability of the contents to be evaluated, and
wherein when the number of elements in the first group classified by the classifying unit is greater than that in the second group, the reliability control unit increases the value, which is indicative of the degree of reliability of the contents to be evaluated.

25. An information search provision apparatus according to claim 22, further comprising:
an access unit which accesses a server by referring to location information indicative of a location of the server open to the public through a web page;
an access determining unit which determines whether access of the access unit to the server is allowed or not;
an access history storage which stores correspondence between a decision result by the access determining unit and timing at which the access unit has accessed the server; and
a timing specifying unit which specifies timing at which the access of the access unit to the server was first successful, by referring to the correspondence,
wherein the reliability control unit starts performing a control of increasing or decreasing the value, which is indicative of the degree of reliability, at the specified timing.

26. An information search provision apparatus according to claim 22, further comprising:
a specifying unit which specifies location information indicative of a location of the contents to be evaluated; and
a reliability transform unit which transforms the value, which is indicative of the degree of reliability, of the contents to be evaluated, increased or decreased by the reliability control unit into a value, which is indicative of a degree of reliability of the location information.

27. An information search provision apparatus according to claim 26, further comprising:
a location information classifying unit which classifies the location information into a plurality of groups each of which belongs to a common attribute; and
a location information group reliability calculating unit which calculates a value, which is indicative of a degree of reliability of location information for each of the plurality of classified groups.

28. An information search provision apparatus according to claim 26, wherein the specifying unit specifies a domain name as the location information, and
wherein the reliability transform unit transforms the value, which is indicative of the degree of reliability of the contents to be evaluated into a value, which is indicative of a degree of reliability of the domain name.

29. An Information search provision apparatus according to claim 26, wherein the specifying unit specifies an IP address as the location information, and
wherein the reliability transform unit transforms the value, which is indicative of the degree of reliability of the contents to be evaluated into a value, which is indicative of a degree of reliability of the IP address.

30. An information search provision apparatus according to claim 26, wherein the reliability transform unit calculates a value, which is indicative of a degree of reliability of an electronic mail address including the location information, based on the obtained value, which is indicative of the degree of reliability of the location information.

31. An information search provision apparatus comprising:
at least one processing unit that operates to perform at least the steps of acquiring a search conditional statement and providing contents, matching the search conditional statement, as a search result;
a contents acquisition unit which acquires contents containing an item to be assessed, the item being associated with a company;
a contents specifying unit which specifies own contents provided by the company and serving as an information source of the item to be assessed from among the contents acquired by the contents acquisition unit;

a consistency determining unit which determines consistency of the item to be assessed in between the specified own contents and the acquired contents, other than the own contents; and a reliability control unit which increases or decreases a value indicative of a degree of reliability of the own contents, and a value indicative of a degree of reliability of the other contents, according to the decision made by the consistency determining unit; and a presenting unit which displays the value indicative of the degree of reliability of the searched contents, the value indicative of the degree of reliability of the other contents, and the search result to a user of the apparatus on a display.

32. An information search provision apparatus according to claim 31, wherein when both the value, which is indicative of the degree of reliability of the own contents, and the value indicative of the degree of reliability of the other contents, are high and the presence of consistency of the item to be assessed is determined by the consistency determining unit, the reliability control unit increases both the value indicative of the degree of reliability of the own contents and the value indicative of the degree of reliability of the other contents.

33. An information search provision apparatus according to claim 31, further comprising:

an access unit which accesses a server by referring to location information indicative of a location of the server open to the public through a web page;

an access determining unit which determines whether access of the access unit to the server is allowed or not;

an access history storage which stores correspondence between a decision result by the access determining unit and timing at which the access unit has accessed the server; and a timing specifying unit which specifies timing at which the access of the access unit to the server was first successful, by referring to the correspondence, wherein the reliability control unit starts performing a control of increasing or decreasing the value, which is indicative of the degree of reliability, at the specified timing.

34. An information search provision apparatus according to claim 31, further comprising:

a specifying unit which specifies location information indicative of a location of the contents to be evaluated; and a reliability transform unit which transforms the value, which is indicative of the degree of reliability, of the contents to be evaluated, increased or decreased by the reliability control unit into a value, which is indicative of the degree of reliability of the location information.

35. An information search provision apparatus according to claim 34, further comprising: a location information classifying unit which classifies the location information into a plurality of groups each of which belongs to a common attribute; and a location information group reliability calculating unit which calculates a value, which is indicative of a degree of reliability of location information for each of the plurality of classified groups.

36. An information search provision apparatus according to claim 34, wherein the specifying unit specifies a domain name as the location information, and wherein the reliability transform unit transforms the value, which is indicative of the degree of reliability of the contents to be evaluated into a value, which is indicative of a degree of reliability of the domain name.

37. An information search provision apparatus according to claim 34, wherein the specifying unit specifies an IP address as the location information, and wherein the reliability transform unit transforms the value, which is indicative of the degree of reliability of the contents to be evaluated into a value, which is indicative of a degree of reliability of the IP address.

38. An information search provision apparatus according to claim 34, wherein the reliability transform unit calculates a value, which is indicative of a degree of reliability of an electronic mail address including the location information, based on the obtained value, which is indicative of the degree of reliability of the location information.

39. An information search provision system including a terminal apparatus connected on a network, a server for providing a web page via the network and an information search provision apparatus comprising:

a collection unit which collects contents, to be evaluated, posted on a web page via the network at predetermined timings;

at least one processing unit that operates to perform at least the steps of providing contents, matching a search conditional statement, among the collected contents as a search result to the terminal apparatus; and a reliability control unit which determines a value, which is indicative of a degree of reliability of the contents to be evaluated, depending on whether it is possible to collect the contents to be evaluated;

a history increase range controlling unit which controls an increase range in the value indicative of the degree of reliability of the contents to be evaluated, according to a history on whether or not it is possible for the collection unit to collect the contents to be evaluated; and a presenting unit which displays the value, which is indicative of the degree of reliability of the contents, and the search result to a user of the system on a display, wherein the collection unit repeatedly accesses a uniform resource locator (URL) of the web page at the predetermined timings for collecting the contents to be evaluated, and stores a plurality of collection histories indicative of whether or not the contents to be evaluated could be collected by the collection unit at the predetermined timings respectively, and the plurality of collection histories are used to determine the degree of reliability of the contents.

40. An information search provision system, comprising:

a contents providing apparatus which posts contents to be evaluated, on a web page;

a terminal apparatus which accesses the contents to be evaluated, via a network; and an information search provision apparatus, wherein the terminal apparatus includes an information transmitting unit which transmits client information indicative of the status of access to the contents from the terminal apparatus, and wherein the information search provision apparatus includes:

at least one processing unit that operates to perform at least the steps of acquiring a search conditional statement and providing contents, matching the search conditional statement, as a search result;

an information receiver which receives directly or indirectly the client information transmitted from the terminal apparatus that has accessed via the network the contents to be evaluated; and a reliability varying unit which increases or decreases a value, which is indicative of a degree of reliability of the contents to be evaluated, based on the client information; and a presenting unit which displays the value, which is indicative of the degree of reliability of the searched contents, and the search result to a user of the system on a display.

41. An information search provision system according to claim 40, wherein the information transmitting unit transmits, as the client information, information related to access to the contents to be evaluated, and wherein the reliability varying unit increases or decreases the value, which is indicative of the degree of reliability of the contents to be evaluated, according to a status of access from the terminal apparatus to the contents to be evaluated.

42. An information search provision system according to claim 40, wherein the information transmitting unit transmits, as the client information, information transferred from the terminal apparatus to the contents to be evaluated, and wherein the reliability varying unit increases or decreases the value, which is indicative of the degree of reliability of the contents to be evaluated, according to the information transferred from the terminal apparatus to the contents to be evaluated.

43. An information search provision system according to claim 40, wherein when the terminal apparatus has accessed the contents to be evaluated, the contents providing apparatus transmits information on access from the terminal apparatus to the contents to be evaluated and/or information transferred from the terminal apparatus to the contents to be evaluated from the terminal apparatus to the information search provision apparatus.

44. An information search provision apparatus including:

at least one processing unit that operates to perform at least the steps of acquiring a search conditional statement and providing contents, matching the search conditional statement, as a search result;

an information receiver which receives directly or indirectly client information transmitted from a terminal apparatus that has accessed the contents to be evaluated, the client information transmitted being indicative of the status of access to the contents and access history from the terminal apparatus; and a reliability varying unit which increases or decreases a value, which is indicative of a degree of reliability of the contents to be evaluated, based on the client information; and a presenting unit which displays the value, which is indicative of the degree of reliability of the searched contents, and the search result to a user of the terminal apparatus and/or the information search provision apparatus on a display.

45. An information search provision apparatus according to claim 44, wherein the information receiver receives, as the client information, information on a status of access from the terminal apparatus to the contents to be evaluated, and wherein the reliability varying unit increases or decreases the value, which is indicative of the degree of reliability of the contents to be evaluated, according to the access status.

46. An information search provision apparatus according to claim 44, wherein the information receiver receives, as the client information, information transferred from the terminal apparatus to the contents to be evaluated, and wherein the reliability varying unit increases or decreases the value, which is indicative of the degree of reliability of the contents to be evaluated, according to the information transferred from the terminal apparatus to the contents to be evaluated.

47. An information search provision apparatus according to claim 44, further comprising:

a specifying unit which specifies location information indicative of a location of the contents to be evaluated; and a reliability transform unit which transforms the value, which is indicative of the degree of reliability, of the contents to be evaluated, increased or decreased by the reliability control unit into a value, which is indicative of a degree of reliability of the location information.

48. An information search provision apparatus according to claim 47, further comprising: a location information classifying unit which classifies the location information into a plurality of groups each of which belongs to a common attribute; and a location information group reliability calculating unit which calculates a value, which is indicative of a degree of reliability of location information for each of the plurality of classified groups.

49. An information search provision apparatus according to claim 47, wherein the specifying unit specifies a domain name as the location information, and wherein the reliability transform unit transforms the value, which is indicative of the degree of reliability of the contents to be evaluated into a value, which is indicative of a degree of reliability of the domain name.

50. An information search provision apparatus according to claim 47, wherein the specifying unit specifies an IP address as the location information, and wherein the reliability transform unit transforms the value, which is indicative of the degree of reliability of the contents to be evaluated into a value, which is indicative of a degree of reliability of the IP address.

51. An information search provision apparatus according to claim 47, wherein the reliability transform unit calculates a value, which is indicative of a degree of reliability of an electronic mail address including the location information, based on the obtained value, which is indicative of the degree of reliability of the location information.

52. An information search provision system, comprising:

a contents providing apparatus which posts contents to be evaluated on a web page in association with a product;

a terminal apparatus which accesses the contents to be evaluated via a network, wherein the terminal apparatus includes an information transmitting unit which transmits client information associated with the terminal apparatus; and an information search provision apparatus including:

at least one processing unit that operates to perform at least the steps of acquiring a search conditional statement and providing contents, matching the search conditional statement, as a search result;

an information receiver which receives directly or indirectly the client information transmitted from the terminal apparatus that has accessed via the network the contents to be evaluated; and an asset value varying unit which calculates and updates an asset value for the contents to be evaluated, based on the client information, and a history of purchasing the product through the contents, wherein the asset value is calculated and updated in terms of an estimated future contribution to a sales of the product as a function of a profit over a specific period, customer frequency of use during a specific period, and/or estimated profit.

53. An information search provision system according to claim 52, wherein the information transmitting unit transmits, as the client information, information related to access to the contents to be evaluated, and
    wherein the asset value varying unit increases or decreases the asset value according to a status of access from the terminal apparatus to the contents to be evaluated.

54. An information search provision system according to claim 52, wherein the information transmitting unit transmits, as the client information, information transferred from the terminal apparatus to the contents to be evaluated, and
    wherein the asset value varying unit increases or decreases the asset value according to the information transferred from the terminal apparatus to the contents to be evaluated.

55. An information search provision system according to claim 52, wherein when the terminal apparatus has accessed the contents to be evaluated, the contents providing apparatus transmits information on access from the terminal apparatus to the contents to be evaluated and/or information transferred from the terminal apparatus to the contents to be evaluated from the terminal apparatus to the information search provision apparatus.

56. An information search provision apparatus including:
    at least one processing unit that operates to perform at least the steps of acquiring a search conditional statement and providing contents, matching the search conditional statement in association with a product, as a search result;
    an information receiver which receives directly or indirectly client information transmitted from a terminal apparatus that has accessed the contents to be evaluated; and
    an asset value varying unit which updates an asset value for the contents to be evaluated, based on the client information, and a history of purchasing the product through the contents,
    wherein the asset value is calculated in terms of an estimated future contribution to a sales of the product as a function for a profit over a specific period, customer frequency of use during a specific period, and/or estimated profit.

57. An information search provision apparatus according to claim 56, wherein the information receiver receives, as the client information, information on a status of access from the terminal apparatus to the contents to be evaluated, and
    wherein the asset value varying unit increases or decreases the asset value according to the status of access from the terminal apparatus to the contents to be evaluated.

58. An information search provision apparatus according to claim 56, wherein the information receiver receives, as the client information, information transferred from the terminal apparatus to the contents to be evaluated, and
    wherein the asset value varying unit increases or decreases the asset value according to the information transferred from the terminal apparatus to the contents to be evaluated.

59. An information search provision apparatus comprising:
    at least one processing unit that operates to perform at least the steps of acquiring a search conditional statement and providing contents, matching the search conditional statement, as a search result;
    a collection unit which collects contents to be evaluated and contents, other than said evaluating contents, for use in comparison, wherein the evaluating contents and the other contents are posted on a web page via a network at a predetermined timing, wherein a decision item predetermined for the purpose of evaluating a reliability of the contents is contained in the contents to be evaluated and the other contents;
    an update determining unit which determines an update on the decision item in the other contents, and determines whether the contents to be evaluated is updated in correspondence with the update on the decision item in the other contents; and
    a reliability control unit which increases or decreases a value, which is indicative of a degree of reliability of the contents to be evaluated, according to a result obtained from the update determining unit; and
    a presenting unit which displays the value, which is indicative of the degree of reliability of the searched contents, and the search result to a user of the apparatus on a display.

60. An information search provision apparatus according to claim 59, wherein when the decision item has not been posted in the contents to be evaluated upon the publication of the decision item in the comparing contents, the update determining unit determines that the contents to be evaluated is not properly updated.

61. An information search provision apparatus according to claim 59, wherein when the decision item was posted in the comparing contents after the decision item was posted in the contents to be evaluated, the update determining unit determines that the contents to be evaluated is properly updated.

62. An information search provision apparatus according to claim 59, further comprising:
    a specifying unit which specifies location information indicative of a location of the contents to be evaluated; and
    a reliability transform unit which transforms the value, which is indicative of the degree of reliability, of the contents to be evaluated, increased or decreased by the reliability control unit into a value, which is indicative of a degree of reliability of the location information.

63. An information search provision apparatus according to claim 62, further comprising: a location information classifying unit which classifies the location information into a plurality of groups each of which belongs to a common attribute; and a location information group reliability calculating unit which calculates a value, which is indicative of a degree of reliability of location information for each of the plurality of classified groups.

64. An information search provision apparatus according to claim 62, wherein the specifying unit specifies a domain name as the location information, and
    wherein the reliability transform unit transforms the value, which is indicative of the degree of reliability of the contents to be evaluated into a value, which is indicative of a degree of reliability of the domain name.

65. An information search provision apparatus according to claim 62, wherein the specifying unit specifies an IP address as the location information, and
    wherein the reliability transform unit transforms the value, which is indicative of the degree of reliability of the contents to be evaluated into a value, which is indicative of a degree of reliability of the IP address.

66. An information search provision apparatus according to claim 62, wherein the reliability transform unit calculates a value, which is indicative of a degree of reliability of an electronic mail address including the location information, based on the obtained value, which is indicative of the degree of reliability of the location information.

67. An information search provision apparatus comprising:

at least one processing unit that operates to perform at least the steps of acquiring a search conditional statement and providing contents, matching the search conditional statement, as a search result;

a collection unit which collects contents to be evaluated posted on a web page via a network at a predetermined timing;

an identity determining unit which determines the identity of the contents, to be evaluated, collected at different timings; and a reliability control unit which increases or decreases a value, which is indicative of a degree of reliability of the contents to be evaluated, according to a result obtained from the identity determining unit; and a presenting unit which displays the value, which is indicative of the degree of reliability of the searched contents, and the search result to a user of the apparatus on a display, wherein the identity of the contents is determined when the contents to be evaluated, collected at an earlier time, is included as part of the contents to be evaluated, collected at a subsequent time.

68. An information search provision apparatus according to claim 67, wherein the identity determining unit determines whether or not the contents to be evaluated collected at early timing is identical to part of the contents to be evaluated at subsequent timing, and wherein when it is determined that the contents to be evaluated collected at early timing is identical to part of the contents to be evaluated at subsequent timing, the reliability control unit increases the value, which is indicative of the degree of reliability of the contents to be evaluated.

69. An information search provision apparatus according to claim 67 further comprising: a specifying unit which specifies location information indicative of a location of the contents to be evaluated; and a reliability transform unit which transforms the value, which is indicative of the degree of reliability, of the contents to be evaluated, increased or decreased by the reliability control unit into a value, which is indicative of a degree of reliability of the location information.

70. An information search provision apparatus according to claim 69, further comprising: a location information classifying unit which classifies the location information into a plurality of groups each of which belongs to a common attribute; and a location information group reliability calculating unit which calculates a value, which is indicative of a degree of reliability of location information for each of the plurality of classified groups.

71. An information search provision apparatus according to claim 69, wherein the specifying unit specifies a domain name as the location information, and wherein the reliability transform unit transforms the value, which is indicative of the degree of reliability of the contents to be evaluated into a value, which is indicative of a degree of reliability of the domain name.

72. An information search provision apparatus according to claim 69, wherein the specifying unit specifies an IP address as the location information, and wherein the reliability transform unit transforms the value, which is indicative of the degree of reliability of the contents to be evaluated into a value, which is indicative of a degree of reliability of the IP address.

73. An information search provision apparatus according to claim 69, wherein the reliability transform unit calculates a value, which is indicative of a degree of reliability of an electronic mail address including the location information, based on the obtained value, which is indicative of the degree of reliability of the location information.

74. An information search provision apparatus comprising:

at least one processing unit that operates to perform at least the steps of acquiring a search conditional statement and providing contents, matching the search conditional statement, as a search result;

a collection unit which collects contents to be evaluated and contents, other than said evaluating contents, for use in comparison both posted on a web page via a network at a predetermined timing;

a contents comparison storage which stores contents for comparison;

a uniqueness determining unit which compares the contents to be evaluated with the comparing contents which had already been collected and stored in the contents comparison storage at the time of collection of the contents to be evaluated and determines uniqueness of the contents to be evaluated when the contents comparison storage does not store the contents to be evaluated; and a reliability control unit which increases or decreases a value, which is indicative of a degree of reliability of the contents to be evaluated, according to a result obtained from the uniqueness determining unit; and a presenting unit which displays the value, which is indicative of the degree of reliability of the searched contents, and the search result to a user of the apparatus on a display.

75. An information search provision apparatus according to claim 74, wherein when the contents to be evaluated is contents such that the comparing contents which had already been collected at the time of collection of the contents to be evaluated is altered, the uniqueness determining unit determines that the contents to be evaluated is not unique, and wherein the reliability control unit decreases the value, which is indicative of the degree of reliability of the contents, to be evaluated, which was determined to be contents such that the comparing contents is altered.

76. An information search provision apparatus according to claim 74, further comprising:

a specifying unit which specifies location information indicative of a location of the contents to be evaluated; and a reliability transform unit which transforms the value, which is indicative of the degree of reliability, of the contents to be evaluated, increased or decreased by the reliability control unit into a value, which is indicative of a degree of reliability of the location information.

77. An information search provision apparatus according to claim 76, further comprising: a location information classifying unit which classifies the location information into a plurality of groups each of which belongs to a common attribute; and a location information group reliability calculating unit which calculates a value, which is indicative of a degree of reliability of location information for each of the plurality of classified groups.

78. An information search provision apparatus according to claim 76, wherein the specifying unit specifies a domain name as the location information, and wherein the reliability transform unit transforms the value, which is indicative of the degree of reliability of the contents to be evaluated into a value, which is indicative of a degree of reliability of the domain name.

79. An information search provision apparatus according to claim 76, wherein the specifying unit specifies an IP address as the location information, and wherein the reliability transform unit transforms the value, which is indicative of the degree of reliability of the contents to be evaluated into a value, which is indicative of a degree of reliability of the IP address.

80. An information search provision apparatus according to claim 76, wherein the reliability transform unit calculates a value, which is indicative of a degree of reliability of an electronic mail address including the location information, based on the obtained value, which is indicative of the degree of reliability of the location information.

81. An information search provision system, comprising:
a contents providing apparatus which posts contents to be evaluated, on a web page in association with a product;
a terminal apparatus which accesses the contents to be evaluated, via a network; and
an information search provision apparatus, wherein:
the terminal apparatus includes an information transmitting unit which transmits client information associated with the terminal apparatus, and
the information search provision apparatus includes:
at least one processing unit that operates to perform at least the steps of acquiring a search conditional statement and providing contents, matching the search conditional statement, as a search result;
an information receiver which receives directly or indirectly client information transmitted from the terminal apparatus that has accessed via the network the contents to be evaluated; and
an asset value calculating unit which calculates a profit or a profit reduction in a transaction related to the contents, and updates an asset value for the contents in terms of an estimated future contribution to a sales of the product by use of the profit or the profit reduction based at least on a history of purchasing the product through the contents.

82. The information search provision system according to claim 81, wherein:
the asset value calculating unit calculates the asset value by considering at least one of: a figure of the profit or the profit reduction totaled during a certain period, the frequency of use of regular customers, a property of a product, and by estimating a future profit or a future profit reduction.

83. An information search provision apparatus including:
at least one processing unit that operates to perform at least the steps of acquiring a search conditional statement and providing contents, matching the search conditional statement, in association with a product as a search result;
an information receiver which receives directly or indirectly client information transmitted from a terminal apparatus that has accessed the contents to be evaluated; and
an asset value calculating unit which calculates a profit or a profit reduction in a transaction related to the contents, and updates an asset value for the contents by use of the profit or the profit reduction in terms of an estimated future contribution to a sales of the product based at least on a history of purchasing the product through the contents.

84. The information search provision system according to claim 83, wherein:
the asset value calculating unit calculates the asset value by considering at least one of: a figure of the profit or the profit reduction totaled during a certain period, the frequency of use of regular customers, a property of a product, and by estimating a future profit or a future profit reduction.

\* \* \* \* \*